(12) United States Patent
Sawa et al.

(10) Patent No.: US 9,653,753 B2
(45) Date of Patent: May 16, 2017

(54) NON-AQUEOUS ELECTROLYTE SOLUTION AND NON-AQUEOUS ELECTROLYTE SECONDARY BATTERY EMPLOYING THE SAME

(71) Applicant: MITSUBISHI CHEMICAL CORPORATION, Chiyoda-ku (JP)

(72) Inventors: Shuhei Sawa, Inashiki-gun (JP); Kunihisa Shima, Yokkaichi (JP); Yasuyuki Shigematsu, Yokohama (JP); Masamichi Onuki, Yokohama (JP); Atsushi Watarai, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 137 days.

(21) Appl. No.: 13/955,584

(22) Filed: Jul. 31, 2013

(65) Prior Publication Data

US 2013/0316229 A1    Nov. 28, 2013

Related U.S. Application Data

(63) Continuation of application No. PCT/JP2012/051634, filed on Jan. 26, 2012.

(30) Foreign Application Priority Data

Jan. 31, 2011   (JP) ................. 2011-018562
Aug. 2, 2011   (JP) ................. 2011-169550

(51) Int. Cl.
*H01M 4/13*         (2010.01)
*H01M 10/0567*      (2010.01)
*H01M 10/052*       (2010.01)
*H01M 10/0569*      (2010.01)
*H01M 4/505*        (2010.01)

(52) U.S. Cl.
CPC ..... *H01M 10/0567* (2013.01); *H01M 10/052* (2013.01); *H01M 10/0569* (2013.01); *H01M 4/505* (2013.01); *H01M 2300/004* (2013.01); *H01M 2300/0025* (2013.01); *Y02E 60/122* (2013.01)

(58) Field of Classification Search
CPC .................................................. H01M 10/05
See application file for complete search history.

(56) References Cited

U.S. PATENT DOCUMENTS

| | | | |
|---|---|---|---|
| 6,534,216 B1 | 3/2003 | Narukawa et al. | |
| 2007/0172741 A1* | 7/2007 | Saito ............ | 429/326 |
| 2009/0061303 A1 | 3/2009 | Inagaki et al. | |
| 2009/0226819 A1 | 9/2009 | Ihara et al. | |
| 2010/0015521 A1 | 1/2010 | Kim | |
| 2010/0323242 A1* | 12/2010 | Choi et al. ............ | 429/217 |
| 2011/0050178 A1 | 3/2011 | Kim et al. | |
| 2011/0091768 A1 | 4/2011 | Ohashi et al. | |
| 2011/0111288 A1* | 5/2011 | Nishida et al. .......... | 429/199 |
| 2011/0151338 A1 | 6/2011 | Yamamoto et al. | |
| 2012/0009486 A1 | 1/2012 | Hayakawa et al. | |

FOREIGN PATENT DOCUMENTS

| | | |
|---|---|---|
| CN | 1262532 | 8/2000 |
| CN | 1398013 A | 2/2003 |
| CN | 1700498 | 11/2005 |
| CN | 101212065 A | 7/2008 |
| CN | 101533929 A | 9/2009 |
| CN | 101771167 | 7/2010 |
| JP | 07-240232 | 9/1995 |
| JP | 2002-008719 | 1/2002 |
| JP | 2005-259641 | 9/2005 |
| JP | 2006-164759 | 6/2006 |
| JP | 2006-252895 A | 9/2006 |
| JP | 2007-242411 A | 9/2007 |
| JP | 2008-041366 | 2/2008 |
| JP | 2009-54319 | 3/2009 |
| JP | 2009-123707 | 6/2009 |
| JP | 2009-245923 | 10/2009 |
| JP | 2010-15968 A | 1/2010 |
| JP | 2010-225522 | 10/2010 |

(Continued)

OTHER PUBLICATIONS

International Search Report issued Mar. 13, 2012 in PCT/JP2012/051634 filed Jan. 26, 2012.
Notice of Decision of Rejection issued Sep. 5, 2014 in Korean Patent Application No. 10-2013-7020668 with English language translation.
Korean Office Action issued Apr. 8, 2014, in Korea Patent Application No. 10-2013-7020668 (with English translation).
U.S. Appl. No. 13/964,195, filed Aug. 12, 2013, Sawa, et al.
Combined Chinese Office Action and Search Report issued Feb. 4, 2015 in Patent Application No. 201280007151.9 (with English language translation).
Korean Office Action issued Jan. 8, 2015 in Patent Application No. 10-2013-7020668 (with English Translation).
Office Action issued Oct. 23, 2015 in Chinese Patent Application No. 201280007151.9 (with English language translation).
Appeal Board Decision issued Aug. 13, 2015 in Korean Patent Application No. 2013-7020668 (with English language translation).
Combined Office Action and Search Report issued Jul. 21, 2015 in Chinese Patent Application No. 201410055652.5 (with English language translation).
Office Action in corresponding Korean Application No. 10-2014-7005641. (w/English Translation).

(Continued)

*Primary Examiner* — Jacob Marks
(74) *Attorney, Agent, or Firm* — Oblon, McClelland, Maier & Neustadt, L.L.P.

(57) ABSTRACT

The demand for improvements in lithium non-aqueous electrolyte secondary batteries has been constantly increasing in recent years, but the durability—most prominently the cycle characteristics—have resided in a trade off relationship with properties such as the capacity, resistance, and output characteristics. A problem has thus been a poor overall property balance. In order to solve this problem, the present invention uses a non-aqueous electrolyte solution including, in addition to an electrolyte and a non-aqueous solvent, (A) at least one compound selected from the group consisting of carbonates having a carbon-carbon unsaturated bond, compounds represented by the following general formula (1), sulfoxides, sulfites, sulfones, sulfonates, sultones, and sulfates; (B) a fluorine atom-containing cyclic carbonate; and (C) a compound that has at least two isocyanate groups in the molecule.

21 Claims, No Drawings

(56) References Cited

FOREIGN PATENT DOCUMENTS

| | | | |
|---|---|---|---|
| JP | 2010225522 | * | 10/2010 |
| JP | 2011-014379 | | 1/2011 |
| JP | 2011-028860 | | 2/2011 |
| JP | 2011-044339 | | 3/2011 |
| JP | 2011-54560 A | | 3/2011 |
| WO | 2009/035054 | | 3/2009 |
| WO | 2010/021236 | | 2/2010 |

OTHER PUBLICATIONS

Korean Office Action issued Mar. 28, 2016 in Patent Application No. 10-2014-7005641(with English Translation).

Japanese Office Action issued Apr. 26, 2016 in Patent Application No. 2012-170117 (with English Translation).

Office Action issued May 5, 2016 in Chinese Patent Application No. 201280007151.9 (with English language translation).

Japanese Office Action issued Jul. 14, 2015, in corresponding Patent Application No. 2012-014133. (w/English Translation).

Office Actin in corresponding Chinese application No. 201280007151.9, dated Oct. 17, 2016. (w/English Machine Translation).

Partial Supplementary European Search Report Issued in the corresponding European application No. 12742322.6 on Feb. 6, 2017.

Sheng Shui Zhang, "A Review on Electrolyte Additives for Lithium-ion Batteries" Journal of Power Sources, vol. 162, 2006, No. 2, Nov. 22. 2006, pp. .1379-1394.

* cited by examiner

NON-AQUEOUS ELECTROLYTE SOLUTION AND NON-AQUEOUS ELECTROLYTE SECONDARY BATTERY EMPLOYING THE SAME

CROSS-REFERENCE TO RELATED APPLICATIONS

This is a continuation of International Application PCT/JP2012/051634, filed on Jan. 26, 2012, and designated the U.S., (and claims priority from Japanese Patent Application 2011-018562 which was filed on Jan. 31, 2011 and Japanese Patent Application 2011-169550 which was filed on Aug. 2, 2011) the entire contents of which are incorporated herein by reference.

TECHNICAL FIELD

The present invention relates to non-aqueous electrolyte solution and a non-aqueous electrolyte secondary battery using the same.

BACKGROUND ART

As lithium non-aqueous electrolyte secondary batteries wherein a lithium-containing transition metal oxide is used as a positive electrode and a non-aqueous solvent is used as an electrolyte can realize high energy density, the lithium non-aqueous electrolyte secondary batteries are applied to a wide variety of use from small-sized power supplies for mobile telephones, laptop computers, and the like to large-sized power supplies for automobiles, railways and road leveling. However, the recent requirement for high performance for the non-aqueous electrolyte battery has been increased, and the improvement on each of the properties is highly required.

For the lithium non-aqueous electrolyte secondary battery, non-aqueous electrolyte solutions are used. The non-aqueous electrolyte solutions contain cyclic carbonates such as ethylene carbonate or propylene carbonate; linear carbonates such as dimethyl carbonate, diethyl carbonate or ethyl methyl carbonate; cyclic carboxylic acid esters such as γ-butyrolactone or γ-valerolactone; linear carboxylic acid esters such as methyl acetate, ethyl acetate or methyl propionate, and solutes such as $LiPF_6$, $LiBF_4$, $LiAsF_6$, $LiClO_4$, $LiCF_3SO_3$, $LiN(CF_3SO_2)_2$.

In the non-aqueous electrolyte secondary battery using such non-aqueous electrolyte solutions, reactivity differs according to the composition of the non-aqueous electrolyte solutions, resulting in substantial changes in battery characteristics according to the non-aqueous electrolyte solutions. Various considerations have been made regarding non-aqueous solvents and electrolytes in order to improve the battery characteristics of the non-aqueous electrolyte secondary battery, such as the load characteristic, cycle characteristic, and storage characteristic and to enhance safety of batteries in an overcharged state.

Patent Document 1 reports that the cycle characteristic is improved by using a fluorine atom-containing cyclic carbonate as a non-aqueous electrolyte component so as to lower the freezing point.

Patent Document 2 reports that excellent cyclic stability can be achieved by dissolving a low-molecular weight isocyanate compound in an organic electrolyte so as to form a reactive layer on the electrode interfaces.

Patent Document 3 reports that a suppressing effect on bulging during high-temperature storage can be provided by using a non-aqueous electrolyte secondary battery in which a positive electrode contains a positive electrode active material covered with phosphate and electrolyte contains electrolyte including a non-aqueous solvent, an electrolyte salt, and an isocyanate compound.

Patent Document 4 reports that battery characteristics during a high-temperature cycle are improved by using a non-aqueous electrolyte battery in which a positive electrode has a moisture content of 50 to 1000 ppm and electrolyte contains an isocyanate compound and an aromatic compound.

Patent Document 5 reports that use of a silicon-alloy negative-electrode and electrolyte that contains diisocyanate and fluorinated cyclic carbonate provides improvements in cycle characteristic and rate characteristic.

Patent Document 1: Japanese Patent Application Laid-open No. H7-240232
Patent Document 2: Japanese Patent Application Laid-open No. 2005-259641
Patent Document 3: Japanese Patent Application Laid-open No. 2011-014379
Patent Document 4: Japanese Patent Application Laid-open No. 2011-028860
Patent Document 5: International Publication No. WO 2010/021236

DISCLOSURE OF THE INVENTION

However, the recent requirement for improvements in characteristics of a lithium non-aqueous electrolyte secondary battery has been increased, and a combination of all performance each achieved at a high quality, such as energy density, output performance, life, high-temperature resistance, and low-temperature characteristic, is required. This requirement has, however, not been achieved yet. There is a trade-off between the durability including cycle characteristic and performance such as capacity, resistance, and output characteristic, and there has been a problem of imbalanced overall performance.

The present invention has been made in view of the above-described problem. Specifically, an object of the invention relates to a lithium non-aqueous electrolyte secondary battery and is to provide a battery having well-balanced overall performance with respect to durability and performance such as capacity, resistance, output and characteristic.

As a result of extensive and intensive investigations, the inventor of the present inventions discovered that the problems identified above could be solved by the incorporation of a compound having at least two isocyanate groups in the molecule, a fluorine atom-containing cyclic carbonate, and a specific additive into a non-aqueous electrolyte solution and was thus able to achieve the first present invention, infra.

The discovery was also made that the problems identified above could be solved by using the combination of a prescribed positive electrode with a non-aqueous electrolyte solution comprising a fluorine atom-containing cyclic carbonate and a compound having at least two isocyanate groups in the molecule, thus achieving the second present invention, infra.

The essential features of the first present invention are as follows.
(i) A non-aqueous electrolyte solution for a non-aqueous electrolyte secondary battery having a positive electrode and a negative electrode that are capable of absorbing and releasing a metal ion, wherein the non-aqueous electrolyte solution comprises, in addition to an electrolyte and a non-aqueous solvent,
(A) at least one compound selected from the group consisting of carbonates having a carbon-carbon unsaturated bond, compounds represented by the following general formula (1), sulfoxides, sulfites, sulfones, sulfonates, sultones, and sulfates;
(B) a fluorine atom-containing cyclic carbonate; and
(C) a compound that has at least two isocyanate groups in the molecule:

[Chem. 1]

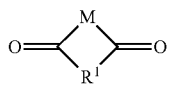
(1)

(in formula (1), M is —O— or —NR$^2$—, R$^2$ is hydrogen or a optionally branched hydrocarbon group having 10 or less carbons, and R$^1$ is a optionally substituent-bearing and optionally branched hydrocarbon group having 10 or less carbons).
(ii) The non-aqueous electrolyte solution according to (i), wherein the fluorine atom-containing cyclic carbonate (B) comprises at least one compound selected from the group consisting of fluoroethylene carbonate, 4,4-difluoroethylene carbonate, and 4,5-difluoroethylene carbonate.
(iii) The non-aqueous electrolyte solution according to (i) or (ii), wherein the compound (C) that has at least two isocyanate groups in the molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diyl-bis(methyl isocyanate), isophorone diisocyanate, 2,2,4-trimethylhexamethylene diisocyanate, 2,4,4-trimethylhexamethylene diisocyanate, and polyisocyanate compounds derived therefrom.
(iv) The non-aqueous electrolyte solution according to any one of (i) to (iii), wherein the compound represented by general formula (1) comprises a compound in which R$^1$ is a hydrocarbon group selected from the group consisting of —CH$_2$—CH$_2$—, —CH$_2$—CH$_2$—CH$_2$—, —CH═CH—, —CH═C(CH$_3$)—, —CH$_2$—C(═CH$_2$)—, and the hydrocarbon group represented by the following formula (2):

[Chem. 2]

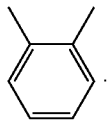
(2)

(v) The non-aqueous electrolyte solution according to any one of (i) to (iv), wherein the compound represented by general formula (1) comprises a compound in which M is an organic group selected from the group consisting of —O—, —NH—, and —N(—CH$_3$)—.
(vi) The non-aqueous electrolyte solution according to any one of (i) to (v), wherein the compound represented by general formula (1) comprises succinic anhydride or maleic anhydride.

(vii) The non-aqueous electrolyte solution according to any one of (i) to (vi), wherein the carbonate having a carbon-carbon unsaturated bond comprises at least one compound selected from the group consisting of vinylene carbonate, vinylethylene carbonate, and ethynylethylene carbonate.
(viii) The non-aqueous electrolyte solution according to any one of (i) to (vii), herein the compound (A) is contained in the non-aqueous electrolyte solution in the amount of 0.001 mass % or more and 10 mass % or less.
(ix) The non-aqueous electrolyte solution according to any one of (i) to (viii), wherein the fluorine atom-containing cyclic carbonate (B) is contained in the non-aqueous electrolyte solution in the amount of 0.001 mass % or more and 10 mass % or less.
(x) The non-aqueous electrolyte solution according to any one of (i) to (ix), wherein the compound (C) that has at least two isocyanate groups in the molecule is contained in the non-aqueous electrolyte solution in the amount of 0.001 mass % or more and 10 mass % or less.
(xi) A non-aqueous electrolyte secondary battery having at least a positive electrode capable of absorbing and releasing a lithium ion, a negative electrode capable of absorbing and releasing a lithium ion, and a non-aqueous electrolyte solution, wherein
the non-aqueous electrolyte solution is the non-aqueous electrolyte solution according to any one of (i) to (x).
The essential features of the second present invention are as follows.
(xii) A non-aqueous electrolyte secondary battery having at least a positive electrode capable of absorbing and releasing a lithium ion, a negative electrode capable of absorbing and releasing a lithium ion, and a non-aqueous electrolyte solution containing a non-aqueous solvent and an electrolyte dissolved in the non-aqueous solvent, wherein
the positive electrode contains a lithium manganese composite oxide having a spinel structure, and
the non-aqueous electrolyte solution contains
(B) a fluorine atom-containing cyclic carbonate, and
(C) a compound that has at least two isocyanate groups in the molecule.
(xiii) The non-aqueous electrolyte secondary battery according to (xii), wherein the positive electrode containing a lithium manganese composite oxide contains a lithium nickel composite oxide having a layered structure.
(xiv) The non-aqueous electrolyte secondary battery according to (xii) or (xiii), wherein the fluorine atom-containing cyclic carbonate (B) comprises at least one compound selected from the group consisting of fluoroethylene carbonate, 4,4-difluoroethylene carbonate, and 4,5-difluoroethylene carbonate.
(xv) The non-aqueous electrolyte secondary battery according to any one of (xii) to (xiv), wherein the compound (C) that has at least two isocyanate groups in the molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived therefrom.
(xvi) The non-aqueous electrolyte secondary battery according to any one of (xii) to (xv), wherein the fluorine atom-containing cyclic carbonate (B) is contained in the non-aqueous electrolyte solution at from at least 0.001 mass % to not more than 10 mass %.

(xvii) The non-aqueous electrolyte secondary battery according to any one of (xii) to (xvi), wherein the compound (C) that has at least two isocyanate groups in the molecule is contained in the non-aqueous electrolyte solution in the amount of 0.001 mass % or more and 10 mass % or less.

The present inventions can provide a non-aqueous electrolyte secondary battery that exhibits an excellent overall property balance with regard to, inter alia, durability and properties such as the capacity, resistance, output characteristics, high-temperature storage characteristics, and continuous charging characteristics.

While the mechanisms and principles that result in a non-aqueous electrolyte secondary battery fabricated by using the non-aqueous electrolyte solution of the present inventions and in the non-aqueous electrolyte secondary battery of the present inventions being secondary batteries that exhibit an excellent overall property balance are unclear, the following is thought. However, the present inventions are not limited by the mechanisms and principles described herebelow.

Proposals as represented by Patent Document 1 generally bring about an improvement in the cycle properties through the formation of a film on the negative electrode by a fluorine atom-containing cyclic carbonate. The thermal stability of this film, however, has been low and unsatisfactory in terms of battery characteristics. In the case of proposals as represented by Patent Documents 2 and 3, an improvement in the battery characteristics is brought about by reacting a diisocyanate compound on the negative electrode. However, this ends up increasing the resistance at the negative electrode interface and thus reduces the charge/discharge characteristics. In addition, the battery capacity also undergoes a decline due to the occurrence of secondary reactions by the diisocyanate compound on the positive electrode. Such a decline in the battery characteristics also similarly occurs with a compound that has two isocyanate groups.

Attempts to improve the long-term battery stability by using compounds containing isocyanate group in the molecule are also made in proposals as represented by Patent Documents 4 and 5. However, a satisfactory durability may not be obtained depending on the type of isocyanate compound, or the type of additive combined therewith, or their amounts of incorporation, and these proposals have not been satisfactory with regard to the battery characteristics.

On the other hand, carbonates having a carbon-carbon unsaturated bond, compounds represented by general formula (1), sulfoxides, sulfites, sulfones, sulfonates, sultones, and sulfates (these may be collectively referred to as group (A) compounds in the following) and fluorine atom-containing cyclic carbonates are all thought to form film-form structures on the negative electrode. However, while the films formed by group (A) compounds are excellent for the durability, they have also caused the problem of reducing the charge/discharge characteristics through an increase in resistance.

In addition, spinel-structured lithium manganese composite oxides have a relatively small resistance, but when they are used as a positive electrode active material in non-aqueous electrolyte secondary batteries, the manganese ion elutes during battery charge/discharge. The eluted manganese ion causes the negative electrode to deteriorate, which has resulted in the problem of a deterioration in the durability of the secondary battery.

In order to solve the problems identified above, a group (A) compound, a fluorine atom-containing cyclic carbonate, and a compound having at least two isocyanate groups in the molecule are added in combination to the non-aqueous electrolyte solution in the first present invention. This results in the formation of a composite film on the negative electrode. This composite film has a lower resistance and provides a greater improvement in the thermal stability than the films formed by each of these additives used individually and also improves the durability of the secondary battery.

In order to solve the problems identified above, in the second present invention a fluorine atom-containing cyclic carbonate and a compound having at least two isocyanate groups in the molecule are added in combination to the non-aqueous electrolyte solution and a spinel-structured lithium manganese composite oxide is used for the positive electrode. As a result, the fluorine atom-containing cyclic carbonate, compound having at least two isocyanate groups in the molecule, and manganese ion eluted from the positive electrode form a composite film in the interior of the battery. This composite film has a lower resistance than the films formed by each of these additives used individually and also improves the durability of the secondary battery. In addition, the compound having at least two isocyanate groups in the molecule at the same time adsorbs to the surface of the lithium manganese composite oxide, which has the effect of inhibiting manganese ion elution, and this concerted effect is thought to result in a global improvement in the secondary battery characteristics.

BEST MODE FOR CARRYING OUT THE INVENTION

Embodiments of the present invention are explained next, but the present invention is not limited to the following embodiments, and may be carried out in various ways without departing from the gist of the present invention. In addition, "weight %", "weight-ppm", and "weight parts" are herein synonymous with "mass %", "mass-ppm", and "mass parts", respectively. When ppm is given by itself, this indicates "weight-ppm".

1. The Non-Aqueous Electrolyte

The non-aqueous electrolyte solution of the first present invention contains as essential components at least one compound selected from group (A) compounds, a fluorine atom-containing cyclic carbonate (B), and a compound (C) that has at least two isocyanate groups in the molecule.

The non-aqueous electrolyte solution used by the non-aqueous electrolyte secondary battery of the second present invention contains as essential components a fluorine atom-containing cyclic carbonate (B) and a compound (C) that has at least two isocyanate groups in the molecule.

When the group (A) compound, fluorine atom-containing cyclic carbonate (B), and compound (C) having at least two isocyanate groups in the molecule are incorporated in a non-aqueous electrolyte solution and used for the actual fabrication of a non-aqueous electrolyte secondary battery and this battery is disassembled and the non-aqueous electrolyte solution is recovered, the content of these components therein frequently will have undergone a substantial decline. Accordingly, the present inventions are regarded as encompassing the case in which a group (A) compound, fluorine atom-containing cyclic carbonate (B), and compound (C) having at least two isocyanate groups in the molecule can be detected even in small amounts from the non-aqueous electrolyte solution recovered from a battery. Moreover, when the group (A) compound, fluorine atom-containing cyclic carbonate (B), and compound (C) having at least two isocyanate groups in the molecule are used in the form of a non-aqueous electrolyte solution for the actual fabrication of a non-aqueous electrolyte secondary battery, the group (A) compound, fluorine atom-containing cyclic carbonate (B), and compound (C) having at least two isocyanate groups in the molecule—even when not present in the non-aqueous electrolyte solution recovered when the battery is disassembled—are frequently detected on the positive electrode, negative electrode, or separator that are other constituent members of non-aqueous electrolyte secondary batteries. Accordingly, the present inventions are regarded as also encompassing the case in which the group (A) compound, fluorine atom-containing cyclic carbonate (B), and compound (C) having at least two isocyanate groups in the molecule are detected from at least one constituent member selected from the positive electrode, negative electrode, and separator.

Furthermore, the group (A) compound, fluorine atom-containing cyclic carbonate (B), and compound (C) having at least two isocyanate groups in the molecule may be preliminarily incorporated within a separator or at the surface of a separator of a non-aqueous electrolyte secondary battery being fabricated. In such a case, all or a portion of the preliminarily incorporated group (A) compound, fluorine atom-containing cyclic carbonate (B), and compound (C) having at least two isocyanate groups in the molecule can be expected to dissolve in the non-aqueous electrolyte solution and manifest its functionality and this case is regarded as being encompassed by the present inventions.

There are no particular limitations on the means for preliminarily incorporating these compounds within the separator or at the surface of the separator, but the following methods can be provided as specific examples: methods in which the group (A) compound, fluorine atom-containing cyclic carbonate (B), and compound (C) having at least two isocyanate groups in the molecule are admixed in advance during separator fabrication; and methods in which, prior to fabrication of the non-aqueous electrolyte secondary battery, a solution is preliminary prepared by dissolving the group (A) compound, fluorine atom-containing cyclic carbonate (B), and compound (C) having at least two isocyanate groups in the molecule in a freely selected non-aqueous solvent, coating the separator or impregnating the separator with this solution, and then effecting incorporation in the separator by drying off and removing the solvent used.

1-1. The Compound (C) Having at Least Two Isocyanate Groups in the Molecule

This compound having at least two isocyanate groups in the molecule that is used in the first and second present inventions is a compound that has at least two isocyanate groups in the molecule but is not otherwise particularly limited as to type, and, for example, it may be a compound having a straight-chain or branched alkylene structure, a cycloalkylene structure, an aromatic hydrocarbon structure, an ether structure (—O—), or a structure provided by the halogenation of the preceding. Additional examples are structures in which the carbonyl group (—C(=O)—) is connected or in which the carbonyl group is connected with an alkylene group and structures in which the sulfonyl group (—S(=O)—) is connected or in which the sulfonyl group is connected with an alkylene group.

The following compounds are specific examples of the compound having at least two or more isocyanate groups in the molecule: monomethylenediisocyanate, dimethylenediisocyanate, trimethylenediisocyanate, tetramethylenediisocyanate, pentamethylenediisocyanate, hexamethylenediisocyanate, heptamethylenediisocyanate, octamethylenediisocyanate, nonamethylenediisocyanate, decamethylenediisocyanate, dodecamethylenediisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluenediisocyanate, xylenediisocyanate, tolylenediisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, carbonyldiisocyanate, 1,4-diisocyanatobutane-1,4-dione, 1,5-diisocyanatopentane-1,5-dione, 2,2,4-trimethylhexamethylenediisocyanato, 2,4,4-trimethylhexamethylenediisocyanato.

The following are preferred among the preceding from the standpoint of improving the storage stability: monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, and 2,4,4-trimethylhexamethylene diisocyanate.

The isocyanate compound (C) used in the present inventions may also be a trimer compound derived from a compound having at least two isocyanate groups in the molecule or may be an aliphatic polyisocyanate provided by the addition of a polyhydric alcohol to the preceding. Examples are the biuret, isocyanurate, adduct, and difunctional type modified polyisocyanate represented by the basic structures in the following general formulas (3-1) to (3-4) (the R and R' in general formulas (3-1) to (3-4) are each independently a freely selected hydrocarbon group).

[Chem. 3]

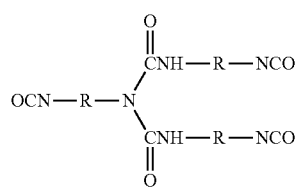

(3-1)

[Chem. 4]

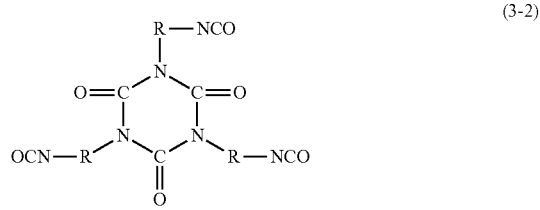

(3-2)

-continued

[Chem. 5]

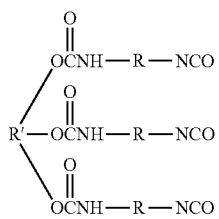
(3-3)

[Chem. 6]

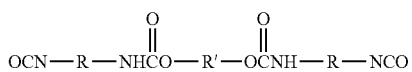
(3-4)

The compound (C) having at least two isocyanate groups in the molecule that is used by the present inventions also encompasses so-called blocked isocyanates that have been blocked with a blocking agent in order to raise the storage stability. The blocking agent can be exemplified by alcohols, phenols, organic amines, oximes, and lactams and can be specifically exemplified by n-butanol, phenol, tributylamine, diethylethanolamine, methyl ethyl ketoxime, and ε-caprolactam.

The co-use of a metal catalyst, e.g., dibutyltin dilaurate, or an amine catalyst, e.g., 1,8-diazabicyclo[5.4.0]undec-7-ene, is also preferred with the goal of obtaining a greater effect by promoting the reactions that are based on the compound (C) having at least two isocyanate groups in the molecule.

(C) The compound having at least two isocyanate groups in the molecule may be used singly as one type, or as two or more concurrent types in any combinations and ratios. There are no limitations on the amount of incorporation, with reference to the overall non-aqueous electrolyte solution of the present invention, of the compound (C) having at least two isocyanate groups in the molecule, and this amount may be freely selected as long as the effects of the present inventions are not significantly impaired. However, incorporation is generally carried out, with reference to the non-aqueous electrolyte solution of the present invention, at a concentration of generally at least 0.001 mass %, preferably at least 0.01 mass %, and more preferably at least 0.1 mass % and generally not more than 10 mass %, preferably not more than 5 mass %, and more preferably not more than 3 mass %. If the abovementioned ranges are satisfied, the effects on output characteristic, load characteristic, low-temperature characteristic, cycle characteristic, high-temperature storage characteristic and so forth become more pronounced.

1-2. (B) Fluorine Atom-Containing Cyclic Carbonate

The fluorine atom-containing cyclic carbonate used in the first and the second aspects of the present invention (hereinafter may be referred to as "fluorinated cyclic carbonate") is not particularly limited, so long as it is a fluorine atom-containing cyclic carbonate.

The fluorinated cyclic carbonate can be exemplified by the fluorinated products of cyclic carbonates having a $C_{2-6}$ alkylene group and derivatives of these fluorinated products and by fluorinated ethylene carbonates substituted with a substituent having an aromatic ring or a carbon-carbon double bond and derivatives of these fluorinated ethylene carbonates, for example, products provided by the fluorination of ethylene carbonate and derivatives thereof and fluorinated vinylene carbonates and derivatives thereof. The derivatives of products provided by the fluorination of ethylene carbonate can be exemplified by the fluorination products of ethylene carbonates substituted with an alkyl group (for example, a $C_{1-4}$ alkyl group). Preferred among the preceding are ethylene carbonates having from 1 to 8 fluorine atoms and derivatives therefrom. The derivatives of fluorinated vinylene carbonates can be exemplified by fluorinated vinylene carbonates substituted with an alkyl group (for example, a $C_{1-4}$ alkyl group). Preferred among the preceding are vinylene carbonates having from 1 to 8 fluorine atoms and derivatives therefrom.

Specific examples are as follows: fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)ethylene carbonate, 4-(difluoromethyl)ethylene carbonate, 4-(trifluoromethyl)ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, 4-fluorovinylene carbonate, 4-fluoro-5-methylvinylene carbonate, 4-fluoro-5-phenylvinlene carbonate, 4-allyl-5-fluorovinylene carbonate, 4-fluoro-5-vinylvinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Among the foregoing, saturated cyclic carbonates are preferred due to the stability of the compound. At least one compound selected from the group consisting of fluoroethylene carbonate, 4,4-difluoroethylene carbonate and 4,5-difluoroethylene carbonate, is used more preferably in terms of imparting high ionic conductivity and forming an appropriate interface protective coating.

The fluorinated cyclic carbonate may be used singly as one type, or as two or more concurrent types in any combinations and ratios.

The fluorinated cyclic carbonate may be used as an additive or as a solvent. When the fluorinated cyclic carbonate is used as an additive, its amount of incorporation, expressed with reference to the non-aqueous electrolyte solution, is preferably at least 0.1 mass %, more preferably at least 0.5 mass %, and even more preferably at least 1 mass % and is preferably not more than 10 mass %, more preferably not more than 5 mass %, and even more preferably not more than 3 mass %. Further, when the fluorinated cyclic carbonate is used as non-aqueous solvents, the amount of incorporation of the compound is preferably 1 vol % or more, more preferably 5 vol % or more and even more preferably 10 vol % or more, and preferably 50 vol % or less, more preferably 35 vol % or less and even more preferably 25 vol % or less, with respect to 100 vol % of nonaqueous solvent."

Within the abovementioned ranges, a sufficient enhancing effect on cycle characteristic is readily brought out in the nonaqueous electrolyte secondary battery; therefore, drops in high-temperature storage characteristic and drops in discharge capacity retention rate, caused by excessive gas generation amount, are readily avoided.

The compound (C) having at least two isocyanate groups in the molecule and the fluorine atom-containing cyclic carbonate (B) in the non-aqueous electrolyte solution of the present inventions form a composite film on the negative electrode. Viewed from the perspective of achieving the excellent formation of this film, the blending mass ratio between the compound (C) having at least two isocyanate groups in the molecule and the fluorine atom-containing cyclic carbonate (B) is preferably 0.4:100 to 100:100, more preferably 1:100 to 50:100, and even more preferably 1.4:100 to 35:100. Blending in this range can efficiently inhibit secondary reactions by these additives at the positive and negative electrodes and improves the battery characteristics.

1-3. Carbonate Having a Carbon-Carbon Unsaturated Bond

The group (A) compound used in the first present invention comprises carbonates having a carbon-carbon unsaturated bond, compounds represented by general formula (1), sulfoxides, sulfites, sulfones, sulfonates, sultones, and sulfates.

Cyclic carbonates having a carbon-carbon unsaturated bond (also referred to in the following as "unsaturated cyclic carbonates") are cyclic carbonates having a carbon-carbon double bond or a carbon-carbon triple bond, but are not otherwise particularly limited, and any unsaturated carbonate can be used. Cyclic carbonates having an aromatic ring are included herein among unsaturated cyclic carbonates.

Examples of unsaturated cyclic carbonates include, for instance, vinylene carbonates, ethylene carbonates substituted with an aromatic ring or a substituent having a carbon-carbon double bond or a carbon-carbon triple bond, phenyl carbonates, vinyl carbonates, allyl carbonates, catechol carbonate or the like.

The vinylene carbonates can be exemplified by vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, and 4-allyl-5-fluorovinylene carbonate or the like.

Specific examples of ethylene carbonates substituted with an aromatic ring or a substituent having a carbon-carbon double bond or a carbon-carbon triple bond include, for instance, vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate or the like.

Preferred among the foregoing are vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate, in terms of high thermal stability of a coating film. Particularly preferred are vinylene carbonate, vinylethylene carbonate, and ethynylethylene carbonate, since they form a more stable protective coating.

The molecular weight of the unsaturated cyclic carbonate is not particularly limited, and may be any molecular weight, so long as the effect of the present invention is not significantly impaired thereby. The molecular weight is preferably 80 or greater and 250 or smaller. Within those ranges, the solubility of the unsaturated cyclic carbonate towards the nonaqueous electrolyte solution can be readily secured, and the effect of the present invention is readily brought out. The molecular weight of the unsaturated cyclic carbonate is more preferably 85 or greater and more preferably 150 or smaller.

The method for producing the unsaturated cyclic carbonate is not particularly limited, and the unsaturated cyclic carbonate may be produced in accordance with an arbitrarily selected known method.

The unsaturated cyclic carbonate may be used singly as one type, or as two or more concurrent types in any combinations and ratios. The amount of incorporation of the unsaturated cyclic carbonate is not particularly limited, and may be any amount of incorporation, so long as the effect of the present invention is not significantly impaired thereby. The amount of incorporation of the unsaturated cyclic carbonate, in 100 mass % of the non-aqueous electrolyte solution, is preferably at least 0.001 mass %, more preferably at least 0.01 mass %, and even more preferably at least 0.1 mass % and generally not more than 10 mass %, preferably not more than 5 mass %, more preferably not more than 4 mass %, and even more preferably not more than 3 mass %. When this range is satisfied, the non-aqueous electrolyte battery readily exhibits a satisfactory improvement in the cycle characteristics and readily avoids the occurrence of a decline in the high-temperature storage characteristics, a large amount of gas generation, and a decline in the discharge capacity retention rate.

1-4. Compound Represented by Formula (1)

The group (A) compounds in the first present invention encompass compounds represented by formula (1)

[Chem. 7]

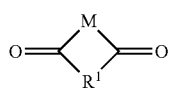

(1)

(in formula (1), M is —O— or —NR$^2$—, R$^2$ is hydrogen or a optionally branched hydrocarbon group having no more than 10 carbons, and R$^1$ is a optionally substituent-bearing and optionally branched hydrocarbon group having no more than 10 carbons).

Among the preceding, R$^2$ is preferably hydrogen or a hydrocarbon group having no more than 6 carbons, whereamong R$^2$ is more preferably hydrogen, a C$_{1-5}$ alkyl group, or the phenyl group and particularly preferably is hydrogen or the methyl group. R$^1$ is a optionally substituent-bearing and optionally branched hydrocarbon group having no more than 10 carbons and preferably is a hydrocarbon group having no more than 6 carbons, whereamong R$^1$ more preferably represents a hydrocarbon group selected from the group consisting of —CH$_2$—CH$_2$—, —CH$_2$—CH$_2$—CH$_2$—, —CH=CH—, —CH=C(CH$_3$)—, —CH$_2$—C(=CH$_2$)—, and the hydrocarbon group represented by the following structural formula (2). The substituent can be exemplified by a optionally halogen atom-substituted alkyl group, alkenyl group, alkynyl group, aryl group, alkoxy group; cyano group, isocyanate group, ether group, carbonate group, carbonyl group, carboxyl group, sulfonyl group, and phosphoryl group.

[Chem. 8]

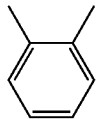

(2)

The molecular weight of the compound represented by general formula (1) is not particularly limited and may be freely selected as long as the effects of the present invention are not substantially impaired and in practice is generally at least 85, preferably at least 90, and more preferably at least 95 and generally not more than 300, preferably not more than 250, and more preferably not more than 230. Within this molecular weight range, an excellent solubility in the non-aqueous electrolyte solution is exhibited and excellent effects are more effectively accomplished.

The following are preferred specific examples of the compound represented by general formula (1): malonic anhydride, succinic anhydride, glutaric anhydride, adipic anhydride, maleic anhydride, citraconic anhydride, glutaconic anhydride, itaconic anhydride, phthalic anhydride, cyclohexane-1,2-dicarboxylic anhydride, 4-cyclohexene-1,2-dicarboxylic anhydride, 3,4,5,6-tetrahydrophthalic anhydride, 5-norbornene-2,3-dicarboxylic anhydride, methyl-5-norbornene-2,3-dicarboxylic anhydride, phenylsuccinic anhydride, 2-phenylglutaric anhydride, malonimide, succinimide, glutarimide, maleimide, phthalimide, N-methylsuccinimide, N-methylglutarimide, N-methylmaleimide, N-methylphthalimide, N-ethylsuccinimide, N-ethylglutarimide, N-ethylmaleimide, N-ethylphthalimide, N-phenylsuccinimide, N-phenylglutarimide, N-phenylmaleimide, N-phenylphthalimide, N-benzylsuccinimide, N-benzylglutarimide, N-benzylmaleimide, N-benzylphthalimide, N-cyclohexylsuccinimide, N-cyclohexylglutarimide, N-cyclohexylmaleimide, N-cyclohexylphthalimide, tetrahydrophthalimide, 2-methylsuccinimide, 2-ethylmaleimide, ethosuximide, 3,3-tetramethyleneglutarimide, and 3,3-dimethylglutarimide.

Preferred among the preceding are succinic anhydride, glutaric anhydride, maleic anhydride, citraconic anhydride, itaconic anhydride, phthalic anhydride, 3,4,5,6-tetrahydrophthalic anhydride, succinimide, glutarimide, maleimide, phthalimide, N-methylsuccinimide, N-methylglutarimide, N-methylmaleimide, N-methylphthalimide, N-ethylsuccinimide, N-ethylglutarimide, N-ethylmaleimide, N-ethylphthalimide, N-phenylsuccinimide, N-phenylglutarimide, N-phenylmaleimide, and N-phenylphthalimide, while succinic anhydride, glutaric anhydride, maleic anhydride, citraconic anhydride, itaconic anhydride, phthalic anhydride, succinimide, glutarimide, maleimide, phthalimide, N-methylsuccinimide, N-methylglutarimide, N-methylmaleimide, and N-methylphthalimide are more preferred and succinic anhydride and maleic anhydride are most preferred.

These compounds are preferred for the following reasons: they keep down the cost of producing the electrolyte solution due to their ease of acquisition industrially, and, among compounds with general formula (1), they are easy to dissolve in non-aqueous electrolyte solutions.

The content in the non-aqueous electrolyte solution of the compound with general formula (1) in the non-aqueous electrolyte solution may be freely selected as long as the effects of the present inventions are not substantially impaired, but, expressed with reference to the total non-aqueous electrolyte solution, is generally at least 0.001 mass %, preferably at least 0.01 mass %, more preferably at least 0.05 mass %, and particularly preferably at least 0.1 mass % for the total of these compounds. The upper limit for the total of these compounds is generally not more than 10 mass %, preferably not more than 8 mass %, more preferably not more than 6 mass %, even more preferably not more than 5 mass %, particularly preferably not more than 4 mass %, and most preferably not more than 3 mass %. When the concentration of the compound with general formula (1) is in the indicated range, a decline in the battery capacity can be effectively prevented due to a more favorable development of the function at the electrode interface.

1-5. The Sulfoxides, Sulfites, Sulfones, Sulfonates, Sultones, and Sulfates

The group (A) compound in the first invention encompasses sulfoxides, sulfites, sulfones, sulfonates, sultones, and sulfates (also referred to in the following as sulfur compounds).

The sulfoxides can be specifically exemplified by dimethyl sulfoxide, diethyl sulfoxide, dipropyl sulfoxide, dibutyl sulfoxide, diphenyl sulfoxide, methyl phenyl sulfoxide, phenyl vinyl sulfoxide, and tetramethylene sulfoxide.

The sulfites can be specifically exemplified by dimethyl sulfite, diethyl sulfite, dipropyl sulfite, dibutyl sulfite, diphenyl sulfite, ethylene sulfite, and propylene sulfite.

The sulfones can be specifically exemplified by symmetric chain sulfones such as dimethyl sulfone, diethyl sulfone, dipropyl sulfone, diphenyl sulfone, divinyl sulfone, and di-2-propynyl sulfone; asymmetric chain sulfones such as methyl ethyl sulfone, methyl propyl sulfone, methyl phenyl sulfone, methyl vinyl sulfone, ethyl phenyl sulfone, ethyl vinyl sulfone, phenyl vinyl sulfone, methyl 2-propynyl sulfone, ethyl 2-propynyl sulfone, propyl 2-propynyl sulfone, 2-propynyl vinyl sulfone, 2-propenyl 2-propynyl sulfone, 3-butenyl 2-propynyl sulfone, 3-butenyl 2-propynyl sulfone, 1,1-dimethyl-2-propynyl vinyl sulfone, and 1,1-dimethyl-2-propynyl 2-propenyl sulfone; and cyclic sulfones such as sulfolane and sulfolene.

The sulfonates can be specifically exemplified by methyl methanesulfonate, ethyl methanesulfonate, phenyl methanesulfonate, methyl ethanesulfonate, ethyl ethanesulfonate, phenyl ethanesulfonate, methyl benzenesulfonate, ethyl benzenesulfonate, phenyl benzenesulfonate, busulfan, 1,4-butanediol bis(2,2,2-trifluoromethanesulfonate), 1,4-butanediol bis(2,2,2-trifluoroethanesulfonate), 1,2,4-butanetriol trimethanesulfonate, 2-propynyl methanesulfonate, 2-propynyl ethanesulfonate, 2-propynyl propanesulfonate, 2-propynyl p-toluenesulfonate, 2-propynyl cyclohexylsulfonate, 2-propynyl vinylsulfonate, 2-propynyl 2-propenylsulfonate, methyl 2-propynylsulfonate, ethyl 2-propynylsulfonate, butyl 2-propynylsulfonate, 2-propenyl 2-propynylsulfonate, 2-propynyl 2-propynylsulfonate, 1,1-dimethyl-2-propynyl methanesulfonate, 1,1-dimethyl-2-propynyl ethanesulfonate, 1,1-dimethyl-2-propynyl propanesulfonate, 1,1-dimethyl-2-propynyl p-toluenesulfonate, 1,1-dimethyl-2-propynyl cyclohexylsulfonate, 1,1-dimethyl-2-propynyl vinylsulfonate, 1,1-dimethyl-2-propynyl 2-propenylsulfonate, 2-pentynyl methanesulfonate, 3-pentynyl methanesulfonate, 4-pentynyl methanesulfonate, 2-butynyl vinylsulfonate, 3-butynyl vinylsulfonate, 2-pentynyl vinylsulfonate, 3-pentynyl vinylsulfonate, 4-pentynyl vinylsulfonate, 2-butynyl 2-propenylsulfonate, 3-butynyl 2-propenylsulfonate, 2-pentynyl 2-propenylsulfonate, 3-pentynyl 2-propenylsulfonate, 4-pentynyl 2-propenylsulfonate, 2-butynyl 2-propynylsulfonate, 3-butynyl 2-propynylsulfonate, 2-pentynyl 2-propynylsulfonate, 3-pentynyl 2-propynylsulfonate, 4-pentynyl 2-propynylsulfonate, 2-propynyl 2-oxoethanesulfonate, 2-propynyl 3-oxopropanesulfonate, 2-propynyl 4-oxobutanesulfonate, 2-propynyl 5-oxopentanesulfonate, 2-propynyl 6-oxohexanesulfonate, 2-propynyl 7-oxoheptanesulfonate, 2-propynyl 3-oxopropoxymethanesulfonate, 2-propynyl 2-oxopropanesulfonate, 2-propynyl 3-oxobutanesulfonate, 2-propynyl 4-oxopentanesulfonate, 2-propynyl 5-oxohexanesulfonate, 2-propynyl 6-oxoheptanesulfonate, 2-propynyl 7-oxooctanesulfonate, 2-propynyl 2-oxobutanesulfonate, 2-propynyl 3-oxopentanesulfonate, 2-propynyl 4-oxohexanesulfonate, 2-propynyl 5-oxoheptanesulfonate, 2-propynyl 6-oxooctanesulfonate, 2-propynyl 7-oxononanesulfonate, 2-propynyl 2-(3-oxobutoxy)ethanesulfonate, 2-propynyl methanesulfonylmethanesulfonate, 2-propynyl 2-(methanesulfonyl)ethanesulfonate, 2-propynyl 3-(methanesulfonyl)propanesulfonate, 2-propynyl 4-(methanesulfonyl)butanesulfonate, 2-propynyl 5-(methanesulfonyl)pentanesulfonate, 2-propynyl 6-(methanesulfonyl)hexanesulfonate, 2-propynyl ethanesulfonylmethanesulfonate, 2-propynyl 2-(ethanesulfonyl)ethanesulfonate, 2-propynyl 3-(ethanesulfonyl)propanesulfonate, 2-propynyl 4-(ethanesulfonyl)butanesulfonate, 2-propynyl 5-(ethanesulfonyl)pentanesulfonate, 2-propynyl 6-(ethanesulfonyl)hexanesulfonate, 2-propynyl trifluoromethanesulfonylmethanesulfonate, 2-propynyl 2-(trifluoromethanesulfonyl)ethanesulfonate, 2-propynyl 3-(trifluoromethanesulfonyl)propanesulfonate, 2-propynyl 4-(trifluoromethanesulfonyl)butanesulfonate, 2-propynyl 5-(trifluoromethanesulfonyl)pentanesulfonate, 2-propynyl 6-(trifluoromethanesulfonyl)hexanesulfonate, 2-propynyl 2-(2-(methanesulfonyl)ethoxy)ethanesulfonate, 2-propynyl benzenesulfonylmethanesulfonate, 2-propynyl 2-(benzenesulfonyl)ethanesulfonate, 2-propynyl 3-(benzenesulfonyl)propanesulfonate, 2-propynyl 4-(benzenesulfonyl)butanesulfonate, 2-propynyl 5-(benzenesulfonyl)pentanesulfonate, 2-propynyl 6-(benzenesulfonyl)hexanesulfonate, 2-propynyl 4-methylbenzenesulfonylmethanesulfonate, 2-propynyl 2-(4-methylbenzenesulfonyl)ethanesulfonate, 2-propynyl 3-(4-methylbenzenesulfonyl)propanesulfonate, 2-propynyl 4-(4-methylbenzenesulfonyl)butanesulfonate, 2-propynyl 5-(4-methylbenzenesulfonyl)pentanesulfonate, 2-propynyl 6-(4-methylbenzenesulfonyl)hexanesulfonate, 2-propynyl 4-fluorobenzenesulfonylmethanesulfonate, 2-propynyl 2-(4-fluorobenzenesulfonyl)ethanesulfonate, 2-propynyl 3-(4-fluorobenzenesulfonyl)propanesulfonate, 2-propynyl 4-(4-fluorobenzenesulfonyl)butanesulfonate, 2-propynyl 5-(4-fluorobenzenesulfonyl)pentanesulfonate, 2-propynyl 6-(4-fluorobenzenesulfonyl)hexanesulfonate, 2-propynyl 2-(2-benzenesulfonylethoxy)ethanesulfonate, 2-propynyl methoxysulfonylmethanesulfonate, 2-propynyl 2-(methoxysulfonyl)ethanesulfonate, 2-propynyl 3-(methoxysulfonyl)propanesulfonate, 2-propynyl 4-(methoxysulfonyl)butanesulfonate, 2-propynyl 5-(methoxysulfonyl)pentanesulfonate, 2-propynyl 6-(methoxysulfonyl)hexanesulfonate, 2-propynyl ethoxysulfonylmethanesulfonate, 2-propynyl 2-(ethoxysulfonyl)ethanesulfonate, 2-propynyl 3-(ethoxysulfonyl)propanesulfonate, 2-propynyl 4-(ethoxysulfonyl)butanesulfonate, 2-propynyl 5-(ethoxysulfonyl)pentanesulfonate, 2-propynyl 6-(ethoxysulfonyl)hexanesulfonate, 2-propynyl 2-(2-(methoxysulfonyl)ethoxy)ethanesulfonate, 2-propynyl 2-propenyloxysulfonylmethanesulfonate, 2-propynyl 2-(2-propenyloxysulfonyl)ethanesulfonate, 2-propynyl 3-(2-propenyloxysulfonyl)propanesulfonate, 2'-propynyl 4-(2-propenyloxysulfonyl)butanesulfonate, 2-propynyl 5-(2-propenyloxysulfonyl)pentanesulfonate, 2-propynyl 6-(2-propenyloxysulfonyl)hexanesulfonate, 2-propynyl 2-(2-(2-propenyloxysulfonyl)ethoxy)ethanesulfonate, 2-propynyl dimethoxyphosphorylmethanesulfonate, 2-propynyl 2-(dimethoxyphosphoryl)ethanesulfonate, 2-propynyl 3-(dimethoxyphosphoryl)propanesulfonate, 2-propynyl 4-(dimethoxyphosphoryl)butanesulfonate, 2-propynyl 5-(dimethoxyphosphoryl)pentanesulfonate, 2-propynyl 6-(dimethoxyphosphoryl)hexanesulfonate, 2-propynyl diethoxyphosphorylmethanesulfonate, 2-propynyl 2-(diethoxyphosphoryl)ethanesulfonate, 2-propynyl 3-(diethoxyphosphoryl)propanesulfonate, 2-propynyl 4-(diethoxyphosphoryl)butanesulfonate, 2-propynyl 5-(diethoxyphosphoryl)pentanesulfonate, 2-propynyl 6-(diethoxyphosphoryl)hexanesulfonate, 2-propynyl 2-(2-(dimethoxyphosphoryl)ethoxy)ethanesulfonate, 2-propynyl methoxy(methyl)phosphorylmethanesulfonate, 2-propynyl 2-(methoxy(methyl)phosphoryl)ethanesulfonate, 2-propynyl 3-(methoxy(methyl)phosphoryl)propanesulfonate, 2-propynyl 4-(methoxy(methyl)phosphoryl)butanesulfonate, 2-propynyl 5-(methoxy(methyl)phosphoryl)pentanesulfonate, 2-propynyl 6-(methoxy(methyl)phosphoryl)hexanesulfonate, 2-propynyl 2-(2-(methoxy(methyl)phosphoryl)ethoxy)ethanesulfonate, 2-propynyl ethoxy(methyl)phosphorylmethanesulfonate, 2-propynyl 2-(ethoxy(methyl)phosphoryl)ethanesulfonate, 2-propynyl 3-(ethoxy(methyl)phosphoryl)propanesulfonate, 2-propynyl ethyl(methoxy)phosphorylmethanesulfonate, 2-propynyl 2-(ethyl(methoxy)phosphoryl)ethanesulfonate, 2-propynyl 3-(ethyl(methoxy)phosphoryl)propanesulfonate, 2-propynyl dimethylphosphorylmethanesulfonate, 2-propynyl 2-(dimethylphosphoryl)ethanesulfonate, 2-propynyl 3-(dimethylphosphoryl)propanesulfonate, 2-propynyl 4-(dimethylphosphoryl)butanesulfonate, 2-propynyl 5-(dimethylphosphoryl)pentanesulfonate, 2-propynyl 6-(dimethylphosphoryl)hexanesulfonate, 2-propynyl 2-(2-(dimethylphosphoryl)ethoxy)ethanesulfonate, 2-propynyl methoxymethanesulfonate, 2-propynyl 2-methoxyethanesulfonate, 2-propynyl 3-methoxypropanesulfonate, 2-propynyl 4-methoxybutanesulfonate, 2-propynyl 5-methoxypentanesulfonate, 2-propynyl 6-methoxyhexanesulfonate, 2-propynyl ethoxymethanesulfonate, 2-propynyl 2-ethoxyethanesulfonate, 2-propynyl 3-ethoxypropanesulfonate, 2-propynyl 4-ethoxybutanesulfonate, 2-propynyl 5-ethoxypentanesulfonate, 2-propynyl 6-ethoxyhexanesulfonate, 2-propynyl 2-(2-methoxyethoxy)ethanesulfonate, 2-propynyl formyloxymethanesulfonate, 2-propynyl 2-(formyloxy)ethanesulfonate, 2-propynyl 3-(formyloxy)propanesulfonate, 2-propynyl 4-(formyloxy)butanesulfonate, 2-propynyl 5-(formyloxy)pentanesulfonate, 2-propynyl 6-(formyloxy)hexanesulfonate, 2-propynyl 2-(2-formyloxy)ethoxy)ethanesulfonate, 2-propynyl acetyloxymethanesulfonate, 2-propynyl 2-(acetyloxy)ethanesulfonate, 2-propynyl 3-(acetyloxy)propanesulfonate, 2-propynyl 4-(acetyloxy)butanesulfonate, 2-propynyl 5-(acetyloxy)pentanesulfonate, 2-propynyl 6-(acetyloxy)hexanesulfonate, 2-propynyl propionyloxymethanesulfonate, 2-propynyl 2-(propionyloxy)ethanesulfonate, 2-propynyl 3-(propionyloxy)propanesulfonate, 2-propynyl 4-(propionyloxy)butanesulfonate, 2-propynyl 5-(propionyloxy)pentanesulfonate, 2-propynyl 6-(propionyloxy)hexanesulfonate, 2-propynyl 2-(2-(acetyloxy)ethoxy)ethanesulfonate, 2-propynyl methanesulfonyloxymethanesulfonate, 2-propynyl 2-(methanesulfonyloxy)ethanesulfonate, 2-propynyl 3-(methanesulfonyloxy)propanesulfonate, 2-propynyl 4-(methanesulfonyloxy)butanesulfonate, 2-propynyl 5-(methanesulfonyloxy)pentanesulfonate, 2-propynyl 6-(methanesulfonyloxy)hexanesulfonate, 2-propynyl ethanesulfonyloxymethanesulfonate, 2-propynyl 2-(ethanesulfonyloxy)ethanesulfonate, 2-propynyl 3-(ethanesulfonyloxy)propanesulfonate, 2-propynyl 4-(ethanesulfonyloxy)butanesulfonate, 2-propynyl 5-(ethanesulfonyloxy)pentanesulfonate, 2-propynyl 5-(ethanesulfonyloxy)hexanesulfonate, 2-propynyl trifluoromethanesulfonyloxymethanesulfonate, 2-propynyl 2-(trifluoromethanesulfonyloxy)ethanesulfonate, 2-propynyl 3-(trifluoromethanesulfonyloxy)propanesulfonate, 2-propynyl 4-(trifluoromethanesulfonyloxy)butanesulfonate, 2-propynyl 5-(trifluoromethanesulfonyloxy)pentanesulfonate, 2-propynyl 6-(trifluoromethanesulfonyloxy)hexanesulfonate, 2-propynyl 2-(2-(methanesulfonyloxy)ethoxy)ethanesulfonate, 2-propynyl dimethoxyphosphoryloxymethanesulfonate, 2-propynyl 2-(dimethoxyphosphoryloxy)ethanesulfonate, 2-propynyl 3-(dimethoxyphosphoryloxy)propanesulfonate, 2-propynyl 4-(dimethoxyphosphoryloxy)butanesulfonate, 2-propynyl 5-(dimethoxyphosphoryloxy)pentanesulfonate, 2-propynyl 6-(dimethoxyphosphoryloxy)hexanesulfonate, 2-propynyl diethoxyphosphoryloxymethanesulfonate, 2-propynyl 2-(diethoxyphosphoryloxy)ethanesulfonate, 2-propynyl 3-(diethoxyphosphoryloxy)propanesulfonate, 2-propynyl 4-(diethoxyphosphoryloxy)butanesulfonate, 2-propynyl 5-(diethoxyphosphoryloxy)pentanesulfonate, 2-propynyl 6-(diethoxyphosphoryloxy)hexanesulfonate, 2-propynyl 2-(2-(dimethoxyphosphoryloxy)ethoxy)ethanesulfonate, 2-propynyl methoxy(methyl)phosphoryloxymethanesulfonate, 2-propynyl 2-(methoxy(methyl)phosphoryloxy)ethanesulfonate, 2-propynyl 3-(methoxy(methyl)phosphoryloxy)propanesulfonate, 2-propynyl 4-(methoxy(methyl)phosphoryloxy)butanesulfonate, 2-propynyl 5-(methoxy(methyl)phosphoryloxy)pentanesulfonate, 2-propynyl 6-(methoxy(methyl)phosphoryloxy)hexanesulfonate, 2-propynyl 2-(2-(methoxy(methyl)phosphoryloxy)ethoxy)ethanesulfonate, 2-propynyl ethoxy(methyl)phosphoryloxymethanesulfonate, 2-propynyl 2-(ethoxy(methyl)phosphoryloxy)ethanesulfonate, 2-propynyl 3-(ethoxy(methyl)phosphoryloxy)propanesulfonate, 2-propynyl ethyl (methoxy)phosphoryloxymethanesulfonate, 2-propynyl 2-(ethyl(methoxy)phosphoryloxy)ethanesulfonate, 2-propynyl 3-(ethyl(methoxy)phosphoryloxy)propanesulfonate, 2-propynyl dimethylphosphoryloxymethanesulfonate, 2-propynyl 2-(dimethylphosphoryloxy)ethanesulfonate, 2-propynyl 3-(dimethylphosphoryloxy)propanesulfonate, 2-propynyl 4-(dimethylphosphoryloxy)butanesulfonate, 2-propynyl 5-(dimethylphosphoryloxy)pentanesulfonate, 2-propynyl 6-(dimethylphosphoryloxy)hexanesulfonate, 2-propynyl 2-(2-(dimethylphosphoryloxy)ethoxy)ethanesulfonate, 2-butyne-1,4-diol dimethanesulfonate, 2-butyne-1,4-diol dipropanesulfonate, 2-butyne-1,4-diol di-p-toluenesulfonate, 2-butyne-1,4-diol dicyclohexanesulfonate, 2-butyne-1,4-diol divinylsulfonate, 2-butyne-1,4-diol diallylsulfonate, 2-butyne-1,4-diol dipropynylsulfonate, di(2-propynyl) methane-1,1-disulfonate, di(2-propynyl)ethane-1,2-disulfonate, di(2-propynyl) propane-1,3-disulfonate, di(2-propynyl) butane-1,4-disulfonate, di(2-propynyl)pentane-1,5-disulfonate, di(2-propynyl) hexane-1,6-disulfonate, di(2-propynyl) 2,2'-oxydiethanesulfonate, 2-propynyl 2-(methanesulfonyloxy)propionate, 3-butynyl 2-(methanesulfonyloxy)propionate, 2-propynyl methanesulfonyloxyacetate, and 3-butynyl methanesulfonyloxyacetate.

The sultones can be specifically exemplified by 1,3-propane sultone, 1,3-propene sultone, 1,4-butane sultone, and 1,4-butene sultone.

The sulfates can be exemplified by dimethyl sulfate, diethyl sulfate, dipropyl sulfate, dibutyl sulfate, diamyl sulfate, diphenyl sulfate, 1,3,2-dioxathiolane 2,2-dioxide, 1,3,2-dioxathiane 2,2-dioxide, methyl 2-propynyl sulfate, ethyl 2-propynyl sulfate, propyl 2-propynyl sulfate, vinyl 2-propynyl sulfate, 2-propenyl 2-propynyl sulfate, di-2-propynyl sulfate, 2-propenyl 1,1-dimethyl-2-propynyl sulfate, 3-butenyl 2-propynyl sulfate, and 3-butenyl 1,1-dimethyl-2-propynyl sulfate.

Viewed from the perspective of achieving a high stability for the hybrid film formed in combination with the compound having at least two isocyanate groups in the molecule, dimethyl sulfoxide; diethyl sulfoxide; dimethyl sulfite; ethylene sulfite; methyl sulfones such as dimethyl sulfone, methyl ethyl sulfone, methyl propyl sulfone, and methyl vinyl sulfone; divinyl sulfone; methanesulfonates such as methyl methanesulfonate, ethyl methanesulfonate, phenyl methanesulfonate, and 2-propynyl methanesulfonate; unsaturated sulfonates such as 2-propynyl vinylsulfonate and 2-propynyl 2-propenylsulfonate; disulfonates such as busulfan, 1,4-butanediol bis(2,2,2-trifluoromethanesulfonate), 1,4-butanediol bis(2,2,2-trifluoroethanesulfonate), 2-butyne-1,4-diol dimethanesulfonate, 2-butyne-1,4-diol divinylsulfonate, and 2-butyne-1,4-diol diallylsulfonate; and 1,3-propane sultone, 1,3-propene sultone, dimethyl sulfate, and 1,3,2-dioxathiolane 2,2-dioxide are preferred among the preceding, while dimethyl sulfite; ethylene sulfite; methyl sulfones such as dimethyl sulfone, methyl ethyl sulfone, methyl propyl sulfone, and methyl vinyl sulfone; divinyl sulfone; methanesulfonates such as methyl methanesulfonate, ethyl methanesulfonate, and phenyl methanesulfonate; disulfonates such as busulfan, 1,4-butanediol bis(2,2,2-trifluoromethanesulfonate), and 1,4-butanediol bis(2,2,2-trifluoroethanesulfonate); and 1,3-propane sultone and 1,3-propene sultone are particularly preferred.

The abovementioned sulfur compounds may be used singly as one type, or as two or more concurrent types in any combinations and ratios.

The content of the sulfur compound in the present invention, expressed with reference to the total mass of the non-aqueous electrolyte solution, is generally at least 0.001 mass %, preferably at least 0.01 mass %, more preferably at least 0.1 mass %, even more preferably at least 0.3 mass %, particularly preferably at least 0.5 mass %, and most preferably at least 1.0 mass %, and is generally not more than 10 mass %, preferably not more than 8 mass %, more preferably not more than 5 mass %, even more preferably not more than 4 mass %, and particularly preferably not more than 3 mass %. The resistance of the negative electrode undergoes an increase and the capacity declines when the content is too large. The effects of the present invention may not be satisfactorily manifested when the content is too small.

1-6. Electrolyte

<Lithium Salt>

A lithium salt is ordinarily used as the electrolyte. The electrolyte is not particularly limited and any lithium salt can be used, so long as it is a known lithium salt that is utilized in the application in question. Specific examples of the lithium salt are given below.

Examples are inorganic lithium salts such as $LiPF_6$, $LiBF_4$, $LiClO_4$, $LiAlF_4$, $LiSbF_6$, $LiTaF_6$, and $LiWF_7$; lithium tungstates such as $LiWOF_5$; lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$ $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, and $LiN(CF_3SO_2)(C_4F_9SO_2)$; lithium methide salts such as $LiC(FSO_2)_3$, $LiC(CF_3SO_2)_3$, and $LiC(C_2F_5SO_2)_3$; the lithium salts of dicarboxylic acid-containing complexes, such as lithium difluoro(oxalato)borate, lithium bis(oxalato)borate, lithium tetrafluoro(oxalato)phosphate, lithium difluorobis(oxalato) phosphate, lithium tris(oxalato)phosphate, lithium bis(malonato)borate, lithium difluoro(malonato)borate, lithium tris(malonato)phosphate, lithium difluorobis(malonato) phosphate, lithium tetrafluoro(malonato)phosphate, lithium bis(methyl malonato)borate, lithium difluoro(methyl malonato)borate, lithium tris(methyl malonato)phosphate, lithium difluorobis(methyl malonato)phosphate, lithium tetrafluoro(methyl malonato)phosphate, lithium bis(dimethyl malonato)borate, lithium difluoro(dimethyl malonato)borate, lithium tris(dimethyl malonato)phosphate, lithium difluorobis(dimethyl malonato)phosphate, and lithium tetrafluoro(dimethyl malonato)phosphate; and also fluorine-containing organolithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Particularly preferred among the foregoing are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$ and the like, in terms of the effect of enhancing the output characteristic, high-rate charge-discharge characteristic, high-temperature storage characteristic, cycle characteristic and the like.

The above lithium salts may be used singly or concomitantly in combinations of two or more types. A preferred example of the use of two or more of these lithium salts in combination is the use of $LiPF_6$ with $LiBF_4$ or $LiPF_6$ with $FSO_3Li$; this has the effect of improving the load characteristics and cycle characteristics.

In this case, there are no limitations on the concentration of the $LiBF_4$ or $FSO_3Li$ with respect to 100 mass % of the total non-aqueous electrolyte solution, and this concentration may be freely selected as long as the effects of the present invention are not substantially impaired. However, expressed with reference to the non-aqueous electrolyte solution of the present invention, this concentration is generally at least 0.01 mass % and preferably at least 0.1 mass % and is generally not more than 30 mass % and preferably not more than 20 mass %.

Another example is the use of an inorganic lithium salt in combination with an organolithium salt; the use of this combination has the effect of inhibiting the deterioration induced by storage at high temperatures. Preferred organic lithium salts are $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$ and the like.

In this case, the concentration of the organolithium salt, with respect to 100 mass % of the non-aqueous electrolyte solution as a whole, is preferably at least 0.1 mass % and particularly preferably at least 0.5 mass % and preferably not more than 30 mass % and particularly preferably not more than 20 mass %.

The concentration of these lithium salts in the non-aqueous electrolyte solution is not particularly limited as long as the effects of the present invention are not impaired, but viewed from the perspective of bringing the electrical conductivity of the electrolyte solution into a favorable range and ensuring a favorable battery performance, the total molar concentration of the lithium in the non-aqueous electrolyte solution is preferably at least 0.3 mol/L, more preferably at least 0.4 mol/L, and even more preferably at least 0.5 mol/L and preferably not more than 3 mol/L, more preferably not more than 2.5 mol/L, and even more preferably not more than 2.0 mol/L. If the total molar concentration of lithium is excessively low, the electrical conductivity of the electrolyte solution may be insufficient in some instances. If the concentration is excessively high, on the other hand, viscosity becomes higher, and hence electric conductance may decrease, and battery performance may decrease.

1-7. Nonaqueous Solvent

The nonaqueous solvent of the present invention is not particularly limited, and publicly-known organic solvent can be used. Examples of the publicly-known organic solvent, for instance, includes cyclic carbonates having no fluorine atom, linear carbonates, cyclic and linear carboxylates, ether compounds, sulfone compounds and the like.

<Cyclic Carbonate Having No Fluorine Atom>

The fluorine-free cyclic carbonate can be exemplified by cyclic carbonates having a $C_{2-4}$ alkylene group.

Specific examples of fluorine-free cyclic carbonates having a $C_{2-4}$ alkylene group can be exemplified by ethylene carbonate, propylene carbonate, and butylene carbonate. Particularly preferred among the foregoing are ethylene carbonate and propylene carbonate, in terms of enhancing battery characteristics as a result of an enhanced degree of dissociation of lithium ions.

The cyclic carbonate having no fluorine atom may be used singly as one type, or as two or more concurrent types in any combinations and ratios.

The amount of incorporation of the cyclic carbonate having no fluorine atom is not particularly limited, and may be any amount of incorporation so long as the effect of the present invention is not significantly impaired thereby. In a case where one type of saturated cyclic carbonate is used singly, the amount of incorporation is ordinarily 5 vol % or more, and more preferably 10 vol % or more, with respect to 100 vol % of nonaqueous solvent. Through setting of this range, drops in electrical conductivity derived from decreased permittivity of the nonaqueous electrolyte solution are readily avoided, and the large-current discharge characteristic, stability towards the negative electrode and cycle characteristic of the nonaqueous electrolyte battery are readily brought to within good ranges. The amount of incorporation is ordinarily 95 vol % or less, preferably 90 vol % or less, and more preferably 85 vol % or less. By setting these ranges, the viscosity of the nonaqueous electrolyte solution is brought to within an appropriate range and drops in ion conductance are suppressed; accordingly, the load characteristic of the nonaqueous electrolyte battery is readily brought to within a good range.

Linear Carbonate

The linear carbonates preferably include linear carbonates having 3 to 7 carbons, more preferably dialkyl carbonates having 3 to 7 carbons.

Specific examples of the linear carbonates include, for instance, dimethyl carbonate, diethyl carbonate, di-n-propyl carbonate, diisopropyl carbonate, n-propylisopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butylethyl carbonate, isobutylethyl carbonate, t-butylethyl carbonate and the like.

Among the foregoing are dimethyl carbonate, diethyl carbonate, di-n-propyl carbonate, diisopropyl carbonate, n-propylisopropyl carbonate, ethyl methyl carbonate and methyl-n-propyl carbonate are preferred, and dimethyl carbonate, diethyl carbonate and ethyl methyl carbonate are particularly preferred.

A fluorine atom-containing linear carbonate (hereinafter may be referred to as fluorinated linear carbonate) may also be used appropriately.

The number of fluorine atoms in the fluorinated linear carbonate is not particularly limited, so long as it is one or more, and is ordinarily 6 or less, preferably 4 or less. If the fluorinated linear carbonate has a plurality of fluorine atoms, the fluorine atoms may be mutually bonded to a same carbon, or may be bonded to different carbons.

Examples of fluorinated linear carbonates include, for instance, fluorinated dimethyl carbonates and derivatives thereof, fluorinated ethyl methyl carbonates and derivatives thereof, fluorinated diethyl carbonates and derivatives thereof and the like.

Examples of fluorinated dimethyl carbonates and derivatives thereof include, for instance, fluoromethyl methyl carbonate, difluoromethyl methyl carbonate, trifluoromethyl methyl carbonate, bis(fluoromethyl)carbonate, bis(difluoro) methyl carbonate, bis(trifluoromethyl)carbonate and the like.

Examples of fluorinated ethyl methyl carbonates and derivatives thereof include, for instance, 2-fluoroethyl methyl carbonate, ethylfluoromethyl carbonate, 2,2-difluoroethyl methyl carbonate, 2-fluoroethylfluoromethyl carbonate, ethyldifluoromethyl carbonate, 2,2,2-trifluoroethyl methyl carbonate, 2,2-difluoroethylfluoromethyl carbonate, 2-fluoroethyldifluoromethyl carbonate, ethyltrifluoromethyl carbonate and the like.

Examples of fluorinated diethyl carbonates and derivatives thereof include, for instance, ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate and the like.

The linear carbonate may be used singly as one type, or as two or more concurrent types in any combinations and ratios.

The amount of incorporation of the linear carbonate is preferably 5 vol % or more, more preferably 10 vol % or more, and even more preferably 15 vol % or more with respect to 100 vol % of nonaqueous solvent. Setting such a lower limit has the effect of bringing the viscosity of the nonaqueous electrolyte solution to within an appropriate range, and of suppressing drops in ion conductance; accordingly, the large-current discharge characteristic of the nonaqueous electrolyte battery can be readily brought to within a good range. The amount of incorporation of the linear carbonate is preferably 90 vol % or less, more preferably 85 vol % or less, with respect to 100 vol % of nonaqueous solvent. By setting such an upper limit, drops in electrical conductivity derived from decreased permittivity of the nonaqueous electrolyte solution are avoided, and the large-current discharge characteristic nonaqueous electrolyte battery can be readily brought to within a good range.

<Cyclic Carboxylic Acid Ester>

The preferred cyclic carboxylic acid esters are cyclic carboxylic acid esters having 3 to 12 carbon atoms.

Specific examples thereof include, for instance, gamma-butyrolactone, gamma-valerolactone, gamma-caprolactone, epsilon-caprolactone and the like. Particularly preferred among the foregoing is gamma-butyrolactone, in terms of enhancing battery characteristics as a result of an enhanced degree of dissociation of lithium ions.

The cyclic carboxylic acid ester may be used singly as one type, or as two or more concurrent types in any combinations and ratios.

Ordinarily, the amount of incorporation of the cyclic carboxylic acid ester is preferably 5 vol % or more, and more preferably 10 vol % or more with respect to 100 vol % of nonaqueous solvent. Within these ranges, the electrical conductivity of the nonaqueous electrolyte solution is improved, and the large-current discharge characteristic of the nonaqueous electrolyte battery is readily enhanced. The amount of incorporation of the cyclic carboxylic acid ester is preferably 50 vol % or less, and more preferably 40 vol % or less. By setting such an upper limit, the viscosity of the nonaqueous electrolyte solution is brought to within an appropriate range, drops in electrical conductivity are avoided, increases in negative electrode resistance are suppressed, and the large-current discharge characteristic of the nonaqueous electrolyte secondary battery is readily brought to within a good range.

<Linear Carboxylic Acid Ester>

The linear carboxylic acid ester is preferably a linear carboxylic acid ester having 3 to 7 carbons.

Specific examples thereof include, for instance, methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, isopropyl isobutyrate and the like.

Among the foregoing, methyl acetate, ethyl acetate, n-propyl acetate, n-butyl acetate, methyl propionate, ethyl propionate, n-propyl propionate, isopropyl propionate, methyl butyrate, ethyl butyrate and the like are preferred in terms of enhancing ion conductance through lowered viscosity.

The linear carboxylic acid ester may be used singly as one type, or as two or more concurrent types in any combinations and ratios.

Ordinarily, the amount of incorporation of the linear carboxylic acid ester is preferably 10 vol % or more, more preferably 15 vol % or more with respect to 100 vol % of nonaqueous solvent. By setting such a lower limit, the electrical conductivity of the nonaqueous electrolyte solution is improved, and the large-current discharge characteristic of the nonaqueous electrolyte battery is readily enhanced. The amount of incorporation of the linear carboxylic acid ester is preferably 60 vol % or less, more preferably 50 vol % or less, with respect to 100 vol % of nonaqueous solvent. By setting such an upper limit, increases in negative electrode resistance are suppressed, and the large-current discharge characteristic, as well as the cycle characteristic of the nonaqueous electrolyte battery, are readily brought to within good ranges.

<Ether Compound>

The ether compound is preferably a linear ether having 3 to 10 carbons or a cyclic ether having 3 to 6 carbons in which some of hydrogen atoms are optionally substituted with fluorine.

The chain ethers having 3 to 10 carbons can be exemplified by diethyl ether, di(2-fluoroethyl)ether, di(2,2-difluoroethyl)ether, di(2,2,2-trifluoroethyl)ether, ethyl(2-fluoroethyl)ether, ethyl(2,2,2-trifluoroethyl)ether, ethyl(1,1,2,2-tetrafluoroethyl)ether, (2-fluoroethyl)(2,2,2-trifluoroethyl) ether, (2-fluoroethyl)(1,1,2,2-tetrafluoroethyl)ether, (2,2,2-trifluoroethyl)(1,1,2,2-tetrafluoroethyl)ether, ethyl n-propyl ether, ethyl (3-fluoro-n-propyl)ether, ethyl (3,3,3-trifluoro-n-propyl) ether, ethyl (2,2,3,3-tetrafluoro-n-propyl)ether, ethyl (2,2,3,3,3-pentafluoro-n-propyl)ether, 2-fluoroethyl n-propyl ether, (2-fluoroethyl)(3-fluoro-n-propyl)ether, (2-fluoroethyl)(3,3,3-trifluoro-n-propyl)ether, (2-fluoroethyl) (2,2,3,3-tetrafluoro-n-propyl)ether, (2-fluoroethyl) (2,2,3,3,3-pentafluoro-n-propyl)ether, 2,2,2-trifluoroethyl n-propyl ether, (2,2,2-trifluoroethyl)(3-fluoro-n-propyl) ether, (2,2,2-trifluoroethyl)(3,3,3-trifluoro-n-propyl) ether, (2,2,2-trifluoroethyl)(2,2,3,3-tetrafluoro-n-propyl) ether, (2,2,2-trifluoroethyl)(2,2,3,3,3-pentafluoro-n-propyl) ether, 1,1,2,2-tetrafluoroethyl n-propyl ether, (1,1,2,2-tetrafluoroethyl)(3-fluoro-n-propyl)ether, (1,1,2,2-tetrafluoroethyl)(3,3,3-trifluoro-n-propyl)ether, (1,1,2,2-tetrafluoroethyl)(2,2,3,3-tetrafluoro-n-propyl)ether, (1,1,2,2-tetrafluoroethyl)(2,2,3,3,3-pentafluoro-n-propyl) ether, di-n-propyl ether, (n-propyl)(3-fluoro-n-propyl) ether, (n-propyl)(3,3,3-trifluoro-n-propyl)ether, (n-propyl)(2,2,3,3-tetrafluoro-n-propyl)ether, (n-propyl)(2,2,3,3,3-pentafluoro-n-propyl)ether, di(3-fluoro-n-propyl)ether, (3-fluoro-n-propyl)(3,3,3-trifluoro-n-propyl)ether, (3-fluoro-n-propyl)(2,2,3,3-tetrafluoro-n-propyl)ether, (3-fluoro-n-propyl)(2,2,3,3,3-pentafluoro-n-propyl)ether, di(3,3,3-trifluoro-n-propyl)ether, (3,3,3-trifluoro-n-propyl)(2,2,3,3-tetrafluoro-n-propyl)ether, (3,3,3-trifluoro-n-propyl)(2,2,3,3,3-pentafluoro-n-propyl) ether, di(2,2,3,3-tetrafluoro-n-propyl)ether, (2,2,3,3-tetrafluoro-n-propyl)(2,2,3,3,3-pentafluoro-n-propyl)ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy) methane, methoxy(1,1,2,2-tetrafluoroethoxy)methane, diethoxymethane, ethoxy(2-fluoroethoxy)methane, ethoxy (2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy) (1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy) methane, dimethoxyethane, methoxyethoxyethane, methoxy (2-fluoroethoxy)ethane, methoxy(2,2,2-trifluoroethoxy) ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy) ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Specific examples of cyclic ethers having 3 to 6 carbons include, for instance, tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and the like, and fluorinated compounds of the foregoing.

Among the foregoing, dimethoxymethane, diethoxymethane, ethoxymethoxymethane, ethylene glycol di-n-propyl ether, ethylene glycol di-n-butyl ether and diethylene glycol dimethyl ether are preferred in terms of enhancing ion dissociation ability by virtue of their high solvating power on lithium ions. Among the foregoing, dimethoxymethane, diethoxymethane and ethoxymethoxymethane are particularly preferred on account of their low viscosity and the high ion conductance that they impart.

The ether compound may be used singly as one type, or as two or more concurrent types in any combinations and ratios.

Ordinarily, the amount of incorporation of the ether compound is preferably 5 vol % or more, more preferably 10 vol % or more and even more preferably 15 vol % or more, and preferably 70 vol % or less, more preferably 60 vol % or less and even more preferably 50 vol % or less, with respect to 100 vol % of nonaqueous solvent.

Within such ranges, there is readily secured the enhancing effect on ion conductance, derived from an enhanced degree of dissociation of lithium ions and a drop in viscosity, that is exerted by the linear ether. In the case where the negative electrode active material is a carbonaceous material, the linear ether is co-intercalated together with lithium ions. Drops in capacity are likelier to be avoided as a result.

<Sulfone Compound>

The sulfone compound is preferably a cyclic sulfone having 3 to 6 carbons or a linear sulfone having 2 to 6 carbons. The number of sulfonyl groups in one molecule is preferably 1 or 2.

Examples of cyclic sulfones having 3 to 6 carbons include, for instance, trimethylene sulfones, tetramethylene sulfones and hexamethylene sulfones, which are monosulfone compounds; and trimethylene disulfones, tetramethylene disulfones, hexamethylene disulfones and the like, which are disulfone compounds.

Among the foregoing, in terms of permittivity and viscosity, tetramethylene sulfones, tetramethylene disulfones, hexamethylene sulfones and hexamethylene disulfones are more preferred, and tetramethylene sulfones (sulfolanes) are particularly preferred.

The sulfolane is preferably sulfolane and/or a sulfolane derivative (hereinafter may be referred to as "sulfolanes" such as sulfolane). The sulfolane derivative is preferably a sulfolane derivative wherein one or more hydrogen atoms bonded to the carbon atoms that make up the sulfolane ring are substituted with a fluorine atom or an alkyl group.

Among the foregoing, 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)

sulfolane, 4-fluoro-3-(trifluoromethyl)sulfolane, 5-fluoro-3-(trifluoromethyl)sulfolane and the like are preferred, in terms of high ion conductance and high input/output characteristics.

Examples of linear sulfones having 2 to 6 carbons include, for instance, dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, pentafluoroethyl-t-butyl sulfone and the like.

Preferred among the foregoing are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, trifluoromethyl-t-butyl sulfone and the like, in terms of high ion conductance and high input and output characteristics.

The sulfone compound may be used singly as one type, or as two or more concurrent types in any combinations and ratios.

The amount of incorporation of sulfone compound with respect to 100 volume % of the non-aqueous solvent is generally preferably 0.3 volume % or more, more preferably 1 volume % or more, and even more preferably 5 volume % or more and preferably 40 volume % or less, more preferably 35 volume % or less, and even more preferably 30 volume % or less. Within these ranges, an enhancing effect on durability in terms of cycle characteristic and storage characteristic and the like is readily achieved, the viscosity of the nonaqueous electrolyte solution can be brought to within an appropriate range, and drops in electrical conductivity can be avoided; also, drops in the charge-discharge capacity retention rate can be readily avoided, in a case where the nonaqueous electrolyte battery is charged and discharged at a high current density.

<Composition of the Non-Aqueous Solvent when the Fluorine Atom-Containing Cyclic Carbonate is Used as an Auxiliary Agent>

When the fluorine atom-containing cyclic carbonate is used as an auxiliary agent in the present invention, a single one of the non-aqueous solvents provided above as examples may be used by itself as the non-aqueous solvent in addition to the fluorine atom-containing cyclic carbonate, or two or more may be used in combination using any combination and proportions.

An example of a preferred combination for the non-aqueous solvent is a combination composed mainly of a fluorine-free cyclic carbonate and a chain carbonate.

Here, the total amount of the fluorine-free cyclic carbonate and chain carbonate in the non-aqueous solvent is preferably 70 volume % or more, more preferably 80 volume % or more, and even more preferably 90 volume % or more, while the percentage for the fluorine-free cyclic carbonate relative to the total content of the cyclic carbonate and chain carbonate is preferably 5 volume % or more, more preferably 10 volume % or more, and even more preferably 15 volume % or more and preferably 50 volume % or less, more preferably 35 volume % or less, even more preferably 30 volume % or less, and particularly preferably 25 volume % or less.

The use of a combination of these non-aqueous solvents can provide a favorable balance, for a battery fabricated using such a combination, between the cycle characteristics and the high-temperature storage characteristics (particularly the residual capacity after high-temperature storage and the high-load discharge capacity).

Specific examples of preferred combinations of the fluorine-free cyclic carbonate and chain carbonate are as follows: ethylene carbonate+dimethyl carbonate, ethylene carbonate+diethyl carbonate, ethylene carbonate+ethyl methyl carbonate, ethylene carbonate+dimethyl carbonate+diethyl carbonate, ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate.

Among the fluorine-free cyclic carbonate+chain carbonate combinations, combinations having an asymmetric chain alkyl carbonate for the chain carbonate are even more preferred, and combinations containing an ethylene carbonate, a symmetric chain carbonate and an asymmetric chain carbonate, e.g., ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate, are particularly preferred because they provide a good balance between the cycle characteristics and the high-current discharge characteristics.

Among the preceding, ethyl methyl carbonate is preferred for the asymmetric chain carbonate and the alkyl group in the chain carbonate preferably has 1 or 2 carbons.

Combinations provided by the further addition of propylene carbonate to these ethylene carbonate+chain carbonate combinations are also preferred combinations.

In those instances in which propylene carbonate is incorporated, the proportion by volume between the ethylene carbonate and propylene carbonate is preferably 99:1 to 40:60 and is particularly preferably 95:5 to 50:50. The percentage of the propylene carbonate in the overall non-aqueous solvent is preferably 0.1 volume % or more, more preferably 1 volume % or more, and even more preferably 2 volume % or more and preferably 20 volume % or less, more preferably 8 volume % or less, and even more preferably 5 volume % or less.

The incorporation of propylene carbonate in this range of the concentration is preferred because this enables the characteristics of the ethylene carbonate+chain carbonate combination to be retained intact while also providing excellent low-temperature characteristics.

When dimethyl carbonate is incorporated in the non-aqueous solvent, the load characteristics of the battery can be improved when the percentage of dimethyl carbonate incorporation in the total non-aqueous solvent is in the range of preferably 10 volume % or more, more preferably 20 volume % or more, even more preferably 25 volume % or more, and particularly preferably 30 volume % or more and preferably 90 volume % or less, more preferably 80 volume % or less, even more preferably 75 volume % or less, and particularly preferably 70 volume % or less.

Among the preceding, the battery characteristics after high-temperature storage can be improved—while maintaining the electrical conductivity of the electrolyte solution—by incorporating dimethyl carbonate and ethyl methyl carbonate and having the percentage content of the dimethyl carbonate be larger than the percentage content of the ethyl methyl carbonate, and this is therefore preferred.

Viewed from the perspective of improving the electrical conductivity of the electrolyte solution and improving the battery characteristics after storage, the proportion by volume of the dimethyl carbonate to the ethyl methyl carbonate (dimethyl carbonate/ethyl methyl carbonate) in the overall non-aqueous solvent is preferably 1.1 or more, more preferably 1.5 or more, and even more preferably 2.5 or more. Viewed from the perspective of improving the low-temperature battery characteristics, this proportion by volume (dimethyl carbonate/ethyl methyl carbonate) is preferably 40 or less, more preferably 20 or less, even more preferably 10 or less, and particularly preferably 8 or less.

Another solvent, e.g., a cyclic carboxylate ester, chain carboxylate ester, cyclic ether, chain ether, sulfur-containing organic solvent, phosphorus-containing organic solvent, aromatic fluorine-containing solvent, and so forth, may also be blended in the aforementioned combination composed mainly of a fluorine-free cyclic carbonate and a chain carbonate.

In this Description, the volume of a non-aqueous solvent is the value measured at 25° C., while the value measured at the melting point is used for substances that are solid at 25° C., e.g., ethylene carbonate.

<Composition of the Non-Aqueous Solvent when a Fluorine Atom-Containing Cyclic Carbonate is Used as a Non-Aqueous Solvent>

When a fluorine atom-containing cyclic carbonate is used as a non-aqueous solvent in the present invention, a single one of the non-aqueous solvents provided above as examples may be used in combination with a fluorine atom-containing cyclic carbonate as the non-aqueous solvent other than a fluorine atom-containing cyclic carbonate, or a combination of two or more may be used in combination with a fluorine atom-containing cyclic carbonate.

An example of a preferred combination of the non-aqueous solvents is a combination composed mainly of the fluorine atom-containing cyclic carbonate and a chain carbonate. Here, the total content of the fluorine atom-containing cyclic carbonate and chain carbonate in the non-aqueous solvent is preferably 60 volume % or more, more preferably 80 volume % or more, and even more preferably 90 volume % or more, while the percentage for the fluorine atom-containing cyclic carbonate relative to the total content of the fluorine atom-containing cyclic carbonate and chain carbonate is 3 volume % or more, preferably 5 volume % or more, more preferably 10 volume % or more, and even more preferably 15 volume % or more, and preferably 60 volume % or less, more preferably 50 volume % or less, even more preferably 40 volume % or less, and particularly preferably 35 volume % or less.

The use of a combination of these non-aqueous solvents can provide a favorable balance, for a battery fabricated using such a combination, between the cycle characteristics and the high-temperature storage characteristics (particularly the residual capacity after high-temperature storage and the high-load discharge capacity).

Specific examples of preferred combinations of the fluorine atom-containing cyclic carbonate and chain carbonate are as follows: fluoroethylene carbonate+dimethyl carbonate, fluoroethylene carbonate+diethyl carbonate, fluoroethylene carbonate+ethyl methyl carbonate, fluoroethylene carbonate+dimethyl carbonate+diethyl carbonate, fluoroethylene carbonate+dimethyl carbonate+ethyl methyl carbonate, fluoroethylene carbonate+diethyl carbonate+ethyl methyl carbonate, and fluoroethylene carbonate+dimethyl carbonate+diethyl carbonate+ethyl methyl carbonate.

Among the fluorine atom-containing cyclic carbonate+chain carbonate combinations, combinations having an asymmetric chain alkyl carbonate for the chain carbonate are even more preferred, and combinations containing a symmetric chain carbonate and an asymmetric chain carbonate, e.g., fluoroethylene carbonate+dimethyl carbonate+ethyl methyl carbonate, fluoroethylene carbonate+diethyl carbonate+ethyl methyl carbonate, and fluoroethylene carbonate+dimethyl carbonate+diethyl carbonate+ethyl methyl carbonate, are particularly preferred because they provide a good balance between the cycle characteristics and the high-current discharge characteristics. Among the preceding, dimethyl carbonate is preferred for the symmetric chain carbonate and the alkyl group in the chain carbonate preferably has 1 or 2 carbons.

Combinations provided by the further addition of a fluorine-free cyclic carbonate to these fluorine atom-containing cyclic carbonate+chain carbonate combinations are also preferred combinations. Here, the total content of the fluorine atom-containing cyclic carbonate and the fluorine-free cyclic carbonate in the non-aqueous solvent is preferably 10 volume % or more, more preferably 15 volume % or more, and even more preferably 20 volume % or more, and the percentage of the fluorine atom-containing cyclic carbonate relative to the total content of the fluorine atom-containing cyclic carbonate and the fluorine-free cyclic carbonate is 5 volume % or more, preferably 10 volume % or more, more preferably 15 volume % or more, and even more preferably 25 volume % or more and preferably 95 volume % or less, more preferably 85 volume % or less, even more preferably 75 volume % or less, and particularly preferably 60 volume % or less.

The incorporation of the cyclic carbonate having no fluorine atom in the indicated concentration range makes it possible to maintain the electrical conductivity of the electrolyte solution while forming a stable protective film at the negative electrode.

The following are specific examples of preferred combinations of a fluorine atom-containing cyclic carbonate, a fluorine-free cyclic carbonate and a chain carbonate: fluoroethylene carbonate+ethylene carbonate+dimethyl carbonate, fluoroethylene carbonate+ethylene carbonate+diethyl carbonate, fluoroethylene carbonate+ethylene carbonate+ethyl methyl carbonate, fluoroethylene carbonate+ethylene carbonate+dimethyl carbonate+diethyl carbonate, fluoroethylene carbonate+ethylene carbonate+dimethyl carbonate+ethyl methyl carbonate, fluoroethylene carbonate+ethylene carbonate+diethyl carbonate+ethyl methyl carbonate, fluoroethylene carbonate+ethylene carbonate+dimethyl carbonate+diethyl carbonate+ethyl methyl carbonate, fluoroethylene carbonate+propylene carbonate+dimethyl carbonate, fluoroethylene carbonate+propylene carbonate+diethyl carbonate, fluoroethylene carbonate+propylene carbonate+ethyl methyl carbonate, fluoroethylene carbonate+propylene carbonate+dimethyl carbonate+diethyl carbonate, fluoroethylene carbonate+propylene carbonate+dimethyl carbonate+ethyl methyl carbonate, fluoroethylene carbonate+propylene carbonate+diethyl carbonate+ethyl methyl carbonate, fluoroethylene carbonate+propylene carbonate+dimethyl carbonate+diethyl carbonate+ethyl methyl carbonate, fluoroethylene carbonate+ethylene carbonate+propylene carbonate+dimethyl carbonate, fluoroethylene carbonate+ethylene carbonate+propylene carbonate+diethyl carbonate, fluoroethylene carbonate+ethylene carbonate+propylene carbonate+ethyl methyl carbonate, fluoroethylene carbonate+ethylene carbonate+propylene carbonate+dimethyl carbonate+diethyl carbonate, fluoroethylene carbonate+ethylene carbonate+propylene carbonate+dimethyl carbonate+ethyl methyl carbonate, fluoroethylene carbonate+ethylene carbonate+propylene carbonate+diethyl carbonate+ethyl methyl carbonate, and fluoroethylene carbonate+ethylene carbonate+propylene carbonate+dimethyl carbonate+diethyl carbonate+ethyl methyl carbonate.

Among the fluorine atom-containing cyclic carbonate+fluorine-free cyclic carbonate+chain carbonate combinations, combinations that contain symmetric chain alkyl carbonates for the chain carbonate are even more preferred, and combinations that contain fluoroethylene carbonate+a symmetric chain carbonate+an asymmetric chain carbonate, e.g., fluoroethylene carbonate+ethylene carbonate+dimethyl carbonate+ethyl methyl carbonate, fluoroethylene carbonate+propylene carbonate+dimethyl carbonate+ethyl methyl carbonate, fluoroethylene carbonate+ethylene carbonate+propylene carbonate+dimethyl carbonate+ethyl methyl carbonate, fluoroethylene carbonate+ethylene carbonate+diethyl carbonate+ethyl methyl carbonate, fluoroethylene carbonate+propylene carbonate+diethyl carbonate+ethyl methyl carbonate, fluoroethylene carbonate+ethylene carbonate+propylene carbonate+diethyl carbonate+ethyl methyl carbonate, fluoroethylene carbonate+ethylene carbonate+dimethyl carbonate+diethyl carbonate+ethyl methyl carbonate, fluoroethylene carbonate+propylene carbonate+dimethyl carbonate+diethyl carbonate+ethyl methyl carbonate, and fluoroethylene carbonate+ethylene carbonate+propylene carbonate+dimethyl carbonate+diethyl carbonate+ethyl methyl carbonate, are particularly preferred because they provide good balance between the cycle characteristics and the high-current discharge characteristics. Among the preceding, dimethyl carbonate is preferred for the symmetric chain carbonate and the alkyl group in the chain carbonate preferably has 1 or 2 carbons.

When dimethyl carbonate is incorporated in the non-aqueous solvent, the load characteristics of the battery are improved when the percentage of dimethyl carbonate incorporation in the total non-aqueous solvent is in the range of preferably 10 volume % or more, more preferably 20 volume % or more, even more preferably 25 volume % or more, and particularly preferably 30 volume % or more and preferably 90 volume % or less, more preferably not more than 80 volume % or less, even more preferably 75 volume %, and particularly preferably 70 volume % or less.

Among the preceding, the battery characteristics after high-temperature storage can be improved—while maintaining the electrical conductivity of the electrolyte solution—by incorporating dimethyl carbonate and ethyl methyl carbonate and having the percentage content of the dimethyl carbonate be larger than the percentage content of the ethyl methyl carbonate, and this is therefore preferred.

Viewed from the perspective of improving the electrical conductivity of the electrolyte solution and improving the battery characteristics after storage, the proportion by volume of the dimethyl carbonate to the ethyl methyl carbonate (dimethyl carbonate/ethyl methyl carbonate) in the overall non-aqueous solvent is preferably 1.1 or more, more preferably 1.5 or more, and even more preferably 2.5 or more.

Viewed from the perspective of improving the low-temperature battery characteristics, this proportion by volume (dimethyl carbonate/ethyl methyl carbonate) is preferably 40 or less, more preferably 20 or less, even more preferably 10 or less, and particularly preferably 8 or less.

Another solvent, e.g., a cyclic carboxylate ester, chain carboxylate ester, cyclic ether, chain ether, sulfur-containing organic solvent, phosphorus-containing organic solvent, fluorine-containing aromatic solvent, and so forth, may also be blended in addition to the previously described fluorine-free cyclic carbonate in the aforementioned combination composed mainly of a fluorine atom-containing cyclic carbonate and a chain carbonate.

1-8. Auxiliary Agents

Besides the compounds described in 1-1 to 1-7, the nonaqueous electrolyte battery of the present invention, auxiliary agents may be used appropriate in accordance with the intended purpose. The auxiliary agent can be exemplified by the monoisocyanates, nitrile compounds, overcharge inhibitors, triple bond-containing compounds, monofluorophosphate salts, difluorophosphate salts, and other auxiliary agents described below.

<Monoisocyanate Compound>

The monoisocyanate compound is not particularly limited, so long as the compound has one isocyanate group per molecule. The monoisocyanate compound can be specifically exemplified by methyl isocyanate, ethyl isocyanate, propyl isocyanate, isopropyl isocyanate, butyl isocyanate, tertiary-butyl isocyanate, pentyl isocyanate, hexyl isocyanate, cyclohexyl isocyanate, vinyl isocyanate, allyl isocyanate, ethynyl isocyanate, propynyl isocyanate, phenyl isocyanate, and fluorophenyl isocyanate.

Methyl isocyanate, ethyl isocyanate, allyl isocyanate, and propynyl isocyanate are preferred among the preceding from the standpoint of improving the battery characteristics.

Further, the monoisocyanate compound may be used singly as one type, or as two or more concurrent types in any combinations and ratios.

The amount of incorporation of the monoisocyanate compound with respect to the overall non-aqueous electrolyte solution of the present invention is not limited and may be freely selected as long as the effects of the present invention are not substantially impaired, but the monoisocyanate compound is generally incorporated at a concentration, considered with respect to the non-aqueous electrolyte solution of the present invention, of at least 0.001 mass %, preferably at least 0.1 mass %, and more preferably at least 0.3 mass % and generally not more than 10 mass %, preferably not more than 5 mass %, and more preferably not more than 3 mass %. If the abovementioned ranges are satisfied, the effects on output characteristic, load characteristic, low-temperature characteristic, cycle characteristic, high-temperature storage characteristic and so forth become more pronounced.

<Nitrile Compound>

There are no limitations on the type of nitrile compound other than that this compound have the nitrile group in the molecule.

The nitrile compound can be specifically exemplified by the following: compounds having one cyano group, such as acetonitrile, propionitrile, butyronitrile, isobutyronitrile, valeronitrile, isovaleronitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, pentafluoropropionitrile or the like;

and compounds that have two nitrile groups, e.g., malononitrile, succinonitrile, glutaronitrile, adiponitrile, pimelonitrile, suberonitrile, azelanitrile, sebaconitrile, undecanedinitrile, dodecanedinitrile, methylmalonotrile, ethylmalonotrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, and 3,3'-(ethylenedithio)dipropionitrile.

Among the preceding, lauronitrile, crotononitrile, succinonitrile, glutaronitrile, adiponitrile, pimelonitrile, suberonitrile, azelanitrile, sebaconitrile, undecanedinitrile, dodecanedinitrile, and fumaronitrile are preferred, while succinonitrile, glutaronitrile, adiponitrile, pimelonitrile, suberonitrile, azelanitrile, sebaconitrile, undecanedinitrile, and dodecanedinitrile are even more preferred from the standpoint of improving the storage characteristics.

The Nitrile compound may be used singly as one type, or as two or more concurrent types in arbitrary combinations and ratios. The amount of incorporation of the nitrile compound with respect to the overall non-aqueous electrolyte solution of the present invention is not limited and may be freely selected as long as the effects of the present invention are not substantially impaired, but the nitrile compound is generally incorporated at a concentration, considered with respect to the non-aqueous electrolyte solution of the present invention, of at least 0.001 mass %, preferably at least 0.1 mass %, and more preferably at least 0.3 mass % and generally not more than 10 mass %, preferably not more than 5 mass %, and more preferably not more than 3 mass %. If the abovementioned ranges are satisfied, the effects on output characteristic, load characteristic, low-temperature characteristic, cycle characteristic, high-temperature storage characteristic and so forth become more pronounced.

<Overcharge Preventing Agent>

An overcharge preventing agent can be used in the nonaqueous electrolyte solution of the present invention with a view to effectively suppressing bursting/ignition of the battery, for instance in an overcharged state of the nonaqueous electrolyte battery.

Examples of overcharge preventing agents include, for instance, aromatic compounds such as biphenyl, alkyl biphenyl, terphenyl, partially hydrogenated products of terphenyl, cyclohexyl benzene, t-butylbenzene, t-amylbenzene, diphenyl ether, dibenzofuran or the like; partially fluorinated products of the abovementioned aromatic compounds, for instance 2-fluorobiphenyl, o-cyclohexylfluorobenzene, p-cyclohexylfluorobenzene or the like; or fluorine-containing anisole compounds such as 2,4-difluoroanisole, 2,5-difluoroanisole, 2,6-difluoroanisole, 3,5-difluoroanisole or the like. Preferred aromatic compounds among the foregoing are biphenyl, alkylbiphenyl, terphenyl, partially hydrogenated products of terphenyl, cyclohexylbenzene, t-butylbenzene, t-amylbenzene, diphenyl ether, di-benzofuran or the like.

The foregoing may be used as a single type or concomitantly as two or more types. When using two or more types concomitantly, then there is preferably used, in particular, a combination of cyclohexylbenzene and t-butylbenzene or t-amylbenzene; or at least one type selected from among aromatic compounds containing no oxygen atoms, for instance, biphenyl, alkylbiphenyl, terphenyl, partially hydrogenated products of terphenyl, cyclohexylbenzene, t-butylbenzene, t-amylbenzene or the like, and at least one type selected from among oxygen-containing aromatic compounds such as diphenyl ether, dibenzofuran or the like, in terms of striking a balance between the overcharge prevention characteristic and high-temperature storage characteristic.

The amount of incorporation of the overcharge preventing agent is not particularly limited, and may be any amount of incorporation, so long as the effect of the present invention is not significantly impaired thereby. The overcharge inhibitor is incorporated, in 100 mass % for the non-aqueous electrolyte solution, preferably at least 0.1 mass % and not more than 5 mass %. Within such a range, the effect elicited by the overcharge preventing agent is readily brought out at a sufficient level, and impairment of battery characteristics, for instance high-temperature storage characteristic, is readily avoided.

The overcharge inhibitor is more preferably at least 0.2 mass %, even more preferably at least 0.3 mass %, and particularly preferably at least 0.5 mass % and more preferably not more than 3 mass % and even more preferably not more than 2 mass %.

<Triple Bond-Containing Compound>

The triple bond-containing compound is a compound that has at least one triple bond in the molecule, but is not otherwise particularly limited as to type.

The triple bond-containing compound can be specifically exemplified by the following compounds:

hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene, and dicyclohexylacetylene;

monocarbonates such as 2-propynyl methyl carbonate, 2-propynyl ethyl carbonate, 2-propynyl propyl carbonate, 2-propynyl butyl carbonate, 2-propynyl phenyl carbonate, 2-propynyl cyclohexyl carbonate, di-2-propynyl carbonate, 1-methyl-2-propynyl methyl carbonate, 1,1-dimethyl-2-propynyl methyl carbonate, 2-butynyl methyl carbonate, 3-butynyl methyl carbonate, 2-pentynyl methyl carbonate, 3-pentynyl methyl carbonate, and 4-pentynyl methyl carbonate;

dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate, and 2-butyne-1,4-diol dicyclohexyl dicarbonate;

the esters of monocarboxylic acids, e.g., 2-propynyl acetate, 2-propynyl propionate, 2-propynyl butyrate, 2-propynyl benzoate, 2-propynyl cyclohexylcarboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexylcarboxylate, 2-butynyl acetate, 3-butynyl acetate, 2-pentynyl acetate, 3-pentynyl acetate, 4-pentynyl acetate, methyl 2-propynoate, ethyl 2-propynoate, propyl 2-propynoate, vinyl 2-propynoate, 2-propenyl 2-propynoate, 2-butenyl 2-propynoate, 3-butenyl 2-propynoate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate, and 3-butenyl 4-pentynoate;

the esters of dicarboxylic acids, e.g., 2-butyne-1,4-diol diacetate, 2-butyne-1,4-diol dipropionate, 2-butyne-1,4-diol dibutyrate, 2-butyne-1,4-diol dibenzoate, and 2-butyne-1,4-diol dicyclohexanecarboxylate;

the diesters of oxalic acid, e.g., methyl 2-propynyl oxalate, ethyl 2-propynyl oxalate, propyl 2-propynyl oxalate, 2-propynyl vinyl oxalate, allyl 2-propynyl oxalate, di-2-propynyl oxalate, 2-butynyl methyl oxalate, 2-butynyl ethyl oxalate, 2-butynyl propyl oxalate, 2-butynyl vinyl oxalate, allyl 2-butynyl oxalate, di-2-butynyl oxalate, 3-butynyl methyl oxalate, 3-butynyl ethyl oxalate, 3-butynyl propyl oxalate, 3-butynyl vinyl oxalate, allyl 3-butynyl oxalate, and di-3-butynyl oxalate;

phosphine oxides such as methyl(2-propynyl)(vinyl)phosphine oxide, divinyl(2-propynyl)phosphine oxide, di(2-propynyl)(vinyl)phosphine oxide, di(2-propenyl)(2-propynyl)phosphine oxide, di(2-propynyl)(2-propenyl)phosphine oxide, di(3-butenyl)(2-propynyl)phosphine oxide, and di(2-propynyl)(3-butenyl)phosphine oxide;

phosphinate esters such as 2-propynyl methyl(2-propenyl)phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl(methyl)phosphinate, 1,1-dimethyl-2-propynyl di(2-propenyl)phosphinate, 1,1-dimethyl-2-propynyl di(3-butenyl)phosphinate, 2-propenyl methyl(2-propynyl)phosphinate, 3-butenyl methyl(2-propynyl)phosphinate, 2-propenyl di(2-propynyl)phosphinate, 3-butenyl di(2-propynyl)phosphinate, 2-propenyl 2-propynyl(2-propenyl)phosphinate, and 3-butenyl 2-propynyl(2-propenyl)phosphinate;

phosphonate esters such as methyl 2-propynyl 2-propenylphosphonate, methyl 2-propynyl 2-butenylphosphonate, 2-propynyl 2-propenyl 2-propenylphosphonate, 3-butenyl 2-propynyl 3-butenylphosphonate, 1,1-dimethyl-2-propynyl methyl 2-propenylphosphonate, 1,1-dimethyl-2-propynyl methyl 2-butenylphosphonate, 1,1-dimethyl-2-propynyl 2-propenyl 2-propenylphosphonate, 3-butenyl 1,1-dimethyl-2-propynyl 3-butenylphosphonate, 2-propynyl 2-propenyl methylphosphonate, 3-butenyl 2-propynyl methylphosphonate, 1,1-dimethyl-2-propynyl 2-propenyl methylphosphonate, 3-butenyl 1,1-dimethyl-2-propynyl methylphosphonate, 2-propynyl 2-propenyl ethylphosphonate, 3-butenyl 2-propynyl ethylphosphonate, 1,1-dimethyl-2-propynyl 2-propenyl ethylphosphonate, and 3-butenyl 1,1-dimethyl-2-propynyl ethylphosphonate; and phosphate esters such as methyl 2-propenyl 2-propynyl phosphate, ethyl 2-propenyl 2-propynyl phosphate, 2-butenyl methyl 2-propynyl phosphate, 2-butenyl ethyl 2-propynyl phosphate, 1,1-dimethyl-2-propynyl methyl 2-propenyl phosphate, 1,1-dimethyl-2-propynyl ethyl 2-propenyl phosphate, 2-butenyl 1,1-dimethyl-2-propynyl methyl phosphate, and 2-butenyl ethyl 1,1-dimethyl-2-propynyl phosphate.

Among the preceding, compounds having an alkynyloxy group are preferred for achieving a more stable formation of a negative electrode film in the electrolyte solution.

In addition, compounds such as 2-propynyl methyl carbonate, di-2-propynyl carbonate, 2-butyne-1,4-diol dimethyl dicarbonate, 2-propynyl acetate, 2-butyne-1,4-diol diacetate, methyl 2-propynyl oxalate, di-2-propynyl oxalate, and so forth are particularly preferred from the standpoint of improving the storage characteristics.

The abovementioned compounds having a triple bond may be used singly as one type, or as two or more concurrent types in any combinations and ratios. The amount of incorporation of the triple bond-containing compound with respect to the overall non-aqueous electrolyte solution of the present invention is not limited and may be freely selected as long as the effects of the present invention are not substantially impaired, but the triple bond-containing compound is generally incorporated at a concentration, considered with respect to the non-aqueous electrolyte solution of the present invention, of at least 0.01 mass %, preferably at least 0.05 mass %, and more preferably at least 0.1 mass % and generally not more than 5 mass %, preferably not more than 3 mass %, and more preferably not more than 1 mass %. If the abovementioned ranges are satisfied, the effects on output characteristic, load characteristic, low-temperature characteristic, cycle characteristic, high-temperature storage characteristic and so forth become more pronounced.

<Monofluorophosphate Salts and Difluorophosphate Salts>

The countercation in the monofluorophosphate salts and difluorophosphate salts is not particularly limited and can be exemplified by lithium, sodium, potassium, magnesium, calcium, and ammonium as represented by $NR^{11}R^{12}R^{13}R^{14}$ (in the formula, $R^{11}$ to $R^{14}$ each independently represent the hydrogen atom or a $C_{1-12}$ organic group).

The $C_{1-12}$ organic group represented by the $R^{11}$ to $R^{14}$ in the aforementioned ammonium is not particularly limited and can be exemplified by optionally halogen-substituted alkyl groups, optionally halogen- or alkyl-substituted cycloalkyl groups, optionally halogen- or alkyl-substituted aryl groups, and optionally substituted nitrogenous heterocyclic groups. Among these, $R^{11}$ to $R^{14}$ are each independently preferably the hydrogen atom, an alkyl group, a cycloalkyl group, a nitrogenous heterocyclic group, and so forth.

The monofluorophosphate salts and difluorophosphate salts can be specifically exemplified by lithium monofluorophosphate, sodium monofluorophosphate, potassium monofluorophosphate, lithium difluorophosphate, sodium difluorophosphate, and potassium difluorophosphate, wherein lithium monofluorophosphate and lithium difluorophosphate are preferred and lithium difluorophosphate is more preferred.

The monofluorophosphate and the difluorophosphate may be used singly as one type, or as two or more concurrent types in any combinations and ratios. The amount of incorporation of the monofluorophosphate and the difluorophosphate is not particularly limited, and may be any amount of incorporation, so long as the effect of the present invention is not significantly impaired thereby.

The amount of incorporation of the monofluorophosphate salt and difluorophosphate salt, in 100 mass % of the non-aqueous electrolyte solution, is preferably at least 0.001 mass %, more preferably at least 0.01 mass %, and even more preferably at least 0.1 mass % and preferably not more than 5 mass %, more preferably not more than 4 mass %, and even more preferably not more than 3 mass %. Within these ranges, a sufficient enhancing effect on cycle characteristic is readily brought out in the nonaqueous electrolyte battery, and drops in high-temperature storage characteristic such as drops in discharge capacity retention rate, caused by excessive gas generation amount, are readily avoided.

<Other Auxiliary Agents>

Other known auxiliary agents may be used in the non-aqueous electrolyte solution of the present invention. These other auxiliary agents can be exemplified by carbonate compounds such as erythritol carbonate, spirobisdimethylene carbonate, methoxyethyl methyl carbonate, and so forth; Spiro compounds such as 2,4,8,10-tetraoxaspiro[5.5]undecane, 3,9-divinyl-2,4,8,10-tetraoxaspiro[5.5]undecane, and so forth; nitrogenous compounds such as 1-methyl-2-pyrrolidinone, 1-methyl-2-piperidine, 3-methyl-2-oxazolidinone, 1,3-dimethyl-2-imidazolidinone, N-methylsuccinimide, and so forth; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, triethylphosphine oxide, and so forth; sulfides such as dibutyl disulfide, dicyclohexyl disulfide, tetramethylthiuram monosulfide, and so forth; hydrocarbon compounds such as heptane, octane, nonane, decane, cycloheptane, and so forth; and fluorine-containing aromatic compounds such as fluorobenzene, difluorobenzene, hexafluorobenzene, benzotrifluoride, and so forth. The foregoing may be used as a single type or concomitantly as two or more types. The capacity retention characteristic after storage at high-temperature, as well as the cycle characteristic, can be enhanced through the addition of such auxiliary agents.

The amount of incorporation of these other auxiliary agents is not particularly limited, and may be any amount of incorporation, so long as the effect of the present invention is not significantly impaired thereby. The other auxiliary agent is incorporated, in 100 mass % for the non-aqueous electrolyte solution, preferably at least 0.01 mass % and not more than 5 mass %. Within such a range, the effect elicited by the other auxiliary agents is readily brought out at a sufficient level, and impairment of battery characteristics such as high-load discharge characteristic is readily avoided.

The amount of incorporation of the other auxiliary agent is more preferably at least 0.1 mass % and even more preferably at least 0.2 mass % and more preferably not more than 3 mass % and even more preferably not more than 1 mass %.

The abovementioned nonaqueous electrolyte solution encompasses a nonaqueous electrolyte solution that is present inside the nonaqueous electrolyte battery that is disclosed in the present invention.

Specific such instances include an instance where the constituent elements of the nonaqueous electrolyte solution such as the lithium salt, the solvent, the auxiliary agents and so forth are synthesized separately, and there is prepared a nonaqueous electrolyte solution out of the substantially isolated constituent elements, and then the nonaqueous electrolyte solution is poured into a battery assembled separately, to yield a nonaqueous electrolyte solution in a nonaqueous electrolyte battery; an instance where the constituent elements of the nonaqueous electrolyte solution of the present invention are provided individually in the battery, and are then mixed within the battery, to yield as a result a composition identical to that of the nonaqueous electrolyte solution of the present invention; or an instance where the compounds that make up the nonaqueous electrolyte solution of the present invention are generated in the nonaqueous electrolyte battery, to yield thereby a composition identical to that of the nonaqueous electrolyte solution of the present invention.

1-9. The State of the Non-Aqueous Electrolyte Solution

When used in the lithium secondary battery of the present invention, the non-aqueous electrolyte solution is ordinarily present in a liquid state, but, for example, it may be gelled using a polymer or may made into a semi-solid electrolyte. The polymer used for gelation may be freely selected and can be exemplified by polyvinylidene fluorides, copolymers of polyvinylidene fluoride and hexafluoropropylene, polyethylene oxides, polyacrylates, and polymethacrylates. A single polymer may be used by itself for gelation, or two or more may be used in combination in any combination and proportions.

When the non-aqueous electrolyte solution is used in the form of a semi-solid electrolyte, the percentage of the non-aqueous electrolyte solution in the semi-solid electrolyte may be freely selected as long as the effects of the present invention are not substantially impaired. A suitable range for the percentage of the non-aqueous electrolyte solution with respect to the total amount of the semi-solid electrolyte is generally at least 30 mass %, preferably at least 50 mass %, and more preferably at least 75 mass % and generally not more than 99.95 mass %, preferably not more than 99 mass %, and more preferably not more than 98 mass %. Having the percentage of the non-aqueous electrolyte solution be at least 30 mass % is advantageous for the charge/discharge efficiency and the capacity, while having the percentage of the non-aqueous electrolyte solution be not more than 99.95 mass % prevents problems with retention of the electrolyte solution and prevents the ready occurrence of liquid leakage.

2. Battery Configuration

The nonaqueous electrolyte solution of the present invention is appropriate for use as an electrolyte solution for secondary batteries, for instance lithium secondary batteries, from among nonaqueous electrolyte batteries. A nonaqueous electrolyte battery that uses the nonaqueous electrolyte solution of the present invention is explained next.

The nonaqueous electrolyte battery of the present invention can have a known structure, and is typically provided with a negative electrode and a positive electrode that can absorb and release ions (for instance, lithium ions), plus the above-described nonaqueous electrolyte solution of the present invention.

2-1. The Positive Electrode

The positive electrode used in the non-aqueous electrolyte secondary battery of the present invention is described in the following. The second present invention is a non-aqueous electrolyte secondary battery that has the previously described fluorine atom-containing cyclic carbonate (B) and compound (C) having at least two isocyanate groups in the molecule both added to the non-aqueous electrolyte solution and that uses a spinel-structured lithium manganese composite oxide in the positive electrode. The positive electrode used in the second present invention is also described below.

<2-1-1. Positive Electrode Active Material>

Positive electrode active materials that are used in the positive electrode are explained below.

(1) Composition

The positive electrode used in the second present invention characteristically comprises a spinel-structured lithium manganese composite oxide (also referred to herebelow simply as the lithium manganese composite oxide). This lithium manganese composite oxide is preferably a lithium manganese composite oxide in which a portion of the manganese sites therein have been substituted. Substitution by a main group element is particularly preferred. The main group element substituted at the manganese site can be exemplified by Li, B, Na, Mg, Al, Ca, Zn, Ga, Ge, and so forth. The manganese site may also be substituted with a plurality of elements. The element substituted at the manganese site is preferably Li, Mg, Al, and Ga and particularly preferably is Al and/or Li. The amount of substitution by the main group element is preferably 0.03 mole or more, more preferably 0.05 mole or more, and most preferably 0.07 mole or more in 2 moles of manganese.

A particularly preferred lithium manganese composite oxide is the compound represented by the general formula $$\text{Li}_{1+w}[\text{Mn}_{(2-x)}\text{Al}_y\text{Li}_z]\text{O}_4$$

(in the formula, w, x, y, and z are each numbers greater than or equal to 0; x=y+z; and y and z may not both be 0). Here, w is generally 0.3 and or less is preferably 0.2 or less and particularly preferably is 0.15 or less. y is generally 0.5 or less and is preferably 0.25 or less. z is generally 0.1 or less and preferably is 0.08 or less. The high-temperature characteristics may deteriorate when y or z is too small, while the capacity decreases when y or z is too large.

The oxygen atom in the preceding composite oxide may be present nonstoichiometrically and a portion of the oxygen atoms may be substituted with a halogen element, e.g., fluorine.

The positive electrode used in the second present invention preferably contains a spinel-structured lithium manganese composite oxide and additionally a layer-structured lithium nickel composite oxide. This makes it possible to improve the cycle characteristics in high-temperature atmospheres and the storage characteristics in high-temperature atmospheres.

The range for the mixing proportion between the spinel-structured lithium manganese composite oxide and layer-structured lithium nickel composite oxide, expressed as the weight ratio, is generally the range from 20:1 to 1:20, preferably the range from 15:1 to 1:15, more preferably the range from 10:1 to 1:10, particularly preferably the range from 5:1 to 1:5, and most preferably the range from 5:1 to 1:1. Departing from this range may impair the ability to obtain the effects of the present invention.

This lithium nickel composite oxide is preferably a lithium nickel composite oxide in which a portion of the nickel sites therein have been substituted. Elements preferred for the substitutional element can be exemplified by metal elements such as Al, Fe, Sn, Cr, Cu, Ti, Zn, Co, Mn, and so forth. The nickel site may also be substituted with a plurality of elements. Substitution by Al and/or Co and/or Mn is preferred.

A particularly preferred lithium nickel composite oxide is the compound represented by the general formula $$\text{Li}_{1+s}[\text{Ni}_{(1-p)}\text{Co}_q\text{M}_r]\text{O}_2$$

(in the formula, M represents Al or Mn; p, q, r, and s are each numbers greater than or equal to 0; p=q+r; and q and r may not both be 0). Here, q and r are each independently generally 0.7 or less and preferably 0.5 or less and generally 0.05 or more and preferably 0.1 or more. In addition, when M is Al, r is generally 0.1 or less and is preferably 0.08 or less and is generally 0.02 or more. s is generally 0.3 or less and is preferably 0.2 or less and is particularly preferably 0.15 or less. The high-temperature characteristics tend to be mediocre when q or r is too small, while the capacity decreases when q or r is too large.

The oxygen atom in the preceding lithium nickel composite oxide may be present nonstoichiometrically and a portion of the oxygen atoms may be substituted with a halogen element, e.g., fluorine.

The positive electrode used in the second present invention may contain another active material.

In addition, the previously described active material may be used in the first present invention or other active material may be used in the first present invention and no particular limitation obtains thereon.

Other positive electrode active materials are not particularly limited, so long as they are capable of electrochemically absorbing and releasing a lithium ion, but, for instance, are preferably a substance that contains lithium and at least one type of transition metal.

Specific examples are lithium transition metal composite oxides, lithiated transition metal phosphate compounds, lithiated transition metal silicate compounds, and lithiated transition metal borate compounds.

The transition metal in the lithium transition metal composite oxide may duplicate the preceding, but V, Ti, Cr, Mn, Fe, Co, Ni, Cu, and so forth are preferred. Specific examples are lithium•cobalt composite oxides such as $\text{LiCoO}_2$; lithium nickel composite oxides such as $\text{LiNiO}_2$; lithium manganese composite oxides such as $\text{LiMnO}_2$, $\text{LiMn}_2\text{O}_4$, and $\text{Li}_2\text{MnO}_4$; and lithium transition metal composite oxides provided by substituting a portion of the majority transition metal atoms in the preceding lithium transition metal composite oxides with another metal, e.g., Al, Ti, V, Cr, Mn, Fe, Co, Li, Ni, Cu, Zn, Mg, Ga, Zr, Si, Nb, Mo, Sn, W, and so forth.

Specific examples of the substituted lithium transition metal composite oxides are $\text{LiNi}_{0.5}\text{Mn}_{0.5}\text{O}_2$, $\text{LiNi}_{0.85}\text{Co}_{0.10}\text{Al}_{0.05}\text{O}_2$, $\text{LiNi}_{0.33}\text{Co}_{0.33}\text{Mn}_{0.33}\text{O}_2$, $\text{LiMn}_{1.8}\text{Al}_{0.2}\text{O}_4$, and $\text{LiMn}_{1.5}\text{Ni}_{0.5}\text{O}_4$.

The transition metal in the lithiated transition metal phosphate compound is preferably V, Ti, Cr, Mn, Fe, Co, Ni, Cu, and so forth, and the lithiated transition metal phosphate compound can be specifically exemplified by iron phosphates such as $\text{LiFePO}_4$, $\text{Li}_3\text{Fe}_2(\text{PO}_4)_3$, and $\text{LiFeP}_2\text{O}_7$; cobalt phosphates such as $\text{LiCoPO}_4$; and lithiated transition metal phosphate compounds provided by substituting a portion of the majority transition metal atoms in the preceding lithiated transition metal phosphate compounds with another metal, e.g., Al, Ti, V, Cr, Mn, Fe, Co, Li, Ni, Cu, Zn, Mg, Ga, Zr, Si, Nb, Mo, Sn, W, and so forth.

The transition metal in the lithiated transition metal borate compound is preferably V, Ti, Cr, Mn, Fe, Co, Ni, Cu, and so forth, and the lithiated transition metal borate compound can be specifically exemplified by iron borates such as $LiFeBO_3$; cobalt borates such as $LiCoBO_3$; and lithiated transition metal borate compounds provided by substituting a portion of the majority transition metal atoms in the preceding lithiated transition metal borate compounds with another metal, e.g., Al, Ti, V, Cr, Mn, Fe, Co, Li, Ni, Cu, Zn, Mg, Ga, Zr, Si, Nb, Mo, Sn, W, and so forth.

(2) Surface Coating

A positive electrode active material may also be used as provided by attaching, to the surface of a positive electrode active material as described in the preceding, a substance (referred to below as the "surface-adherent substance" where appropriate) with a composition different from the substance constituting the main positive electrode active material. Examples of surface-adherent substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

The surface-adherent substances may be adherent to the surface of a positive electrode active material in accordance with a method that involves, for instance, dissolving or suspending the surface-adherent substance in a solvent, and causing the surface-adherent substance to be impregnated into/added to the positive electrode active material, followed by drying, or a method that involves dissolving or suspending a surface-adherent substance precursor in a solvent, and causing the precursor to be impregnated into/added to the positive electrode active material, followed by heating or the like to elicit a reaction; or a method that involves addition of a surface-adherent substance precursor to a positive electrode active material precursor, with simultaneous firing of the foregoing. In a case where carbon is to be adherent, a method may be resorted to wherein a carbonaceous substance, for instance in the form of activated carbon or the like, is mechanically adherent at a later time.

The mass of the surface-adherent substance adherent to the surface of the positive electrode active material, expressed with reference to the mass of the positive electrode active material, is preferably 0.1 ppm or more, more preferably 1 ppm or more, and even more preferably 10 ppm or more. In addition, it is preferably 20% or less, more preferably 10% or less, and even more preferably 5% or less.

Oxidation reactions on the non-aqueous electrolyte solution at the surface of the positive electrode active material can be inhibited by the surface-adherent substance and the battery life can thus be improved. In addition, when the bound amount is in the range given above, the effects of the source-bound material can be satisfactorily exhibited and increases in the resistance can also be inhibited without impeding lithium ion insertion/extraction.

(3) Shape

The shape of the positive electrode active material particles may be the lump shape, polyhedral shape, spherical shape, oval shape, plate shape, needle shape, column shape, and so forth, as heretofore used. In addition, the primary particles may aggregate to form secondary particles, and the shape of these secondary particles may be spherical or oval.

(4) Tap Density

The tap density of the positive electrode active material is preferably 0.5 $g \cdot cm^{-3}$ or more, more preferably 1.0 $g \cdot cm^{-3}$ or more, and even more preferably 1.5 $g \cdot cm^{-3}$ or more. It is also preferably 4.0 $g \cdot cm^{-3}$ or less and even more preferably 3.7 $g \cdot cm^{-3}$ or less.

The use of a positive electrode active material with a high tap density enables the formation of a high-density positive electrode active material layer. When the tap density of the positive electrode active material is in the indicated range, the amount of dispersion medium required during formation of the positive electrode active material layer assumes favorable values and as a consequence the amount of electroconductive material and binder also assumes favorable values and as a result the packing ratio for the positive electrode active material in the positive electrode active material layer is not constrained and the influence on the battery capacity is then also minor.

The tap density of the positive electrode active material is measured as follows: the sample is passed through a sieve with an aperture of 300 μm down into a 20 $cm^3$ tapping cell and the cell volume is filled; using a powder density analyzer (for example, a Tap Denser from Seishin Enterprise Co., Ltd.), 1000 taps with a stroke length of 10 mm are then administered; and the density is calculated from the volume at this point and the mass of the sample. The tap density calculated according to the above measurement is defined as the tap density of the positive electrode active material of the present invention.

(5) The Median Diameter d50

The medium diameter d50 of the particles of the positive electrode active material (the secondary particle diameter when the primary particles undergo aggregation to form secondary particles) can be measured using a laser diffraction/scattering type particle size distribution analyzer.

The median diameter d50 is preferably 0.1 μm or larger, more preferably 0.5 μm or larger, even more preferably 1 μm or larger, and particularly preferably 3 μm or larger and is preferably 30 μm or smaller, more preferably 20 μm or smaller, even more preferably 16 μm or smaller, and particularly preferably 15 μm or smaller. When the median diameter d50 is in the indicated range, a high bulk density product is not readily obtained and lithium diffusion within a particle is also not time consuming and as a consequence the battery characteristics are prevented from declining. In addition, the production of streaking and so forth is also inhibited during fabrication of the battery positive electrode, i.e., when the active material and electroconductive material, binder, and so forth are slurried with a solvent and coated in thin film form.

The packing behavior during positive electrode fabrication can also be further improved by mixing, at a freely selected ratio, two or more positive electrode active materials that have different median diameters d50.

The median diameter d50 of the positive electrode active material is measured using a 0.1 mass % aqueous solution of sodium hexametaphosphate as the dispersion medium and using a particle size distribution analyzer (for example, an LA-920 from Horiba, Ltd.). After subjecting the dispersion of the positive electrode active material to ultrasound dispersion for 5 minutes, the measurement refractive index is set to 1.24 and the measurement is performed.

(6) The Average Primary Particle Diameter

In those instances in which the primary particles undergo aggregation to form secondary particles, the average primary particle diameter of the positive electrode active material is preferably 0.01 μm or larger, more preferably 0.05 μm or larger, even more preferably 0.08 μm or larger, and particularly preferably 0.1 μm or larger and is preferably 3 μm or smaller, more preferably 2 μm or smaller, even more preferably 1 μm or smaller, and particularly preferably 0.6 μm or smaller. Within the indicated range, spherical secondary particles are readily formed and the powder packing behavior is then favorable and the specific surface area can be satisfactorily secured, and as a result the battery performance, e.g., the output characteristics and so forth, can be prevented from declining. The average primary particle diameter of the positive electrode active material is measured through observation using a scanning electron microscope (SEM). Specifically, the largest value of a section by a left-right boundary of primary particles with respect to a straight line in the horizontal direction, is worked out, in micrographs at a 10000× magnification, for 50 arbitrary primary particles. The average of the values is taken then as the primary particle size.

(7) The BET Specific Surface Area

The BET specific surface area of the positive electrode active material, as the value of the specific surface area measured using the BET method, is preferably $0.2\ m^2 \cdot g^{-1}$ or larger, more preferably $0.3\ m^2 \cdot g^{-1}$ or larger, and even more preferably $0.4\ m^2 \cdot g^{-1}$ or larger and is preferably $4.0\ m^2 \cdot g^{-1}$ or smaller, more preferably $2.5\ m^2 \cdot g^{-1}$ or smaller, and even more preferably $1.5\ m^2 \cdot g^{-1}$ or smaller. When the value of the BET specific surface area is in the indicated range, this readily prevents the battery performance from declining. In addition, a satisfactory tap density can be secured and an excellent coating behavior is obtained during formation of the positive electrode active material.

The BET specific surface area of the positive electrode active material is measured using a surface area analyzer (for example, a fully automatic surface area analyzer from Ohkura Riken Co., Ltd.). In specific terms, the sample is subjected to a preliminary drying for 30 minutes at 150° C. under a nitrogen current and the measurement is then performed using the BET nitrogen adsorption single-point method and the gas flow technique and using a nitrogen-helium mixed gas precisely adjusted to provide a value of 0.3 for the relative pressure of the nitrogen versus atmospheric pressure. The specific surface area worked out according to the above-described measurement is defined as the BET specific surface area of the positive electrode active material of the present invention.

(8) The Method of Producing the Positive Electrode Active Material

Within the range in which the essential features of the present invention are not exceeded, there are no particular limitations on the method of producing the positive electrode active material, but several methods are provided as examples and general methods may be used to produce the inorganic compounds themselves.

Various methods may be contemplated in particular for producing a spherical to oval active material. In an example of one such method, the transition metal starting material, e.g., a transition metal nitrate or sulfate, and as necessary starting materials for other elements are dissolved or pulverized and dispersed in a solvent, e.g., water; the pH is adjusted while stirring and a spherical precursor is produced and recovered; this is dried as necessary; an Li source, e.g., LiOH, $Li_2CO_3$, $LiNO_3$, and so forth, is subsequently added; and the active material is then obtained by high-temperature calcination.

In an example of another method, the transition metal starting material, e.g., a transition metal nitrate, sulfate, hydroxide, or oxide, and as necessary starting materials for other elements are dissolved or pulverized and dispersed in a solvent, e.g., water; this is made into a spherical to oval precursor by drying and forming with, e.g., a spray dryer; an Li source, e.g., LiOH, $Li_2CO_3$, $LiNO_3$, and so forth, is added to this; and the active material is then obtained by high-temperature calcination.

In an example of yet another method, the transition metal starting material, e.g., a transition metal nitrate, sulfate, hydroxide, or oxide, an Li source, e.g., LiOH, $Li_2CO_3$, $LiNO_3$, and so forth, and as necessary starting materials for other elements are dissolved or pulverized and dispersed in a solvent, e.g., water; this is made into a spherical to oval precursor by drying and forming with, e.g., a spray dryer; and the active material is then obtained by high-temperature calcination.

<2-1-2. Structure of the Positive Electrode and the Method for Fabricating the Positive Electrode>

The structure of the positive electrode used in the present invention and its method of fabrication are described in the following.

(Method for Fabricating the Positive Electrode)

The positive electrode is fabricated by forming, on a current collector, a positive electrode active material layer that contains positive electrode active material particles and binder. The production of the positive electrode using a positive electrode active material may be carried out by any known method. For example, the positive electrode active material and the binder, and, as the case may require, a conductive material, a thickener and the like, are dry-mixed to yield a sheet-like mixture that is then pressure-bonded against a positive electrode collector; alternatively, these materials are dissolved or dispersed in a liquid medium, to yield a slurry that is then coated onto a positive electrode collector, followed by drying, to form a positive electrode active material layer on the collector. The positive electrode can be obtained thereby.

The content of the positive electrode active material in the positive electrode active material layer is preferably 60 mass % or more, more preferably 70 mass % or more, and even more preferably 80 mass % or more and is preferably 99.9 mass % or less and more preferably 99 mass % or less. A satisfactory electrical capacity can be secured when the positive electrode active material content is in the indicated range. The positive electrode will also have a satisfactory strength. A single positive electrode active material may be used by itself in the present invention, or two or more positive electrode active materials having different compositions or different properties may be used in combination at any composition and ratio.

(Conductive Material)

Any known conductive materials can be used as the conductive material. Specific examples thereof include, for instance, metallic materials such as copper, nickel or the like; graphite such as natural graphite, artificial graphite or the like; carbon black such as acetylene black; and carbonaceous materials such as amorphous carbon, for instance needle coke or the like. The foregoing may be used singly as one type, or as two or more concurrent types in any combinations and ratios.

The content of the electroconductive material in the positive electrode active material layer is preferably 0.01 mass % or more, more preferably 0.1 mass % or more, and even more preferably 1 mass % or more and is preferably 50 mass % or less, more preferably 30 mass % or less, and even more preferably 15 mass % or less. A satisfactory electrical conductivity can be secured when this content is in the indicated range. The battery capacity is also readily prevented from declining.

(Binder)

The binder used for producing the positive electrode active material layer is not particularly limited, provided that it is a stable material towards the nonaqueous electrolyte solution and towards the solvent that is used during the production of the electrodes.

The binder is not limited, provided that it is dissolved or dispersed in the liquid medium that is used during electrode production, in the case of a coating method. Specific examples thereof include, for instance, resin-based polymers such as polyethylene, polypropylene, polyethylene terephthalate, polymethyl methacrylate, aromatic polyamide, cellulose, nitrocellulose or the like; rubber-like polymers such as SBR (styrene-butadiene rubber), NBR (acrylonitrile-butadiene rubber), fluororubber, isoprene rubber, butadiene rubber, ethylene-propylene rubber or the like; thermoplastic elastomeric polymers such as styrene-butadiene-styrene block copolymers and hydrogenated products thereof, EPDM (ethylene-propylene-diene terpolymer), styrene-ethylene-butadiene-ethylene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride (PVdF), polytetrafluoroethylene, fluorinated polyvinylidene fluoride, polytetrafluoroethylene-ethylene copolymers and the like; and polymer compositions having ionic conductivity towards alkali metal ions (in particular, lithium ions). These substances may be used singly as one type, or as two or more concurrent types in any combinations and ratios.

The content of the binder in the positive electrode active material layer is preferably 0.1 mass % or more, more preferably 1 mass % or more, and even more preferably 3 mass % or more and is preferably 80 mass % or less, more preferably 60 mass % or less, even more preferably 40 mass % or less, and particularly preferably 10 mass % or less. When the binder proportion is in the indicated range, the positive electrode active material can be satisfactorily retained and mechanical strength can be secured for the positive electrode, resulting in an excellent battery performance, e.g., cycle characteristics and so forth. This is also associated with an inhibition of reductions in the battery capacity and electrical conductivity.

(Liquid Medium)

The fluid medium used for preparing the slurry to form the positive electrode active material layer is not particularly limited, and may be any aqueous solvent or organic solvent, provided that the solvent can dissolve or disperse the positive electrode active material, the conductive material, the binder, as well as a thickener that is used as the case may require.

The aqueous medium can be exemplified by water and water+alcohol mixed media. The organic medium can be exemplified by aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether and tetrahydrofuran (THF); amides such as N-methylpyrrolidone (NMP), dimethylformamide, and dimethylacetamide; and aprotic polar solvents such as hexamethylphosphoramide and dimethyl sulfoxide. The foregoing may be used singly as one type, or as two or more concurrent types in any combinations and ratios.

(Thickener)

If an aqueous medium is used as a liquid medium to form a slurry, a slurry is preferably formed using a thickener and a latex of styrene-butadiene rubber (SBR) or the like. The thickener is ordinarily used to regulate the viscosity of the slurry.

The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios.

When a thickener is used, the proportion of the thickener with respect to the positive electrode active material is preferably at least 0.1 mass %, more preferably at least 0.5 mass %, and even more preferably at least 0.6 mass % and is preferably not more than 5 mass %, more preferably not more than 3 mass %, and even more preferably not more than 2 mass %. Within the indicated range, a good coating behavior is obtained and the proportion of the active material in the positive electrode active material layer is satisfactory and as a result the problem of a reduced battery capacity and the problem of an increased positive electrode active material-to-positive electrode active material resistance are readily avoided.

(Consolidation)

In order to increase the packing density of the positive electrode active material, the positive electrode active material layer that is obtained by coating the abovementioned slurry to the collector and drying is preferably compacted using a hand press, a roller press or the like. The density of the positive electrode active material layer is preferably 1 $g \cdot cm^{-3}$ or more, more preferably 1.5 $g \cdot cm^{-3}$ or more, and particularly preferably 2 $g \cdot cm^{-3}$ or more and is preferably 4 $g \cdot cm^{-3}$ or less, more preferably 3.5 $g \cdot cm^{-3}$ or less, and particularly preferably 3 $g \cdot cm^{-3}$ or less.

When the density of the positive electrode active material layer is in the indicated range, no decline occurs in the permeation of the non-aqueous electrolyte solution into the neighborhood of the current collector/active material interface and in particular excellent charge/discharge characteristics at high current densities are obtained. In addition, a reduction in the active material-to-active material electrical conductivity and an increase in the battery resistance are inhibited.

(Collector)

The material of the positive electrode collector is not particularly limited, and any known material can be used. Specific examples thereof include, for instance, metallic materials such as aluminum, stainless steel, nickel plating, titanium, tantalum or the like; and carbonaceous materials such as carbon cloth, carbon paper or the like. Aluminum is particularly preferred from among the above metallic materials.

In a case where the collector is a metallic material, the collector may be shaped, for instance, as a metal foil, metal cylinder, metal coil, metal plate, metal thin film, expanded metal, punched metal, foamed metal or the like. In the case of a carbonaceous material, the collector may be shaped as a carbon plate, carbon thin film, carbon cylinder or the like." A metal thin film is preferred among the foregoing. The thin film may be appropriately formed as a mesh.

The collector may be of any thickness, but the thickness is preferably 1 µm or greater, more preferably 3 µm or greater, and even more preferably 5 µm or greater, and preferably 1 mm or smaller, more preferably 100 µm or smaller and even more preferably 50 µm or smaller. When the thickness of the current collector is in the indicated range, the strength required for the current collector can be satisfactorily secured. The handling properties are also excellent.

The thickness ratio between the positive electrode active material layer and the thickness of the collector is not particularly limited, but (thickness of the active material layer on one side immediately prior to immersion in the non-aqueous electrolyte solution)/(thickness of the current collector) is preferably 150 or less, more preferably 20 or less, and particularly preferably 10 or less and is preferably 0.1 or more, more preferably a 0.4 or more, and particularly preferably 1 or more.

If the thickness ratio between the collector and the positive electrode active material layer lies within the above-mentioned range, the collector becomes less likely to heat up, on account of Joule heat, during charge and discharge at a high current density.

In addition, an increase in the proportion by volume of the current collector to the positive electrode active material is impeded and the battery capacity can be prevented from declining.

(The Electrode Area)

Viewed from the perspective of increasing the stability during high outputs and high temperatures, the area of the positive electrode active material layer is preferably made large relative to the exterior area of the case of the battery. In specific terms, the sum total of the electrode area of the previously described positive electrode is, as the area ratio, preferably 20 times or more and more preferably 40 times or more that of the surface area of the outside of the non-aqueous electrolyte secondary battery. The outer surface area of the case refers, in the case of a closed-bottom prismatic configuration, to the total area determined by calculation from the length, width, and thickness dimensions of the case part in which the electricity-producing element is packed, excluding the projections for the terminals. In the case of a closed-bottom cylindrical configuration, it is the geometric surface area for the approximation as a cylinder of the case part in which the electricity-producing element is packed, excluding the projections for the terminals. The sum total of the electrode area of the positive electrode is the geometric surface area of the positive electrode mixture layer that faces the mixture layer containing the negative electrode active material, and, for a structure in which a positive electrode mixture layer is formed on both sides of an intervening current collector foil, it refers to the total of the areas separately calculated for each side.

(The Discharge Capacity)

When the non-aqueous electrolyte solution is used, a large improvement in the low-temperature discharge characteristics is obtained when the electrical capacity (the electrical capacity when the battery is discharged from a fully charged state to a discharged state) possessed by the battery element housed in one outer battery package of the non-aqueous electrolyte secondary battery is at least 1 ampere-hour (Ah), and this is therefore preferred. As a consequence, the positive plate is designed to provide, for a full charge, a discharge capacity preferably of 3 Ah (ampere-hour) and more preferably at least 4 Ah, or preferably not more than 20 Ah and more preferably not more than 10 Ah.

Within the indicated range, the electrode reaction resistance-induced voltage drop during high-current take off does not become overly large and the power efficiency can be prevented from deteriorating. Moreover, the temperature distribution induced during pulse charge/discharge by heat generation within the battery does not become overly large and the phenomena of a deterioration in the durability to repeated charge/discharge and a deterioration in the heat dissipation efficiency with respect to sudden heat generation during an abnormality, e.g., overcharge or internal short circuiting, can be prevented.

(Thickness of the Positive Electrode Plate)

The thickness of the positive electrode plate is not particularly limited. In terms of high capacity, high output and high rate characteristic, however, the thickness of the positive electrode active material layer resulting from subtracting the thickness of the collector from that of the positive electrode plate, is, with respect to one face of the collector, preferably 10 µm or more, more preferably 20 µm or more, and is preferably 200 µm or less and more preferably 100 µm or less.

2-2. [Negative Electrode]

The negative electrode active material that is used in the negative electrode is not particularly limited, so long as it is capable of electrochemically absorbing and releasing a lithium ion. Specific examples thereof include, for instance, carbonaceous materials, metal compound based materials, lithium-containing metal complex oxide materials and the like. The foregoing may be used singly as one type, or concomitantly in the form of any combination of two or more types.

<2-2-1. Carbonaceous Material>

The carbonaceous material that is used as the negative electrode active material is not particularly limited; however, the carbonaceous material is preferably selected from the following (1) to (4) since in that case a good balance is struck between initial irreversible capacity and high current density charge-discharge characteristic.

(1) natural graphite;

(2) a carbonaceous material obtained as a result of one or several heating treatments, at a temperature ranging from 400 to 3200° C., of an artificial carbonaceous substance and an artificial graphitic substance;

(3) a carbonaceous material such that the negative electrode active material layer comprises at least two or more types of carbonaceous substances of dissimilar crystallinity, and/or a carbonaceous material having interfaces at which such carbonaceous substances of dissimilar crystallinity come into contact with each other;

(4) a carbonaceous material such that the negative electrode active material layer comprises at least two or more carbonaceous substances having dissimilar orientation, and/or a carbonaceous material having interfaces at which such carbonaceous substances of dissimilar orientation come into contact with each other.

The carbonaceous materials of (1) to (4) may be used singly as one type, or as two or more concurrent types in any combinations and ratios.

Specific examples of the artificial carbonaceous substance or artificial graphitic substance of (2) include, for instance, natural graphite, coal-based coke, petroleum coke, coal-based pitch, petroleum pitch, and products obtained as a result of an oxidation treatment of the foregoing pitches; needle coke, pitch coke and carbon materials resulting from partial graphitization thereof; furnace black, acetylene black and organic pyrolysis products of pitch-based carbon fibers or the like; a carbonizable organic material or a carbonized product thereof; and a liquid carbonized product resulting from dissolving a carbonizable organic material in a low-molecular weight organic solvent such as benzene, toluene, xylene, quinoline, n-hexane or the like.

With regard to the properties of the carbonaceous material, any one of the following items (1) to (8) is desirably satisfied or a plurality of these items are desirably satisfied simultaneously.

(X-Ray Parameters)

The d value (interlayer distance) of the lattice plane (002 plane) determined by x-ray diffraction by a method certified by the Japan Society for Promotion of Scientific Research (the Gakushin method) for the carbonaceous material is preferably 0.335 nm or more and is generally 0.360 nm or less and is preferably 0.350 nm or less and more preferably is 0.345 nm or less. In addition, the crystallite size (Lc) determined by x-ray diffraction by the Gakushin method is preferably 1.0 nm or more, more preferably 1.5 nm or more, and even more preferably 2 nm or more.

(2) Volume-Average Particle Diameter

The volume-average particle diameter of the carbonaceous material, which denotes the average particle diameter (median diameter), referred to volume, and that is worked out by laser diffraction/scattering, is ordinarily 1 μm or larger, more preferably 3 μm or larger, even more preferably 5 μm or larger, and particularly preferably 7 μm or larger, and is preferably 100 μm or smaller, more preferably 50 μm or smaller, even more preferably 40 μm or smaller, particularly preferably 30 μm or smaller, and more particularly preferably 25 μm or smaller." If the volume-average particle diameter lies within the abovementioned range, irreversible capacity does not excessively increase, which results in that loss of initial battery capacity is readily avoided. It is also desirable with regard to the battery fabrication process because a uniform coating surface is easily obtained during electrode fabrication by coating.

The volume-based average particle diameter is measured by dispersing a powder of the carbonaceous material in a 0.2 mass. % aqueous solution (approximately 10 mL) of the surfactant polyoxyethylene(20) sorbitan monolaurate and carrying out the measurement using a laser diffraction/scattering particle size distribution analyzer (LA-700 from Horiba, Ltd.). The median diameter obtained in the measurement is defined as the volume-average particle diameter of the carbonaceous material.

(3) Raman R Value, Raman Half-Value Width

The Raman R value of the carbonaceous material, as the value measured using the argon ion laser Raman spectrum method, is preferably 0.01 or more, more preferably 0.03 or more, and even more preferably 0.1 or more and is preferably 1.5 or less, more preferably 1.2 or less, even more preferably 1 or less, and particularly preferably 0.5 or less.

If the Raman R value lies within the abovementioned range, the crystallinity of the particle surface lies within a proper range, and it is possible to suppress a decrease in sites for Li intercalation between layers accompanying charge and discharge, i.e. charge acceptance is less likely to decrease.

In addition, a decline in the load characteristics can be inhibited also in those instances in which, after coating on the current collector, the density of the negative electrode is increased by pressing. The occurrence of a reduced efficiency and/or an increase in gas generation can also be inhibited.

The Raman half-value width around 1580 $cm^{-1}$ of the carbonaceous material is not particularly limited, and is 10 $cm^{-1}$ or larger, preferably 15 $cm^{-1}$ or larger, and generally 100 $cm^{-1}$ or smaller, preferably 80 $cm^{-1}$ or smaller, even more preferably 60 $cm^{-1}$ or smaller and particularly preferably 40 $cm^{-1}$ or smaller.

If the Raman half-value width lies within the abovementioned range, the crystallinity of the particle surface lies within a proper range, and it becomes capable of suppressing a decrease in sites for Li intercalation between layers accompanying charge and discharge, i.e. charge acceptance is less likely to decrease. In addition, a decline in the load characteristics can be inhibited also in those instances in which, after coating on the current collector, the density of the negative electrode is increased by pressing. The occurrence of a reduced efficiency and an increase in gas generation can also be inhibited.

The Raman spectrum is measured using a Raman spectrometer (Raman spectrometer, by JASCO) by filling a sample, through natural falling, into a measurement cell, and causing the cell to rotate within a plane perpendicular to an argon-ion laser beam while irradiating the sample surface in the cell with the laser beam. In the obtained Raman spectrum there is calculated the intensity ratio $R(R=I_B/I_A)$ between the intensity $I_A$ of peak $P_A$ around 1580 $cm^{-1}$ and the intensity $I_B$ of peak $P_B$ around 1360 $cm^{-1}$. The Raman R value calculated in the above-described measurement is defined as the Raman R value of the carbonaceous material of the present invention. The half-width of the peak $P_A$ around 1580 $cm^{-1}$ of the obtained Raman spectrum is measured, and the measured half-width is defined as the Raman half-value width of the carbonaceous material of the present invention.

The conditions of Raman measurement are as follows.

Wavelength of argon ion laser: 514.5 nm

Laser power on sample: 15 to 25 mW

Resolution: 10 to 20 $cm^{-1}$

Examination range: 1100 $cm^{-1}$ to 1730 $cm^{-1}$

Raman R value, Raman half-value width analysis: background processing

Smoothing: simple average, 5-point convolution (4) BET Specific Surface Area

The BET specific surface area of the carbonaceous material, as the value of the specific surface area measured using the BET method, is preferably 0.1 $m^2 \cdot g^{-1}$ or larger, more preferably 0.7 $m^2 \cdot g^{-1}$ or larger, even more preferably 1.0 $m^2 \cdot g^{-1}$ or larger, and particularly preferably 1.5 $m^2 \cdot g^{-1}$ or larger and is preferably 100 $m^2 \cdot g^{-1}$ or smaller, more preferably 25 $m^2 \cdot g^{-1}$ or smaller, even more preferably 15 $m^2 \cdot g^{-1}$ or smaller, and particularly preferably 10 $m^2 \cdot g^{-1}$ or smaller.

If the value of BET specific surface area of the material lies within the abovementioned range, acceptance of cation such as lithium is good during charging, in a case where the material is used as a negative electrode material; also, lithium or the like is less likely to precipitate on the electrode surface, and a decrease in stability is readily avoided.

Moreover, the reactivity with the non-aqueous electrolyte solution can be inhibited and there is little gas generation and a preferred battery is thus readily obtained.

The measurement of the specific surface area by the BET method is carried out using a surface area analyzer (a fully automatic surface area analyzer from Ohkura Riken Co., Ltd.) by subjecting the sample to a preliminary drying for 15 minutes at 350° C. under a nitrogen current and carrying out the BET nitrogen adsorption single-point method using the gas flow technique and using a nitrogen-helium mixed gas precisely adjusted to provide a value of 0.3 for the relative pressure of the nitrogen versus atmospheric pressure. The specific surface area worked out according to the above-described measurement is defined as the BET specific surface area of the carbonaceous material of the present invention.

(5) The Circularity

The circularity measured as an index of the spherical shape of the carbonaceous material preferably falls in the range given in the following. The circularity is defined as "circularity=(length of the circumference of the equivalent circle having the same area as the particle projected shape)/(length of the actual circumference of the particle projected shape)", and a circularity of 1 indicates a theoretically perfect sphere.

A circularity for the carbonaceous material particles with a diameter in the 3 to 40 μm range closer to 1 is more desirable, and is preferably 0.1 or higher, more preferably 0.5 or higher, even more preferably 0.8 or higher, particularly preferably 0.85 or higher, and very particularly preferably 0.9 or higher.

The high current density charge/discharge characteristics are generally better at higher circularity values. Accordingly, when the circularity is below the range indicated above, the packing behavior of the negative electrode active material may decline, the particle-to-particle resistance may increase, and the short-duration high current density charge/discharge characteristics may decline.

The circularity of the carbonaceous material is measured using a flow-type particle image analyzer (FPIA from the Sysmex Corporation). Specifically, approximately 0.2 g of the sample is dispersed in a 0.2 mass % aqueous solution (approximately 50 mL) of the surfactant polyoxyethylene (20) sorbitan monolaurate and is exposed for 1 minute to 28 kHz ultrasound at an output of 60 W; the detection range is then set to 0.6 to 400 μm; and measurement is carried out on the particles in the 3 to 40 μm diameter range. The circularity determined by this measurement is defined as the circularity of the carbonaceous material in the present invention.

There are no particular limitations on methods for increasing the circularity, but a carbonaceous material made into a spherical shape by the execution of a sphericizing treatment is preferred because the shape of the interparticle voids is then ordered when this is made into the electrode body. The sphericizing treatment can be exemplified by the following: methods in which the spherical shape is approximated through the application of shear force or compressive force; mechanical•physical treatment methods in which a plurality of finely divided particles are granulated using a binder or the attachment forces intrinsic to the particles themselves.

(6) Tap Density

The tap density of the carbonaceous material is preferably 0.1 g·cm$^{-3}$ or more, more preferably 0.5 g·cm$^{-3}$ or more, even more preferably 0.7 g·cm$^{-3}$ or more, and particularly preferably 1 g·cm$^{-3}$ or more. It is preferably 2 g·cm$^{-3}$ or less, more preferably 1.8 g·cm$^{-3}$ or less, and particularly preferably 1.6 g·cm$^{-3}$ or less.

If the tap density of the material lies within the abovementioned range, packing density can be sufficiently secured when the material is used as the negative electrode, and a high-capacity battery can be obtained.

Moreover, the interparticle gap in the electrode is not overly small, the particle-to-particle electrical conductivity is secured, and preferred battery characteristics are then readily obtained.

The tap density is measured as follows: the sample is passed through a sieve with an aperture of 300 μm down into a 20 cm$^3$ tapping cell and the sample is filled to the upper end surface of the cell; using a powder density analyzer (for example, a Tap Denser from Seishin Enterprise Co., Ltd.), 1000 taps with a stroke length of 10 mm are then administered; and the tap density is calculated from the volume at this point and the mass of the sample. The tap density calculated according to the above measurement is defined as the tap density of the carbonaceous material of the present invention.

(7) The Orientation Ratio

The orientation ratio of the carbonaceous material is preferably 0.005 or more, more preferably 0.01 or more, and even more preferably 0.015 or more and is preferably 0.67 or less. The high-density charge-discharge characteristic may become poorer if the orientation ratio is below the above-described range. The upper limit of the abovementioned range is the theoretical upper limit value of the orientation ratio of the carbonaceous material.

The orientation ratio of the carbonaceous material is determined by measurement by x-ray diffraction after the sample has been press molded. Specifically, a sample of 0.47 g is stuffed into a 17 mm-diameter molding machine, and is compressed at 58.8 MNm-2, to yield a molded product that is then measured by X-ray diffraction by being set flush with the surface of a measurement sample holder, using clay. The ratio represented by (110) diffraction peak intensity/(004) diffraction peak intensity is calculated from the peak intensities of (110) diffraction and (004) diffraction for carbonaceous material. The orientation ratio as calculated in the above-described measurement is defined as the orientation ratio of the carbonaceous material of the present invention.

The X-ray diffraction measurement conditions in this case are as follows. Herein, "2θ" is the diffraction angle.

Target: Cu(Kα rays) graphite monochromator

Slit:

Divergent slit=0.5 degrees

Light-receiving slit=0.15 mm

Scattering slit=0.5 degrees

Examination range and step angle/measurement time:

(110) plane: 75 degrees≤2θ≤80 degrees 1 degree/60 seconds (004) plane: 52 degrees≤2θ≤57 degrees 1 degree/60 seconds (8) Aspect Ratio (Powder)

The aspect ratio of the carbonaceous material is ordinarily 1 or more, and ordinarily 10 or less, preferably 8 or less and more preferably 5 or less. If the aspect ratio lies out of the abovementioned range, streaks may appear during formation of electrode plates, a homogeneous coating surface may fail to be achieved, and the charge-discharge characteristic at a high current density may be impaired. The lower limit of the abovementioned range is a theoretical lower limit value of the aspect ratio of the carbonaceous material.

The aspect ratio of the carbonaceous material is measured through observation of enlarged scanning electron micrographs of the carbonaceous material particles. Specifically, there are selected 50 arbitrary carbonaceous material particles fixed to the edge face of metal of thickness no more than 50 μm. The particles are observed each three-dimensionally through rotation and tilting of a stage to which the sample is fixed. The longest length A, and the shortest length B perpendicular thereto, of each carbonaceous material particle, are measured, and the average value of A/B is worked out. The aspect ratio (A/B) worked out in the above-described measurement is defined as the aspect ratio of the carbonaceous material of the present invention.

<2-2-2. Metal Compound-Type Material>

The metal compound based material that is used as the negative electrode active material is not particularly limited so long as it is capable of absorbing and releasing lithium, and may be any from among a single metal or alloy that forms a lithium alloy, or a compound, for instance an oxide, carbide, nitride, silicide, sulfide or phosphide of the foregoing. Such metal compounds can be exemplified by compounds that contain a metal such as Ag, Al, Ba, Bi, Cu, Ga, Ge, In, Ni, P, Pb, Sb, Si, Sn, Sr, Zn, and so forth. Among the preceding, a simple metal or alloy that will form a lithium alloy is preferred; a material containing a metal•semimetal (i.e., excluding carbon) from Group 13 or 14 of the Periodic Table is more preferred; and the simple metal form of silicon (Si), tin (Sn), or lead (Pb) (these three elements are also referred to as the "SSP metal elements" in the following), alloys containing these atoms, and compounds of these metals (the SSP metal elements) are more preferred. These metals may be used singly as one type, or as two or more concurrent types in any combinations and ratios.

Examples of the negative electrode active material having at least one type of atom selected from among the SSP metal elements include, for instance, a single metal of any one type of the SSP metal elements; alloys comprising two or more types of the SSP metal elements; alloys that comprise one type or two or more types of the SSP metal elements plus another one type or two or more types of metal elements; compounds containing one type or two or more types of the SSP metal elements; or complex compounds thereof, such as oxides, carbides, nitrides, silicides, sulfides or phosphides. The capacity of the battery can be increased through the use of these single metals, alloys and metal compounds as the negative electrode active material.

Examples of the complex compounds include, for instance, compounds wherein a plurality of types of elements, for instance single metals, alloys and non-metallic elements, are bonded to each other in complex manners. More specifically, in the case of silicon and tin, for instance, there can be used alloys of these elements with metals that do not act as a negative electrode. In the case of tin, for instance, there can be used a complex compound that comprises 5 to 6 elements including a combination of a metal, other than tin and silicon, that acts as a negative electrode, a metal that does not act as a negative electrode, and a non-metallic element.

From among the abovementioned negative electrode active materials there is preferably used, for instance, any one single metal of the SSP metal elements, or an alloy of two or more types of the SSP metal elements, or an oxide, carbide or nitride of the SSP metal elements, on account of the substantial capacity per unit mass that is afforded in the resulting battery. In particular, a single metal, alloy, oxide, carbide, nitride or the like of silicon and/or tin is preferably used in terms of capacity per unit mass and environmental impact.

In addition, while the capacity per unit mass is worse than for the use of the simple metal or alloy, the following compounds containing silicon and/or tin are also preferred for the better cycle characteristics they provide.

"Silicon and/or tin oxides" in which the elemental ratio between the silicon and/or tin and oxygen is generally 0.5 or more, preferably 0.7 or more, and more preferably 0.9 or more and is generally 1.5 or less, preferably 1.3 or less, and more preferably 1.1 or less.

"Silicon and/or tin nitrides" in which the elemental ratio between the silicon and/or tin and nitrogen is generally 0.5 or more, preferably 0.7 or more, and more preferably 0.9 or more and is generally 1.5 or less, preferably 1.3 or less, and even more preferably 1.1 or less.

"Silicon and/or tin carbides" in which the elemental ratio between the silicon and/or tin and carbon is generally 0.5 or more, preferably 0.7 or more, and more preferably 0.9 or more and is generally 1.5 or less, preferably 1.3 or less, and more preferably 1.1 or less. The abovementioned negative electrode active materials may be used singly as one type, or as two or more concurrent types in any combinations and ratios.

<2-2-3. Lithium-Containing Metal Composite Oxide Materials>

The lithium-containing metal complex oxide material used as the negative electrode active material is not particularly limited, so long as it is capable of absorbing and releasing lithium, but it is preferably a lithium-containing complex metal oxide material that comprises titanium, and particularly preferably a complex oxide of lithium and titanium (hereafter also referred to as "lithium-titanium composite oxide" for short). In particular, there is preferably used a negative electrode active material for lithium ion nonaqueous electrolyte secondary batteries that comprises a lithium-titanium composite oxide having a spinel structure, since output resistance is significantly reduced in such a case.

Preferably, lithium and/or titanium in the lithium-titanium composite oxide are preferably substituted with another metal element, for instance at least one type of element selected from the group consisting of Na, K, Co, Al, Fe, Ti, Mg, Cr, Ga, Cu, Zn and Nb. This metal oxide used for the negative electrode active material is preferably a lithium-titanium composite oxide with general formula (A) below wherein $0.7 \leq x \leq 1.5$, $1.5 \leq y \leq 2.3$, and $0 \leq z \leq 1.6$ in general formula (A), because this has a stable structure during lithium ion doping•dedoping.

$$Li_x Ti_y M_z O_4 \qquad (A)$$

(In formula (A), M denotes at least one type of element selected from the group consisting of Na, K, Co, Al, Fe, Ti, Mg, Cr, Ga, Cu, Zn and Nb).

From among the compositions represented by formula (A), particularly preferred are those wherein Among the compositions represented by general formula (A), structures in which (a) $1.2 \leq x \leq 1.4$, $1.5 \leq y \leq 1.7$, $z=0$
(b) $0.9 \leq x \leq 1.1$, $1.9 \leq y \leq 2.1$, $z=0$
(c) $0.7 \leq x \leq 0.9$, $2.1 \leq y \leq 2.3$, $z=0$ are particularly preferred for their good balance among battery characteristics.

Particularly preferred representative compositions of the above compounds include $Li_{4/3}Ti_{5/3}O_4$ for (a), $Li_1 Ti_2 O_4$ for (b) and $Li_{4/5}Ti_{11/5}O_4$ for (c). Preferred instances of a structure where $z \neq 0$ include $Li_{4/3}Ti_{4/3}Al_{1/3}O_4$. In addition to the conditions provided above, the lithium-titanium composite oxide used as a negative electrode active material in the present invention preferably satisfies at least one of the characteristics in the following <1> to <8> with regard to properties, shape, and so forth, and more preferably simultaneously satisfies a plurality of these.

<1> BET Specific Surface Area

The BET specific surface area of the lithium-titanium composite oxide used as a negative electrode active material, as the value of the specific surface area measured using the BET method, is preferably 0.5 $m^2 \cdot g^{-1}$ or more, more preferably 0.7 $m^2 \cdot g^{-1}$ or more, even more preferably 1.0 $m^2 \, g^{-1}$ or more, and particularly preferably 1.5 $m^2 \cdot g^{-1}$ or more and is preferably 200 $m^2 \cdot g^{-1}$ or less, more preferably 100 $m^2 \cdot g^{-1}$ or less, even more preferably 50 $m^2 \cdot g^{-1}$ or less, and particularly preferably 25 $m^2 \cdot g^{-1}$ or less.

When the BET specific surface area is in the indicated range, this tends to keep the reaction area in contact with the non-aqueous electrolyte solution during use as a negative electrode material from declining and prevents the output resistance from increasing. In addition, the increase in the surface region or edge region of the crystals of the titanium-containing metal oxide is restrained, which also inhibits the generation of the crystal strain caused by this, and as a result a preferred battery is readily obtained.

The specific surface area of the lithium-titanium composite oxide is measured by the BET method using a surface area analyzer (for example, a fully automatic surface area analyzer from Ohkura Riken Co., Ltd.) by subjecting the sample to a preliminary drying for 15 minutes at 350° C. under a nitrogen current and then performing the measurement using the BET nitrogen adsorption single-point method and the gas flow technique and using a nitrogen-helium mixed gas precisely adjusted to provide a value of 0.3 for the relative pressure of the nitrogen versus atmospheric pressure. The specific surface area worked out according to the above-described measurement is defined as the BET specific surface area of the lithium-titanium composite oxide of the present invention.

<2> Volume-Average Particle Diameter

The volume-based average particle diameter (the secondary particle diameter when the primary particles undergo aggregation to form secondary particles) of the lithium-titanium composite oxide is defined as the volume-based average particle diameter (median diameter) determined by a laser diffraction•scattering method.

The volume-based average particle diameter of the lithium-titanium composite oxide is preferably 0.1 μm or larger, more preferably 0.5 μm or larger, and even more preferably 0.7 μm or larger and is preferably 50 μm or smaller, more preferably 40 μm or smaller, even more preferably 30 μm or smaller, and particularly preferably 25 μm or smaller.

The volume-based average particle diameter of the lithium-titanium composite oxide is measured specifically by dispersing a powder of the lithium-titanium composite oxide in a 0.2 mass % aqueous solution (10 mL) of the surfactant polyoxyethylene(20) sorbitan monolaurate and carrying out the measurement using a laser diffraction•scattering particle size distribution analyzer (LA-700 from Horiba, Ltd.). The median diameter obtained in the measurement is defined as the volume-average particle diameter of the lithium-titanium composite oxide.

When the volume-based average particle diameter of the lithium-titanium composite oxide is in the indicated range, the amount of binder for negative electrode fabrication can be kept down and the battery capacity is easily prevented from declining as a result. It is also desirable with regard to the battery fabrication process because a uniform coating surface is easily obtained during fabrication of the negative electrode plate.

<3> Average Primary Particle Diameter

In those instances in which the primary particles undergo aggregation to form secondary particles, the average primary particle diameter of the lithium-titanium composite oxide is preferably 0.01 μm or larger, more preferably 0.05 μm or larger, even more preferably 0.1 μm or larger, and particularly preferably 0.2 μm or larger and is preferably 2 μm or smaller, more preferably not more than 1.6 μm or smaller, even more preferably 1.3 μm or smaller, and particularly preferably 1 μm or smaller. When the volume-based average primary particle diameter is in the indicated range, spherical secondary particles are readily formed and the specific surface is readily secured and as a result the battery performance, e.g., the output characteristics and so forth, is readily kept from declining.

The primary particle size of the lithium-titanium composite oxide is measured through observation using a scanning electron microscope (SEM). Specifically, the largest value of a section by a left-right boundary of primary particles with respect to a straight line in the horizontal direction, is worked out, in micrographs at a magnification that allows particles to be confirmed for example, at a 10000 to 100000× magnification, for 50 arbitrary primary particles. The average of the values is taken then as the primary particle size.

<4> Shape

The shape of the particles of the lithium-titanium composite oxide may be any from among lumpy, polyhedral, spherical, oval-spherical, plate-like, needle-like or columnar, as in conventional instances. Preferred among the foregoing, however, is a spherical to oval-spherical shape in secondary particles that are formed through aggregation of primary particles.

In electrochemical elements, ordinarily, the active materials in the electrodes expand and contract accompanying charge and discharge of the element. The resulting stress is likely to give rise to deterioration of the active material on account of breakage or conductive path depletion. Therefore, in order to relieve stress derived from expansion and contraction and avert thereby deterioration, an active material in which secondary particles are formed through aggregation of primary particles is preferable to a single-particle active material of primary particles alone.

Herein, spherical to oval-spherical particles are preferable to particles having axial orientation, such as plate-like particles or the like, since in the former case orientation during electrode molding is low, and, accordingly, expansion and contraction of the electrodes during charge and discharge is likewise low, while, moreover, homogeneous mixing with the conductive material is likelier to be achieved during production of the electrode.

<5> Tap Density

The tap density of the lithium titanate composite oxide is preferably 0.05 g·cm$^{-3}$ or more, more preferably 0.1 g·cm$^{-3}$ or more, even more preferably 0.2 g·cm$^{-3}$ or more, and particularly preferably 0.4 g·cm$^{-3}$ or more and is also preferably 2.8 g·cm$^3$ or less, even more preferably 2.4 g·cm$^{-3}$ or less, and particularly preferably 2 g·cm$^{-3}$ or less. When the tap density of the lithium-titanium composite oxide is in the indicated range, a satisfactory packing density for use as a negative electrode can be secured and the particle-to-particle contact area can also be secured, and as a result the particle-to-particle resistance can be kept from increasing and the output resistance is readily prevented from increasing. In addition, the interparticle voids in the electrode will also be favorable and as a consequence flow paths for the non-aqueous electrolyte solution can be secured, and as a result the output resistance can be readily kept from increasing.

The tap density of the lithium-titanium composite oxide is measured as follows: the sample is passed through a sieve with an aperture of 300 μm down into a 20 cm$^3$ tapping cell and the sample is filled to the upper end surface of the cell; using a powder density analyzer (for example, a Tap Denser from Seishin Enterprise Co., Ltd.), 1000 taps with a stroke length of 10 mm are then administered; and the density is calculated from the volume at this point and the mass of the sample. The tap density calculated according to the above measurement is defined as the tap density of the lithium-titanium composite oxide of the present invention.

<6> Circularity

The circularity measured as an index of the spherical shape of the lithium-titanium composite oxide preferably falls in the range given in the following. The circularity is defined as "circularity=(length of the circumference of the equivalent circle having the same area as the particle projected shape)/(length of the actual circumference of the particle projected shape)", and a circularity of 1 indicates a theoretically perfect sphere.

A circularity for the lithium-titanium composite oxide closer to 1 is more desirable. It is preferably 0.10 or higher, more preferably 0.80 or higher, even more preferably 0.85 or higher, and particularly preferably 0.90 or higher. The high current density charge/discharge characteristics are generally better at higher circularity values. Accordingly, when the circularity is within the range indicated above, there is no decline in the packing behavior of the negative electrode active material, an increase in the particle-to-particle resistance can be prevented, and the short-duration high current density charge/discharge characteristics can be prevented from declining.

The circularity of the lithium-titanium composite oxide is measured using a flow-type particle image analyzer (FPIA from the Sysmex Corporation). Specifically, approximately 0.2 g of the sample is dispersed in a 0.2 mass % aqueous solution (approximately 50 mL) of the surfactant polyoxyethylene(20) sorbitan monolaurate and is exposed for 1 minute to 28 kHz ultrasound at an output of 60 W; the detection range is then set to 0.6 to 400 μm; and measurement is carried out on the particles in the 3 to 40 μm diameter range. The circularity determined by this measurement is defined as the circularity of the lithium-titanium composite oxide in the present invention.

<7> Aspect Ratio

The aspect ratio of the lithium-titanium composite oxide is preferably at least 1 and is preferably not more than 5, more preferably not more than 4, even more preferably not more than 3, and particularly preferably not more than 2. If the aspect ratio lies within the abovementioned range, streaks are less likely to appear during formation of electrode plates, a homogeneous coating surface is readily achieved, and a decrease in the charge-discharge characteristic at a short time high current density can be prevented. The lower limit of the abovementioned range is a theoretical lower limit value of the aspect ratio of the lithium-titanium composite oxide.

The aspect ratio of the lithium-titanium composite oxide is measured by magnification and observation of particles of the lithium-titanium composite oxide using a scanning electron microscope. There are selected 50 arbitrary lithium-titanium composite oxide particles fixed to the edge face of metal of thickness no more than 50 μm. The particles are observed each three-dimensionally through rotation and tilting of a stage to which the sample is fixed. The longest length A, and the shortest length B perpendicular thereto, of each particle, are measured, and the average value of A/B is worked out. The aspect ratio (A/B) worked out in the above-described measurement is defined as the aspect ratio of the lithium-titanium composite oxide of the present invention.

<8> Method for Producing the Lithium-Titanium Composite Oxide

Within a range in which the essential features of the present invention are not exceeded, there are no particular limitations on the method for producing the lithium-titanium composite oxide. Several methods are provided as examples, and general methods may be used to produce the inorganic compounds themselves.

One example is a method in which a titanium starting material, e.g., titanium oxide, as necessary starting materials for other elements, and an Li source, e.g., LiOH, $Li_2CO_3$, $LiNO_3$, and so forth, are mixed evenly and the active material is then obtained by calcination at high temperatures.

Various methods may be contemplated in particular for producing a spherical or oval active material. In an example of one such method, the titanium starting material, e.g., titanium oxide, and as necessary starting materials for other elements are dissolved or pulverized and dispersed in a solvent, e.g., water; the pH is adjusted while stirring and a spherical precursor is produced and recovered; this is dried as necessary; an Li source, e.g., LiOH, $Li_2CO_3$, $LiNO_3$, and so forth, is subsequently added; and the active material is then obtained by high-temperature calcination.

In an example of another method, the titanium starting material, e.g., titanium oxide, and as necessary starting materials for other elements are dissolved or pulverized and dispersed in a solvent, e.g., water; this is made into a spherical to oval precursor by drying and forming with, e.g., a spray dryer; an Li source, e.g., LiOH, $Li_2CO_3$, $LiNO_3$, and so forth, is added to this; and the active material is then obtained by high-temperature calcination.

In an example of yet another method, the titanium starting material, e.g., titanium oxide, an Li source, e.g., LiOH, $Li_2CO_3$, $LiNO_3$, and so forth, and as necessary starting materials for other elements are dissolved or pulverized and dispersed in a solvent, e.g., water; this is made into a spherical to oval precursor by drying and forming with, e.g., a spray dryer; and the active material is then obtained by high-temperature calcination.

Moreover, in these processes, an element other than Ti, for example, Al, Mn, Ti, V, Cr, Mn, Fe, Co, Li, Ni, Cu, Zn, Mg, Ga, Zr, C, Si, Sn, and Ag, may also be present in the titanium-containing metal oxide structure and/or in a form in contact with the titanium-containing oxide. The operating voltage and capacity of the battery can be controlled through the presence of these elements.

<2-2-4. Structure and Properties of the Negative Electrode and the Method of Producing the Negative Electrode>

The negative electrode containing an active material as described above, the means of conversion into an electrode, the current collector, and the non-aqueous electrolyte secondary battery desirably satisfy any one of the following (i) to (vi) or a plurality of these items simultaneously.

(i) Negative Electrode Fabrication

Any known method can be used to produce the negative electrode, so long as the effect of the present invention is not significantly limited thereby. For instance, the binder, the solvent and, as the case may require, a thickener, a conductive material, a filler and the like, are added to the negative electrode active material, to yield a slurry that is then applied onto a collector and is dried, followed by pressing. The negative electrode can be formed thereby.

(ii) The Current Collector

Any known collector can be used as the collector that holds the negative electrode active material. Examples of the metallic material of the collector of the negative electrode include, for instance, aluminum, copper, nickel, stainless steel, nickel-plated steel or the like, but preferably copper, in terms of cost and ease of processing.

In a case where the collector is a metallic material, the collector may be shaped, for instance, as a metal foil, metal cylinder, metal coil, metal plate, metal thin film, expanded metal, punched metal, foamed metal or the like. Preferably, the collector is a metal thin film, more preferably a copper foil, and even more preferably a rolled copper foil obtained by rolling process and an electrolytic copper foil obtained by electrolytic process, and both of them can be used as a collector.

When the thickness of the copper foil is thinner than 25 μm, a copper alloy (phosphor bronze, titanium copper, Corson alloy, Cu—Cr—Zr alloy, and so forth) having a higher strength than pure copper can be used.

(iii) The Thickness Ratio Between of the Collector and the Negative Electrode Active Material Layer The ratio between the thicknesses of the collector and the negative electrode active material layer is not particularly limited, but the value of "(thickness of the negative electrode active material layer on one side immediately prior to injection setup of nonaqueous electrolyte solution)/(collector thickness)" is preferably 150 or less, more preferably 20 or less, and particularly preferably 10 or less, and preferably 0.1 or more, more preferably 0.4 or more and particularly preferably 1 or more.

If the ratio between the thicknesses of the collector and the negative electrode active material layer exceeds the abovementioned range, the collector may heat up, on account of Joule heat, during charge and discharge at a high current density. In addition, below the indicated range, the proportion by volume of the current collector with respect to the negative electrode active material increases and the capacity of the battery may decline.

(iv) Electrode Density

There are no particular limitations on the electrode structure when the negative electrode active material is converted into an electrode, and the density of the negative electrode active material present on the current collector is preferably 1 g·cm$^{-3}$ or more, more preferably 1.2 g·cm$^{-3}$ or more, and even more preferably 1.3 g·cm$^{-3}$ or more and is preferably 4 g·cm$^{-3}$ or less, more preferably 3 g·cm$^{-3}$ or less, even more preferably 2.5 g·cm$^{-3}$ or less, and particularly preferably 1.7 g·cm$^{-3}$ or less. If the density of the negative electrode active material that is present on the collector lies within the abovementioned range, negative electrode active material particles are less likely to break, increase in initial irreversible capacity and the high-current density charge-discharge characteristic deterioration on account of lower permeability of the nonaqueous electrolyte solution in the vicinity of the interface of the collector/negative electrode active material are readily prevented.

Moreover, the negative electrode active material-to-negative electrode active material electrical conductivity can be secured, an increased battery resistance does not occur, and the capacity per unit volume can be realized.

(v) The Binder, Solvent, and so Forth

The slurry for formation of the negative electrode active material layer is generally prepared by adding the binder, thickener, and so forth, for the negative electrode active material to a solvent. The binder that binds the negative electrode active material is not particularly limited, provided that it is a stable material towards the nonaqueous electrolyte solution and towards the solvent that is used during the production of the electrodes.

Specific examples thereof include, for instance, resin-based polymers such as polyethylene, polypropylene, polyethylene terephthalate, polymethyl methacrylate, aromatic polyamide, cellulose, nitrocellulose or the like; rubber-like polymers such as SBR (styrene-butadiene rubber), isoprene rubber, butadiene rubber, fluororubber, NBR (acrylonitrile-butadiene rubber), ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride, polytetrafluoroethylene, fluorinated polyvinylidene fluoride, polytetrafluoroethylene-ethylene copolymers and the like; and polymer compositions having ionic conductivity towards alkali metal ions (in particular, lithium ions). The foregoing may be used singly as one type, or as two or more concurrent types in any combinations and ratios.

The solvent used for forming the slurry is not particularly limited, and may be any aqueous solvent or organic solvent, provided that the solvent can dissolve or disperse the negative electrode active material, the binder, as well as a thickener and conductive material that are used as the case may require.

Examples of aqueous solvents include, for instance, water and alcohol. Examples of organic solvents include, for instance, N-methylpyrrolidone (NMP), dimethyl formamide, dimethyl acetamide, methyl ethyl ketone, cyclohexanone, methyl acetate, methyl acrylate, diethyl triamine, N,N-dimethylaminopropyl amine, tetrahydrofuran (THF), toluene, acetone, diethyl ether, dimethyl acetamide, hexamethylphosphoric amide, dimethyl sulfoxide, benzene, xylene, quinoline, pyridine, methyl naphthalene, hexane or the like.

In the case where an aqueous solvent is used, it is preferable to add a dispersant or the like in conjunction with the thickener, and to form a slurry using a latex of SBR or the like.

These solvents may be used singly as one type, or as two or more concurrent types in any combinations and ratios. The percentage for the binder with respect to the negative electrode active material is preferably 0.1 mass % or more, more preferably 0.5 mass % or more, and even more preferably 0.6 mass % or more and is preferably 20 mass % or less, more preferably 15 mass % or less, even more preferably 10 mass % or less, and particularly preferably 8 mass % or less. If the proportion of the binder in the negative electrode active material lies within the abovementioned range, there is no increase in the proportion of binder that makes no contribution to battery capacity, and battery capacity is less likely to drop.

Moreover, a reduction in the strength of the negative electrode can also be impeded.

When, in particular, a rubbery polymer, as typified by SBR, is incorporated for the major component, the percentage of the binder with reference to the negative electrode active material is preferably 0.1 mass % or more, more preferably 0.5 mass % or more, and even more preferably 0.6 mass % or more and is preferably 5 mass % or less, more preferably 3 mass % or less, and even more preferably 2 mass % or less. In a case where the main component is a fluoropolymer typified by polyvinylidene fluoride, the proportion of the binder to the negative electrode active material is preferably 1 wt % or more, more preferably 2 wt % or more, even more preferably 3 wt % or more, and preferably 15 wt % or less, more preferably 10 wt % or less and even more preferably 8 wt % or less.

A thickener is ordinarily used in order to adjust the viscosity of the slurry. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios.

When a thickener is used, the percentage of the thickener with reference to the negative electrode active material is generally 0.1 mass % or more and is preferably 0.5 mass % or more and more preferably 0.6 mass % or more. In addition, it is generally 5 mass % or less and is preferably 3 mass % or less and more preferably 2 mass % or less. An excellent coating performance is obtained when the percentage of the thickener with reference to the negative electrode active material is in the indicated range. Furthermore, the proportion of negative electrode active material in the negative electrode active material layer becomes appropriate, and problems such as lower battery capacity, and greater resistance between negative electrode active material particles are less likely to occur.

(vi) The Area of the Negative Plate

The area of the negative plate is not particularly limited, but is preferably designed to be slightly larger than the opposing positive plate in order to prevent the positive plate from extending out beyond the negative plate. In addition, viewed from the standpoint of inhibiting the deterioration induced by high-temperature storage and/or a repetitive charge/discharge cycle life, the area is preferably brought as near as possible to the same area as the positive electrode because this improves the characteristics by increasing the percentage of the electrode capable of a more uniform and effective operation. In particular, the design of the area of this negative plate is critical in the case of high-current use.

2-3. Separator

Ordinarily, a separator is interposed between the positive electrode and the negative electrode, in order to prevent short-circuits. Ordinarily, the nonaqueous electrolyte solution of the present invention is used by being impregnated into such a separator.

The material and shape of the separator are not particularly limited, and any known materials and shapes may be used, so long as the effect of the present invention is not significantly impaired thereby. Among the foregoing there are preferably used, for instance, a resin, glass fibers, inorganic materials or the like that are formed out of a stable material towards the nonaqueous electrolyte solution of the present invention, in the form of a porous sheet or nonwoven fabric-like member having excellent liquid retention.

Examples of materials of resin and glass-fiber separators include, for instance, polyolefins such as polyethylene or polypropylene, aramid resin, polytetrafluoroethylene, polyether sulfone, glass filters and the like. Preferred among the foregoing are glass filters and polyolefins, and even more preferably polyolefins." "These materials may be used singly as one type, or as two or more concurrent types in any combinations and ratios.

The abovementioned separator may be of any thickness, but the thickness is preferably 1 µm or more, more preferably 5 µm or more, even more preferably 10 µm or more, and preferably 50 µm or less, more preferably 40 µm or less and even more preferably 30 µm or less. When the separator thickness is in the indicated range, excellent insulating characteristics and an excellent mechanical strength are obtained. In addition, the battery characteristics, e.g., the rate characteristics and so forth, can be prevented from declining and the energy density for the non-aqueous electrolyte secondary battery as a whole can also be prevented from declining.

When using a porous separator such as a porous sheet or a nonwoven fabric, the separator may have any porosity, but the porosity is preferably 20% or more, more preferably 35% or more, and even more preferably 45% or more, and preferably 90% or less, more preferably 85% or less and even more preferably 75% or less. When the porosity is in the indicated range, the film resistance is then not too large and the rate characteristics can be prevented from deteriorating. In addition, the mechanical strength of the separator is also favorable and a decline in the insulating characteristics can also be inhibited.

The average pore diameter of the separator may also be freely selected, but is preferably not more than 0.5 µm and more preferably is not more than 0.2 µm and is preferably at least 0.05 µm. Short-circuits are less likely to occur if the average pore diameter lies within the abovementioned range. In addition, the film resistance is also not too large and the rate characteristics can be prevented from deteriorating. The inorganic material that is used is, for instance, oxides such as alumina or silicon dioxide, nitrides such as aluminum nitride or silicon nitride, or sulfates such as barium sulfate or calcium sulfate, in the form of particles or fibers.

The separator may be used in the form of a thin film of a nonwoven fabric, a woven fabric, a micro-porous film or the like. As regards thin-film shape, a thin film having a pore diameter ranging from 0.01 to 1 µm and thickness ranging from 5 to 50 µm is appropriately used. Other than the aforementioned independent thin-film shape, a separator can also be used that is obtained by forming, on the surface layer of the positive electrode and/or the negative electrode, a composite porous layer containing particles of the aforementioned inorganic material, using a resin binder. For instance, a porous layer can be formed, on both sides of a positive electrode, out of alumina particles such that 90%-particle size is smaller than 1 µm, using a fluororesin as a binder.

2-4. Battery Design (Electrode Group)

The electrode group may be a stacked structure in which the aforementioned separator is interposed between the aforementioned positive electrode plate and negative electrode plate, or a structure wherein the aforementioned positive electrode plate and negative electrode plate are wound spirally, with the aforementioned separator interposed in between. The proportion of the volume of the electrode group in the internal volume of the battery (hereafter, referred to as electrode group occupancy rate) is preferably 40% or more, more preferably 50% or more, and preferably 95% or less, more preferably 90% or less. Battery capacity is less likely to decrease if the electrode group occupancy rate lies within the abovementioned range. Since appropriate void spaces can be secured, when the battery reaches a high temperature, expansion of various members, a rise in the internal pressure through increased vapor proportion of the liquid components of the electrolyte, and various battery characteristics deterioration, for instance charge-discharge repetition performance and high-temperature storage, and in some instances operation of a gas release valve that relieves internal pressure to the exterior, can be avoided.

(Collector Structure)

The collector structure is not particularly limited, but elaboration as a structure that reduces the resistance of the interconnect elements and joint elements is preferred in order to more effectively realize the improvement in the discharge characteristics provided by the non-aqueous electrolyte solution of the present invention. Such a reduction in the internal resistance enables a particularly excellent manifestation of the effects from the use of the non-aqueous electrolyte solution of the present invention.

For an electrode group with the layer structure described above, a structure is favorably used in which the metal core elements of the individual electrode layers are bundled and welded to a terminal. Since, in those instances in which a single sheet has a large electrode area, a large internal resistance occurs, the resistance is preferably reduced by providing a plurality of terminals within an electrode. For an electrode group with the wound structure described above, the internal resistance can be lowered by providing a plurality of lead structures to the positive electrode and negative electrode, respectively, and collecting these at terminals.

(Protective Element)

Examples of the protective element include, for instance, a PTC (positive temperature coefficient) in which resistance increases upon abnormal heat generation or upon excessive current flow, a temperature fuse, a thermistor, or a valve (current shutoff valve) that shuts off current that flows in a circuit when the internal pressure and/or internal temperature in the battery rise suddenly upon abnormal heat generation. As the protective element there is preferably selected a protective element that is in an inoperative condition during ordinary use with high current. It is more preferred to employ a design which prevent abnormal heat generation or thermal runaway even in the absence of the protective element.

(Casing)

The nonaqueous electrolyte secondary battery of the present invention is ordinarily configured by housing the above-described nonaqueous electrolyte solution, negative electrode, positive electrode, separator and so forth inside a cating (case). The casing is not limited, and any known casing can be used, so long as the effect of the present invention is not significantly impaired thereby."

The material of the case is not particularly limited, so long as it is a substance that is stable in the nonaqueous electrolyte solution that is used. Specific examples of the material that can be used include, for instance, metals such as nickel-plated steel plate, stainless steel, aluminum or aluminum alloys, magnesium alloys, nickel, titanium or the like; or a multilayer film (laminate film) of resin and aluminum foil. A metal such as aluminum or aluminum alloy, or a laminate film, are appropriately used from the viewpoint of achieving lighter weights.

Examples of cases that utilize the abovementioned metals include, for instance, cases having an airtight sealed structure resulting from welding metals together by laser welding, resistance welding, ultrasonic welding or the like. In an alternative structure, the metals may be crimped to each other with a resin-made gasket interposed in between. Examples of an case that utilizes the abovementioned laminate film include, for instance, cases having an airtight sealed structure through thermal pressure-bonding of resin layers to each other. In order to enhance sealability, a resin that is different from that of the resins used in the laminate film may be interposed between the abovementioned resin layers. In the particular case of a sealed structure resulting from thermal pressure-bonding of resin layers with interposed collecting terminals, metal and resin are joined to each other, and hence a resin having polar groups or a resin that is modified through introduction of polar groups is appropriately used as the interposed resin.

The shape of the case may be any shape. For instance the case may be of cylindrical type, prismatic type, laminate type, coin type, large type and the like.

EXAMPLES

The present invention will be explained in more detail next based on examples and comparative examples. However, the present invention is not limited to these examples so long as it does not exceed the gist of the invention.

Examples 1-1 and 1-2, and Comparative Examples 1-1 to 1-4

Production of a Positive Electrode 72 mass parts of a spinel-structured lithium manganate ($Li_{1.1}Mn_{1.9}Al_{0.1}O_4$) as a first positive electrode active material, 18 mass parts of a lithium nickel manganese cobalt composite oxide ($Li_{1.15}Ni_{0.45}Mn_{0.45}Co_{0.10}O_2$) as a second positive electrode active material, 5 mass parts of a carbon black as an electroconductive agent, and 5 mass parts of a polyvinylidene fluoride (also referred to below as PVdF) as a binder were mixed and made into a slurry with the addition of N-methylpyrrolidone and this was evenly coated and dried on a 15 μm-thick aluminum current collector followed by roll pressing to provide a positive electrode.

<Production of a Negative Electrode>

93 mass parts of a graphite powder as the negative electrode active material, 1 mass part of a carbon black as an electroconductive agent, and 6 mass parts PVdF as a binder were mixed and made into a slurry with the addition of N-methylpyrrolidone and this was evenly coated and dried on a 12 μm-thick copper current collector followed by roll pressing to provide a negative electrode.

<Production of a Non-Aqueous Electrolyte Battery>

The above-described positive electrode, negative electrode, and a polyolefin separator were sequentially stacked, in the order of negative electrode, separator and positive electrode.

The thusly obtained battery element was packaged with an aluminum laminate film; an electrolyte solution as described below was introduced; and vacuum sealing was then performed to produce a sheet-form non-aqueous electrolyte secondary battery. In addition, in order to raise the intimacy of contact between the electrodes, the sheet-form battery was sandwiched by glass plates and pressure was applied.

<Evaluation of the Non-Aqueous Electrolyte Secondary Batteries>

<Evaluation Test for the Initial Capacity>

In a thermostat at 25° C., the sheet-form non-aqueous electrolyte secondary battery was subjected to constant current-constant voltage charging (referred to below as "CCCV charging" as appropriate) to 4.2 V at a current corresponding to 0.1 C and was subsequently discharged to 3.0 V at 0.1 C. It was then subjected to constant current-constant voltage charging to 4.2 V at 0.33 C and was subsequently discharged to 3.0 V at 0.33 C. The non-aqueous electrolyte secondary battery was stabilized by carrying out two cycles of this, for a total of 3 cycles. The discharge capacity at the end of this was taken to be the "initial capacity".

Here, 1 C represents the current value that discharges the reference capacity of the battery in 1 hour, and, for example, 0.2 C represents one-fifth of this current value.

<High-Temperature Cycle Testing>

Thirty cycles were carried out in a thermostat at 55° C. where 1 cycle was the process of CCCV charging to 4.2 V at 1 C followed by discharge to 2.7 V at a constant current of 1 C. The capacity at the 30th cycle was taken to be the "capacity after cycling".

Example 1-1

While operating under a dry argon atmosphere, a non-aqueous electrolyte solution was prepared by dissolving 1 mole/L (as the concentration in the non-aqueous electrolyte solution) of thoroughly dried $LiPF_6$ in a mixture of ethylene carbonate (also referred to below as EC) and diethyl carbonate (also referred to below as DEC) (3:7 volume ratio) and by additionally dissolving 0.5 mass % (as the concentration in the non-aqueous electrolyte solution) of thoroughly dried hexamethylene diisocyanate (also referred to below as HMI), 1 mass % (as the concentration in the non-aqueous electrolyte solution) of thoroughly dried fluoroethylene carbonate (also referred to below as FEC), and 0.5 mass % (as the concentration in the non-aqueous electrolyte solution) of thoroughly dried vinylene carbonate (VC). Using this non-aqueous electrolyte solution, batteries were fabricated by the method described above and the evaluations described above were performed.

Example 1-2

Batteries were fabricated operating as in Example 1-1, with the following exceptions: 0.2 mass % for the amount of HMI and 2 mass % (as the concentration in the non-aqueous electrolyte solution) for the amount of FEC were dissolved in the non-aqueous electrolyte solution and 0.2 mass % (as the concentration in the non-aqueous electrolyte solution) of succinic anhydride (also referred to below as SucA) was dissolved in place of the VC. The evaluations described above were performed.

Comparative Example 1-1

Batteries were fabricated operating as in Example 1-1, but without dissolving the HMI, FEC, and VC in the non-aqueous electrolyte solution, and the evaluations described above were performed.

Comparative Example 1-2

Batteries were fabricated operating as in Example 1-1, but without dissolving the FEC and VC in the non-aqueous electrolyte solution, and the evaluations described above were performed.

Comparative Example 1-3

Batteries were fabricated operating as in Example 1-1, but without dissolving the HMI and VC in the non-aqueous electrolyte solution, and the evaluations described above were performed.

Comparative Example 1-4

Batteries were fabricated operating as in Example 1-1, but without dissolving the FEC in the non-aqueous electrolyte solution and dissolving 1 mass % (as the concentration in the non-aqueous electrolyte solution) of the VC in the non-aqueous electrolyte solution, and the evaluations described above were performed.

The initial capacity and capacity after cycling, normalized with the value in Comparative Example 1-1, are given in the following Table 1A.

TABLE 1A

| | Content in the non-aqueous electrolyte solution (mass %) | | | | Initial capacity | Capacity after cycling |
|---|---|---|---|---|---|---|
| | HMI | FEC | VC | SucA | | |
| Example 1-1 | 0.5 | 1 | 0.5 | — | 0.99 | 1.02 |
| Example 1-2 | 0.2 | 2 | — | 0.2 | 0.99 | 1.02 |
| Comparative Example 1-1 | — | — | — | — | 1.00 | 1.00 |
| Comparative Example 1-2 | 0.5 | — | — | — | 0.92 | 1.01 |
| Comparative Example 1-3 | — | 1 | — | — | 1.00 | 1.00 |
| Comparative Example 1-4 | 0.5 | — | 1 | — | 0.91 | 1.01 |

According to Table 1A, with the non-aqueous electrolyte secondary batteries fabricated using the non-aqueous electrolyte solutions of Examples 1-1 and 1-2 according to the first present invention, the capacity after the high-temperature cycling test is increased in comparison to the case in which the group (A) compound, group (B) compound, and group (C) compound are not incorporated (Comparative Example 1-1) and in comparison to those cases in which only some of these compounds are incorporated (Comparative Examples 1-2 to 1-4).

On the other hand, for example, when the group (B) compound is used by itself (Comparative Example 1-3), it is found that there is no increase in the capacity after cycling, and the effect of for the first time obtaining an increase in the capacity after cycling through the use of the combination of compounds from group (A), group (B), and group (C) as prescribed by the present invention, is therefore not anticipated by this.

In addition, for example, it is shown that, when used by itself, the group (B) compound also does not contribute to an increase in the initial capacity, while, surprisingly, an effect is demonstrated in which a reduction in the initial capacity is inhibited by the simultaneous use in the present invention of the group (A) to group (C) compounds.

Examples 1'-1 and 1'-2, Reference Example 1'-1, and Comparative Examples 1'-1 to 1'-3

Production of a Positive Electrode 72 mass parts of a spinel-structured lithium manganate ($Li_{1.1}Mn_{1.9}Al_{0.1}O_4$) as a first positive electrode active material, 18 mass parts of a lithium nickel manganese cobalt composite oxide ($Li_{1.15}Ni_{0.45}Mn_{0.45}Co_{0.10}O_2$) as a second positive electrode active material, 5 mass parts of a carbon black as an electroconductive agent, and 5 mass parts of a PVdF as a binder were mixed and made into a slurry with the addition of N-methylpyrrolidone and this was evenly coated and dried on a 15 μm-thick aluminum current collector followed by roll pressing to provide a positive electrode.

<Production of a Negative Electrode>

93 mass parts of a graphite powder as the negative electrode active material, 1 mass part of a carbon black as an electroconductive agent, and 6 mass parts PVdF as a binder were mixed and made into a slurry with the addition of N-methylpyrrolidone and this was evenly coated and dried on a 12 μm-thick copper current collector followed by roll pressing to provide a negative electrode.

<Production of a Non-Aqueous Electrolyte Battery>

The above-described positive electrode, negative electrode, and a polyolefin separator were sequentially stacked, in the order of negative electrode, separator and positive electrode.

The thusly obtained battery element was packaged with an aluminum laminate film; an electrolyte solution as described below was introduced; and vacuum sealing was then performed to produce a sheet-form non-aqueous electrolyte secondary battery. In addition, in order to raise the intimacy of contact between the electrodes, the sheet-form battery was sandwiched by glass plates and pressure was applied.

<Evaluation of the Non-Aqueous Electrolyte Secondary Batteries>

<Evaluation Test for the Initial Capacity>

In a thermostat at 25° C., the sheet-form non-aqueous electrolyte secondary battery was subjected to constant current-constant voltage charging (referred to below as "CCCV charging" as appropriate) to 4.2 V at a current corresponding to 0.1 C and was subsequently discharged to 3.0 V at 0.1 C. It was then subjected to CCCV charging to 4.2 V at 0.33 C and was subsequently discharged to 3.0 V at 0.33 C. The non-aqueous electrolyte secondary battery was stabilized by carrying out two cycles of this, for a total of 3 cycles. The discharge capacity at the end of this was taken to be the "initial capacity". Normalization was performed by dividing by the discharge capacity in Comparative Example 1'-1.

Here, 1 C represents the current value that discharges the reference capacity of the battery in 1 hour, and, for example, 0.2 C represents one-fifth of this current value.

<High-Rate Discharge Testing>

The battery, CCCV charged to 4.2 V at 0.33 C, was discharged at a constant current value corresponding to 2 C, and this capacity was taken to be the "2 C capacity". Normalization was carried out by dividing by the discharge capacity in Comparative Example 1'-1.

<High-Temperature Cycle Testing>

Two hundred cycles were carried out in a thermostat at 55° C. where 1 cycle was the process of CCCV charging to 4.2 V at 1 C followed by discharge to 2.7 V at a constant current of 1 C. This was followed by CCCV charging to 4.2 V at 0.33 C and then discharging to 2.7 V at 0.33 C. This capacity was taken to be the "capacity after 200 cycles".

Example 1'-1

While operating under a dry argon atmosphere, a non-aqueous electrolyte solution was prepared by dissolving 1 mole/L (as the concentration in the non-aqueous electrolyte solution) of thoroughly dried $LiPF_6$ in a mixture of EC and DEC (3:7 volume ratio) and by additionally dissolving 0.5 mass % (as the concentration in the non-aqueous electrolyte solution) of thoroughly dried HMI, 1 mass % (as the concentration in the non-aqueous electrolyte solution) of thoroughly dried FEC, and 0.5 mass % (as the concentration in the non-aqueous electrolyte solution) of thoroughly dried VC. Using this non-aqueous electrolyte solution, batteries were fabricated by the method described above and the evaluations described above were performed.

Example 1'-2

Batteries were fabricated operating as in Example 1'-1, but dissolving 0.2 mass % (as the concentration in the non-aqueous electrolyte solution) of SucA in the non-aqueous electrolyte solution in place of the VC, and the evaluations described above were performed.

Reference Example 1'-1

Batteries were fabricated operating as in Example 1'-1, but without dissolving the VC in the non-aqueous electrolyte solution, and the evaluations described above were performed.

Comparative Example 1'-1

Batteries were fabricated operating as in Example 1'-1, but without dissolving the HMI, FEC, and VC in the non-aqueous electrolyte solution, and the evaluations described above were performed.

Comparative Example 1'-2

Batteries were fabricated operating as in Example 1'-1, but without dissolving the FEC in the non-aqueous electrolyte solution, and the evaluations described above were performed.

Comparative Example 1'-3

Batteries were fabricated operating as in Example 1'-1, but without dissolving the FEC and VC in the non-aqueous electrolyte solution and dissolving 0.2 mass % (as the concentration in the non-aqueous electrolyte solution) of SucA instead in the non-aqueous electrolyte solution, and the evaluations described above were performed.

The initial capacity, the 2 C capacity, and the capacity after 200 cycles, normalized using the values in Comparative Example 1'-1, are given in the following Table 1B.

TABLE 1B

| | Content in the non-aqueous electrolyte solution (mass %) | | | | initial capacity | 2 C capacity | capacity after 200 cycling |
|---|---|---|---|---|---|---|---|
| | HMI | FEC | VC | SucA | | | |
| Example 1'-1 | 0.5 | 1 | 0.5 | — | 1.00 | 0.93 | 1.71 |
| Example 17-2 | 0.5 | 1 | — | 0.2 | 0.97 | 0.96 | 1.68 |
| Reference Example 1'-1 | 0.5 | 1 | — | — | 0.98 | 0.92 | 1.68 |
| Comparative Example 1'-1 | — | — | — | — | 1.00 | 1.00 | 1.00 |
| Comparative Example 1'-2 | 0.5 | — | 0.5 | — | 0.95 | 0.91 | 1.70 |
| Comparative Example 1'-3 | 0.5 | — | — | 0.2 | 0.88 | 0.87 | 1.64 |

According to Table 1B, with the non-aqueous electrolyte secondary batteries fabricated using the non-aqueous electrolyte solutions of Examples 1'-1 and 1'-2 according to the first present invention, the capacity after the high-temperature cycling test is increased—without causing a significant reduction in the initial capacity and the high-rate discharge capacity—in comparison to the case in which the group (A)

compound, group (B) compound, and group (C) compound are not incorporated (Comparative Example 1'-1) and in comparison to those cases in which only some of these compounds are incorporated (Comparative Examples 1'-2 and 1'-3).

On the other hand, for example, when only the group (A) compound and group (C) compound are used (Comparative Examples 1'-2 and 1'-3), an improvement in the capacity after cycling is seen, but the initial capacity and the high-rate discharge capacity end up being impaired. As shown in Comparative Example 1-3 above, the group (B) compound, when used by itself, also does not contribute to an increase in the initial capacity, while, surprisingly, an effect is demonstrated in which a reduction in the initial capacity is inhibited through the simultaneous use in the present invention of the group (A) to group (C) compounds.

Examples 2-1 to 2-3 and Comparative Examples 2-1 to 2-5

Fabrication of Non-Aqueous Electrolyte Secondary Batteries

<Production of a Negative Electrode>

93 mass parts of a graphite powder, 1 mass part of a carbon black as an electroconductive agent, and 6 mass parts of polyvinylidene fluoride (PVdF) as a binder were mixed•slurried in N-methyl-2-pyrrolidone and this was evenly coated and dried on a 12 μm-thick copper foil and roll pressed to provide a negative electrode.

<Production of the Non-Aqueous Electrolyte Secondary Battery>

The positive electrode described below, the negative electrode, and a polyolefin separator were stacked in the sequence negative electrode, separator, positive electrode. The thusly obtained battery element was packaged with an aluminum laminate film; an electrolyte solution as described below was introduced; and vacuum sealing was then performed to produce a sheet-form non-aqueous electrolyte secondary battery.

<Evaluation of the Non-Aqueous Electrolyte Secondary Batteries>

<Initial Charge/Discharge>

In a thermostat at 25° C., the sheet-form non-aqueous electrolyte secondary battery was subjected to constant current-constant voltage charging to 4.2 V at 0.1 C (here and below, 1 C is the current value that discharges, in 1 hour, the rated capacity according to the discharge capacity at a 1 hour rate) and was subsequently discharged to 3.0 V at 0.1 C. It was then subjected to constant current-constant voltage charging to 4.2 V at 0.33 C and was subsequently discharged to 3.0 V at 0.33 C. The non-aqueous electrolyte secondary battery was stabilized by carrying out two cycles of this, for a total of 3 cycles. The discharge capacity at the end of this was taken to be the "initial capacity".

<High-Temperature Cycle Test>

Thirty cycles were carried out in a thermostat at 55° C. where 1 cycle was the process of constant current-constant voltage charging to 4.2 V at 1 C followed by discharge to 2.7 V at a constant current of 1 C. The capacity at the 30th cycle was taken to be the "capacity after cycling".

Example 2-1

Production of a Positive Electrode 72 mass parts of a spinel-structured lithium manganate ($Li_{1.1}Mn_{1.9}Al_{0.1}O_4$) as a first positive electrode active material, 18 mass parts of a lithium nickel manganese cobalt composite oxide ($Li_{1.15}Ni_{0.45}Mn_{0.45}Co_{0.10}O_2$) as a second positive electrode active material, 5 mass parts of a carbon black as an electroconductive agent, and 5 mass parts of a polyvinylidene fluoride (PVdF) as a binder were mixed•slurried in N-methyl-2-pyrrolidone and this was evenly coated and dried on a 15 μm-thick aluminum foil followed by roll pressing to provide a positive electrode (abbreviated below as LMO+NMC).

<Preparation of the Electrolyte Solution>

While operating under a dry argon atmosphere, a non-aqueous electrolyte solution was prepared by dissolving 1 mole/L (as the concentration in the non-aqueous electrolyte solution) of thoroughly dried $LiPF_6$ in a mixture of EC and DEC (3:7 volume ratio) and by additionally dissolving 0.5 mass % (as the concentration in the non-aqueous electrolyte solution) of thoroughly dried HMI and 1.5 mass % (as the concentration in the non-aqueous electrolyte solution) of thoroughly dried FEC. Using this non-aqueous electrolyte solution, batteries were fabricated by the method described above and the evaluations described above were performed.

Example 2-2

Batteries were fabricated operating as in Example 2-1, with the exception that 2 mass % FEC was dissolved in the non-aqueous electrolyte solution, and the evaluations described above were performed.

Example 2-3

Batteries were fabricated operating as in Example 2-1, with the exception that 0.2 mass % HMI and 2 mass % FEC were dissolved in the non-aqueous electrolyte solution, and the evaluations described above were performed.

Comparative Example 2-1

Batteries were fabricated operating as in Example 2-1, with the exception that the HMI and FEC were not dissolved in the non-aqueous electrolyte solution, and the evaluations described above were performed.

Comparative Example 2-2

Batteries were fabricated operating as in Example 2-1, with the exception that the FEC was not dissolved in the non-aqueous electrolyte solution, and the evaluations described above were performed.

Comparative Example 2-3

Batteries were fabricated operating as in Example 2-1, with the exception that the HMI was not dissolved in the non-aqueous electrolyte solution and the FEC was dissolved at 1 mass %, and the evaluations described above were performed.

Comparative Example 2-4

Batteries were fabricated operating as in Example 2-1, with the exception that 1 mass % VC was dissolved in the non-aqueous electrolyte solution in place of the FEC, and the evaluations described above were performed.

The initial capacity and capacity after cycling, normalized by dividing by the capacity in Comparative Example 2-1, are given in the following Table 2A.

TABLE 2A

| | content in the non-aqueous electrolyte solution (mass %) | | | Positive electrode active material | initial capacity | capacity after cycling |
|---|---|---|---|---|---|---|
| | HMI | FEC | VC | | | |
| Example 2-1 | 0.5 | 1.5 | — | LMO + NMC | 0.99 | 1.01 |
| Example 2-2 | 0.5 | 2 | — | LMO + NMC | 0.99 | 1.02 |
| Example 2-3 | 0.2 | 2 | — | LMO + NMC | 1.00 | 1.01 |
| Comparative Example 2-1 | — | — | — | LMO + NMC | 1.00 | 1.00 |
| Comparative Example 2-2 | 0.5 | — | — | LMO + NMC | 0.92 | 1.01 |
| Comparative Example 2-3 | — | 1 | — | LMO + NMC | 1.00 | 1.00 |
| Comparative Example 2-4 | 0.5 | — | 1 | LMO + NMC | 0.91 | 1.01 |

According to Table 2A, with the non-aqueous electrolyte secondary batteries fabricated using the non-aqueous electrolyte solutions of Examples 2-1 to 2-3 according to the second present invention, an increase in the capacity after cycling can be observed—notwithstanding the almost complete absence of a decline in the initial capacity—in comparison to the case in which the group (B) compound and group (C) compound are not incorporated (Comparative Example 2-1) and in comparison to those cases in which only some of these compounds are incorporated (Comparative Examples 2-2 to 2-4).

In addition, for example, when the group (B) compound is used by itself (Comparative Example 2-3), it is found that there is no increase in the capacity after cycling while, surprisingly, an effect is demonstrated in which an increase in the capacity after cycling is obtained through the use of the combination of the prescribed positive electrode with the group (B) compound and group (C) compound.

Example 2'-1 and Comparative Examples 2'-1 to 2'-7

Production of an LMO+NMC Positive Electrode 72 mass parts of a spinel-structured lithium manganate ($Li_{1.1}Mn_{1.9}Al_{0.1}O_4$) as a first positive electrode active material, 18 mass parts of a lithium nickel manganese cobalt composite oxide ($Li_{1.15}Ni_{0.45}Mn_{0.45}Co_{0.10}O_2$) as a second positive electrode active material, 5 mass parts of a carbon black as an electroconductive agent, and 5 mass parts of a PVdF as a binder were mixed and made into a slurry with the addition of N-methylpyrrolidone and this was evenly coated and dried on a 15 μm-thick aluminum current collector followed by roll pressing to provide an LMO+NMC positive electrode.

<Production of an LCO Positive Electrode>

90 mass parts of lithium cobaltate ($LiCoO_2$) as the positive electrode active material, 5 mass parts of a carbon black as an electroconductive agent, and 5 mass parts of a PVdF as a binder were mixed and made into a slurry with the addition of N-methylpyrrolidone and this was evenly coated and dried on a 15 μm-thick aluminum current collector followed by roll pressing to provide an LCO positive electrode.

<Production of the Negative Electrode>

93 mass parts of a graphite powder as the negative electrode active material, 1 mass part of a carbon black as an electroconductive agent, and 6 mass parts PVdF as a binder were mixed and made into a slurry with the addition of N-methylpyrrolidone and this was evenly coated and dried on a 12 μm-thick copper current collector followed by roll pressing to provide a negative electrode.

<Production of the Non-Aqueous Electrolyte Battery>

Of the positive electrodes fabricated as described above, the positive electrode indicated below, the negative electrode, and a polyolefin separator were stacked in the sequence negative electrode, separator, positive electrode. The thusly obtained battery element was packaged with an aluminum laminate film; an electrolyte solution as described below was introduced; and vacuum sealing was then performed to produce a sheet-form non-aqueous electrolyte secondary battery. In addition, in order to raise the intimacy of contact between the electrodes, the sheet-form battery was sandwiched by glass plates and pressure was applied.

<Evaluation of the Non-Aqueous Electrolyte Secondary Batteries>

<Evaluation Test for the Initial Capacity>

In a thermostat at 25° C., the sheet-form non-aqueous electrolyte secondary battery was subjected to constant current-constant voltage charging (referred to below as "CCCV charging" as appropriate) to 4.2 V at a current corresponding to 0.1 C and was subsequently discharged to 3.0 V at 0.1 C. It was then subjected to CCCV charging to 4.2 V at 0.33 C and was subsequently discharged to 3.0 V at 0.33 C. The non-aqueous electrolyte secondary battery was stabilized by carrying out two cycles of this, for a total of 3 cycles. The discharge capacity at the end of this was taken to be the "initial capacity". Normalization was carried out by dividing by the discharge capacity in Comparative Example 2'-1.

Here, 1 C represents the current value that discharges the reference capacity of the battery in 1 hour, and, for example, 0.2 C represents one-fifth of this current value.

<High-Temperature Cycle Testing>

Two hundred cycles were carried out in a thermostat at 55° C. where 1 cycle was the process of CCCV charging to 4.2 V at 1 C followed by discharge to 2.7 V at a constant current of 1 C. This was followed by CCCV charging to 4.2 V at 0.33 C and then discharging to 2.7 V at 0.33 C. This capacity was divided by the capacity in the first cycle of the high-temperature cycling to give the "capacity retention rate after 200 cycles".

Example 2'-1

While operating under a dry argon atmosphere, a non-aqueous electrolyte solution was prepared by dissolving 1 mole/L (as the concentration in the non-aqueous electrolyte solution) of thoroughly dried $LiPF_6$ in a mixture of EC and DEC (3:7 volume ratio) and by additionally dissolving 0.5 mass % (as the concentration in the non-aqueous electrolyte solution) of thoroughly dried HMI and 2 mass % (as the concentration in the non-aqueous electrolyte solution) of thoroughly dried FEC. Using this non-aqueous electrolyte solution and the LMO+NMC positive electrode, batteries were fabricated by the method described above and the evaluations described above were performed.

Comparative Example 2'-1

Batteries were fabricated operating as in Example 2'-1, with the exception that the HMI and FEC were not dissolved in the non-aqueous electrolyte solution, and the evaluations described above were performed.

Comparative Example 2'-2

Batteries were fabricated operating as in Example 2'-1, with the exception that the HMI was not dissolved in the non-aqueous electrolyte solution, and the evaluations described above were performed.

Comparative Example 2'-3

Batteries were fabricated operating as in Example 2'-1, with the exception that the FEC was not dissolved in the non-aqueous electrolyte solution, and the evaluations described above were performed.

Comparative Example 2'-4

Batteries were fabricated operating as in Example 2'-1, but using the LCO positive electrode as the positive electrode in place of the LMO+NMC positive electrode, and the evaluations described above were performed.

Comparative Example 2'-5

Batteries were fabricated operating as in Example 2'-1, with the exception that the LCO positive electrode was used as the positive electrode in place of the LMO+NMC positive electrode and the HMI and FEC were not dissolved in the non-aqueous electrolyte solution. The evaluations described above were performed.

Comparative Example 2'-6

Batteries were fabricated operating as in Example 2'-1, with the exception that the LCO positive electrode was used as the positive electrode in place of the LMO+NMC positive electrode and the HMI was not dissolved in the non-aqueous electrolyte solution. The evaluations described above were performed.

Comparative Example 2'-7

Batteries were fabricated operating as in Example 2'-1, with the exception that the LCO positive electrode was used as the positive electrode in place of the LMO+NMC positive electrode and the FEC was not dissolved in the non-aqueous electrolyte solution. The evaluations described above were performed.

The initial capacity and the capacity retention rate after 200 cycles are given in Table 2B, with Example 2'-1 and Comparative Examples 2'-1 to 2'-3 being normalized by dividing by the values for Comparative Example 2'-1 and Comparative Examples 2'-4 to 2'-7 being normalized by dividing by the values for Comparative Example 2'-5.

TABLE 2B

| | content in the non-aqueous electrolyte solution (mass %) | | Positive electrode active material | initial capacity | capacity retention rate after 200 cycles |
|---|---|---|---|---|---|
| | HMI | FEC | | | |
| Example 2'-1 | 0.5 | 2 | LMO + NMC | 0.99 | 2.68 |
| Comparative Example 2'-1 | — | — | LMO + NMC | 1.00 | 1.00 |
| Comparative Example 2'-2 | — | 2 | LMO + NMC | 0.99 | 2.49 |

TABLE 2B-continued

| | content in the non-aqueous electrolyte solution (mass %) | | Positive electrode active material | initial capacity | capacity retention rate after 200 cycles |
|---|---|---|---|---|---|
| | HMI | FEC | | | |
| Comparative Example 2'-3 | 0.5 | — | LMO + NMC | 0.97 | 2.58 |
| Comparative Example 2'-4 | 0.5 | 2 | LCO | 1.02 | 1.36 |
| Comparative Example 2'-5 | — | — | LCO | 1.00 | 1.00 |
| Comparative Example 2'-6 | — | 2 | LCO | 1.00 | 1.45 |
| Comparative Example 2'-7 | 0.5 | — | LCO | 0.94 | 1.74 |

According to Table 2B, with the non-aqueous electrolyte secondary batteries fabricated according to the second present invention using the non-aqueous electrolyte solution of Example 2'-1 and a positive electrode in which the main component of the active material is a spinel-structured lithium manganese composite oxide, the capacity retention rate after the high-temperature cycling test is increased—without causing a significant reduction in the initial capacity—in comparison to the case in which the group (B) compound and group (C) compound are not incorporated (Comparative Example 2'-1) and in comparison to those cases in which only some of these compounds are incorporated (Comparative Examples 2'-2 and 2-3).

These effects are also characteristic to the non-aqueous electrolyte secondary battery of the present invention that uses a positive electrode in which the main component of the active material is a lithium manganese composite oxide having a spinel structure. For example, with the non-aqueous electrolyte secondary batteries in which a spinel-structured lithium manganese composite oxide is not the main component of the active material, even when a non-aqueous electrolyte solution is used that incorporates both a group (B) compound and a group (C) compound at the same time, as shown in Comparative Examples 2'-4 to 2'-7 the capacity retention rate after the high-temperature cycle test is reduced even in comparison to the electrolyte solutions that use each of these individually. That is, it is shown that the effects are manifested for the first time through the simultaneous use of the prescribed positive electrode of the present invention and the prescribed non-aqueous electrolyte solution of the present invention.

Examples 3-1 to 3-14 and Comparative Examples 3-1 to 3-3

Fabrication of the Positive Electrode 94 mass parts of a lithium nickel cobalt manganese composite oxide ($LiNi_{1/3}Co_{1/3}Mn_{1/3}O_2$) as the positive electrode active material, 3 mass parts of a PVdF, and 3 mass parts of an acetylene black were mixed and made into a slurry with the addition of N-methylpyrrolidone and this was evenly coated•dried on both sides of an aluminum current collector followed by roll pressing to obtain a positive electrode.

<Fabrication of the Negative Electrode>

94 mass parts of a graphite powder as the negative electrode active material and 6 mass parts of a PVdF were mixed and made into a slurry with the addition of N-methylpyrrolidone and this was evenly coated•dried on one side of a copper current collector followed by roll pressing to obtain a negative electrode.

<Production of the Non-Aqueous Electrolyte Secondary Batteries>

The above-described positive electrode, negative electrode, and a polyethylene separator were sequentially stacked, in the order of negative electrode, separator, positive electrode, separator and negative electrode. The thusly obtained battery element was packaged with an aluminum laminate film; an electrolyte solution as described below was introduced; and vacuum sealing was then performed to produce a sheet-form non-aqueous electrolyte secondary battery. In addition, in order to raise the intimacy of contact between the electrodes, the sheet-form battery was sandwiched by glass plates and pressure was applied.

<Evaluation of the Non-Aqueous Electrolyte Secondary Batteries>

[Evaluation Test for the Initial Capacity]

In a thermostat at 25° C., CCCV charging was carried out to 4.1 V at a current corresponding to 0.2 C followed by discharge to 3 V at 0.2 C. This was repeated three times to carry out the initial formation. CCCV charging was then carried out to 4.4 V at 0.2 C followed by discharging again to 3 V at 0.2 C to determine the initial capacity. The cut-off current during charging was 0.05 C.

Here, 1 C represents the current value that discharges the reference capacity of the battery in 1 hour, and, for example, 0.2 C represents one-fifth of this current value.

[Evaluation Test for the Storage Characteristics]

After the capacity evaluation had been completed on a battery, it was charged in a 25° C. thermostat to 4.4 V at 0.2 C and was then held for 3 days in a high-temperature chamber at 85° C. The amount of gas generated was subsequently determined by cooling the battery to 25° C. and immediately immersing it in an ethanol bath and measuring the buoyancy (Archimedes principle).

[Evaluation Test for the Cycle Characteristics]

After the capacity evaluation had been completed on a battery, it was introduced into a 45° C. thermostat and a charge/discharge cycle of CCCV charging to 4.4 V at 0.5 C and constant-current discharge to 3 V at 0.5 C was repeated 100 times. The discharge capacity retention rate was determined at the 100th cycle using the following formula.

capacity recovery rate (%) at the 100th cycle=[100th discharge capacity (mAh/g)/first discharge capacity (mAh/g)]×100

Example 3-1

A non-aqueous electrolyte solution was prepared by mixing $LiPF_6$, FEC, EC, dimethyl carbonate (also referred to below as DMC), ethyl methyl carbonate (also referred to below as EMC), 1,3-bis(isocyanatomethyl)cyclohexane, and 1,3-propane sultone (also referred to below as PS) at 16.5/20/10/44/7/0.5/2 as the mass ratio. Using the obtained non-aqueous electrolyte solution, lithium secondary batteries were fabricated according to the method given above and the evaluation test for the initial capacity and the evaluation test for the storage characteristics were performed.

Example 3-2

A non-aqueous electrolyte solution was prepared by mixing $LiPF_6$, FEC, EC, DMC, EMC, 1,3-bis(isocyanatomethyl)cyclohexane, and PS at 16.5/20/10/44/7/1.5/1 as the mass ratio. Using the obtained non-aqueous electrolyte solution, secondary batteries were fabricated and evaluation tests were run as in Example 3-1. The results are given in Table 3.

Example 3-3

Secondary batteries were fabricated and evaluated as in Example 3-1, but using tetramethylene diisocyanate in place of the 1,3-bis(isocyanatomethyl)cyclohexane. The results are given in Table 3.

Example 3-4

Secondary batteries were fabricated and evaluated as in Example 3-1, but using hexamethylene diisocyanate in place of the 1,3-bis(isocyanatomethyl)cyclohexane. The results are given in Table 3.

Example 3-5

Secondary batteries were fabricated and evaluated as in Example 3-1, but using octamethylene diisocyanate in place of the 1,3-bis(isocyanatomethyl)cyclohexane. The results are given in Table 3.

Example 3-6

Secondary batteries were fabricated and evaluated as in Example 3-1, but using dicyclohexylmethane-4,4'-diisocyanate in place of the 1,3-bis(isocyanatomethyl)cyclohexane. The results are given in Table 3.

Example 3-7

A non-aqueous electrolyte solution was prepared by mixing $LiPF_6$, FEC, EC, DMC, EMC, 1,3-bis(isocyanatomethyl)cyclohexane, and PS at 16.5/10/19/45/7/0.5/2 as the mass ratio. Using the obtained non-aqueous electrolyte solution, secondary batteries were fabricated and evaluation tests were run as in Example 3-1. The results are given in Table 3.

Example 3-8

A non-aqueous electrolyte solution was prepared by mixing $LiPF_6$, FEC, EC, DMC, EMC, 1,3-bis(isocyanatomethyl)cyclohexane, and PS at 16.5/30/5/40/6/0.5/2 as the mass ratio. Using the obtained non-aqueous electrolyte solution, secondary batteries were fabricated and evaluation tests were run as in Example 3-1. The results are given in Table 3.

Example 3-9

Secondary batteries were fabricated and evaluated as in Example 3-1, but using ethylene sulfite (also referred to below as ES) in place of the PS. The results are given in Table 3.

Example 3-10

Secondary batteries were fabricated and evaluated as in Example 3-1, but using 1,3-propene sultone (also referred to below as PRS) in place of the PS. The results are given in Table 3.

Example 3-11

A non-aqueous electrolyte solution was prepared by mixing $LiPF_6$, FEC, EC, methyl propionate (also referred to below as MP), 1,3-bis(isocyanatomethyl)cyclohexane, and PS at 17.5/22/10/48/0.5/2 as the mass ratio. Using the obtained non-aqueous electrolyte solution, secondary batteries were fabricated and evaluation tests were run as in Example 3. The results are given in Table 3.

Example 3-12

A non-aqueous electrolyte solution was prepared by mixing $LiPF_6$, FEC, EC, DMC, MP, 1,3-bis(isocyanatomethyl)cyclohexane, and PS at 17.5/22/10/8/40/0.5/2 as the mass ratio. Using the obtained non-aqueous electrolyte solution, secondary batteries were fabricated and evaluation tests were run as in Example 3-1. The results are given in Table 3.

Example 3-13

Secondary batteries were fabricated and evaluated as in Example 3-1, but using 4,5-difluoro-1,3-dioxolan-2-one (also referred to below as DFEC) in place of the FEC. The results are given in Table 3.

Example 3-14

A non-aqueous electrolyte solution was prepared by mixing $LiPF_6$, FEC, EC, DMC, EMC, hexamethylene diisocyanate, and 1,3-propane sultone at 16.5/3/27/44/7/0.5/2 as the mass ratio. Using the obtained non-aqueous electrolyte solution, secondary batteries were fabricated and evaluation tests were run as in Example 3-1. The results are given in Table 3.

Comparative Example 3-1

A non-aqueous electrolyte solution was prepared by mixing $LiPF_6$, FEC, EC, DMC, EMC, and PS at 16.5/20/10/44.5/7/2 as the mass ratio and without using 1,3-bis(isocyanatomethyl)cyclohexane. Using the obtained non-aqueous electrolyte solution, secondary batteries were fabricated and evaluation tests were run as in Example 3-1. The results are given in Table 3.

Comparative Example 3-2

A non-aqueous electrolyte solution was prepared by mixing $LiPF_6$, FEC, EC, DMC, EMC, and hexamethylene diisocyanate at 16.5/20/10/46/7/0.5 as the mass ratio and without using PS. Using the obtained non-aqueous electrolyte solution, secondary batteries were fabricated and evaluation tests were run as in Example 3-1. The results are given in Table 3.

Comparative Example 3-3

A non-aqueous electrolyte solution was prepared by mixing $LiPF_6$, FEC, EC, DMC, EMC, hexamethylene diisocyanate, and sulfobenzoic anhydride at 16.5/3/27/44/7/0.5/2 as the mass ratio. Using the obtained non-aqueous electrolyte solution, secondary batteries were fabricated and evaluation tests were run as in Example 3-1. The results are given in Table 3.

TABLE 3

| | diisocyanate (mass %) | sulfur compound (mass %) | fluorine-substituted cyclic carbonate (mass %) | other constituent components (mass %) | amount of gas generation after storage test (mL) | capacity retention rate after 100 cycles (%) |
|---|---|---|---|---|---|---|
| Example 3-1 | 1,3-bis (isocyanato-methyl) cyclohexane (0.5) | PS (2) | FEC (20) | LiPF6/EC/DMC/EMC 16.5/10/44/7) | 0.10 | 88.3 |
| Example 3-2 | 1,3-bis (isocyanato-methyl) cyclohexane (1.5) | PS (1) | FEC (20) | LiPF6/EC/DMC/EMC (16.5/10/44/7) | 0.08 | 85.2 |
| Example 3-3 | tetramethylene diisocyanate (0.5) | PS (2) | FEC (20) | LiPF6/EC/DMC/EMC (16.5/10/44/7) | 0.11 | 87.9 |
| Example 3-4 | hexamethylene diisocyanate (0.5) | PS (2) | FEC (20) | LiPF6/EC/DMC/EMC (16.5/10/44/7) | 0.07 | 89.8 |
| Example 3-5 | octamethylene diisocyanate (0.5) | PS (2) | FEC (20) | LiPF6/EC/DMC/EMC (16.5/10/44/7) | 0.08 | 88.9 |
| Example 3-6 | dicyclohexylmethane-4,4'-diisocyanate (0.5) | PS (2) | FEC (20) | LiPF6/EC/DMC/EMC (16.5/10/44/7) | 0.12 | 86.8 |

TABLE 3-continued

| | diisocyanate (mass %) | sulfur compound (mass %) | fluorine-substituted cyclic carbonate (mass %) | other constituent components (mass %) | amount of gas generation after storage test (mL) | capacity retention rate after 100 cycles (%) |
|---|---|---|---|---|---|---|
| Example 3-7 | 1,3-bis (isocyanatomethyl) cyclohexane (0.5) | PS (2) | FEC (10) | LiPF6/EC/DMC/EMC (16.5/19/45/7) | 0.08 | 84.6 |
| Example 3-8 | 1,3-bis (isocyanatomethyl) cyclohexane (0.5) | PS (2) | FEC (30) | LiPF6/EC/DMC/EMC (16.5/5/40/6) | 0.15 | 87.4 |
| Example 3-9 | 1,3-bis (isocyanatomethyl) cyclohexane (0.5) | ES (2) | FEC (20) | LiPF6/EC/DMC/EMC (16.5/10/44/7) | 0.14 | 86.7 |
| Example 3-10 | 1,3-bis (isocyanatomethyl) cyclohexane (0.5) | PS (2) | FEC (20) | LiPF6/EC/DMC/EMC (16.5/10/44/7) | 0.09 | 86.2 |
| Example 3-11 | 1,3-bis (isocyanatomethyl) cyclohexane (0.5) | PRS (2) | FEC (22) | LiPF6/EC/MP (17.5/10/48) | 0.12 | 91.3 |
| Example 3-12 | 1,3-bis (isocyanatomethyl) cyclohexane (0.5) | PS (2) | FEC (22) | LiPF6/EC/DMC/EP (17.5/10/8/40) | 0.12 | 90.8 |
| Example 3-13 | 1,3-bis (isocyanatomethyl) cyclohexane (0.5) | PS (2) | DFEC (20) | LiPF6/EC/DMC/EMC (16.5/10/44/7) | 0.16 | 85.2 |
| Example 3-14 | hexamethylene diisocyanate (0.5) | PS (2) | FEC (3) | LiPF6/EC/DMC/EMC (16.5/27/44/7) | 0.05 | 87.1 |
| Comparative Example 13-1 | none | PS (2) | FEC (20) | LiPF6/EC/DMC/EMC (16.5/10/44.5/7) | 0.23 | 68.4 |
| Comparative Example 13-2 | hexamethylene diisocyanate (0.5) | none | FEC (20) | LiPF6/EC/DMC/EMC (16.5/10/46/7) | 0.26 | 74.7 |
| Comparative Example 13-3 | hexamethylene diisocyanate (0.5) | sulfobenzoicanhydride (2) | FEC (3) | LiPF6/EC/DMC/EMC (16.5/27/44/7) | 0.11 | 63.2 |

Table 3 shows that, when the non-aqueous electrolyte solutions in Example 3-1 to 3-14 according to the first present invention are used, gas generation after the storage test is substantially inhibited and the capacity retention rate pre-versus-post-cycle testing is improved, as compared to the absence of the compound having at least two isocyanate groups in the molecule (Comparative Example 3-1) and as compared to the absence of the sulfur compound according to the present invention (Comparative Example 3-2). In addition, a better coexistence between the inhibition of gas generation after the storage test and the improvement in the cycle capacity retention rate is achieved than for the addition of a sulfur compound other than a sulfur compound according to the present invention (Comparative Example 3-3).

INDUSTRIAL APPLICABILITY

The non-aqueous electrolyte solution according to the present invention makes possible the production of high-capacity non-aqueous electrolyte secondary batteries even in the case of a high current output and can therefore be favorably used in any field where a non-aqueous electrolyte secondary battery is used, for example, electronic devices and instruments.

The nonaqueous electrolyte solution of the present invention, and the application of the nonaqueous electrolyte battery, are not limited and can be used in various known applications.

The following are specific Example of these applications: laptop computers, electronic book players, cell phones, portable fax machines, portable copiers, portable printers, portable audio players, compact video cameras, liquid-crystal televisions, mini/compact vacuum cleaners, transceivers, electronic organizers, calculators, memory cards, portable tape recorders, radios, backup power sources, automobiles, motorcycles, scooters and motorized bicycles, bicycles, illuminating and lighting devices, toys, gaming equipment, clocks, power tools, photoflash units, and cameras.

The invention has been described in detail and with reference to specific embodiments thereof, it will be apparent to one skilled in the art that various changes and modifications can be made therein without departing from the spirit and scope thereof.

The invention claimed is:

1. A non-aqueous electrolyte solution suitable for a non-aqueous electrolyte secondary battery having a positive electrode and a negative electrode that are capable of absorbing and releasing a metal ion, wherein
the non-aqueous electrolyte solution comprises, in addition to an electrolyte and a non-aqueous solvent,
(A) at least one compound selected from the group consisting of carbonates having a carbon-carbon unsaturated bond, compounds represented by the following formula (1), sulfoxides, sulfites, sulfones, sulfonates, sultones, and sulfates;
(B) a fluorine atom-containing cyclic carbonate; and
(C) 0.001 mass % to 10 mass % of a compound that has at least two isocyanate groups in the molecule:

wherein
M is —O— or —NR²—,
R² is hydrogen or a optionally branched hydrocarbon group having 10 or less carbons, and
R¹ is an optionally substituent-bearing and optionally branched hydrocarbon group having 10 or less carbons.

2. The non-aqueous electrolyte solution according to claim 1, wherein the fluorine atom-containing cyclic carbonate (B) comprises at least one compound selected from the group consisting of fluoroethylene carbonate, 4,4-difluoroethylene carbonate, and 4,5-difluoroethylene carbonate.

3. The non-aqueous electrolyte solution according to claim 1, wherein the compound (C) that has at least two isocyanate groups in the molecule comprises at least one compound selected from the group consisting of monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, a trimer compound derived therefrom and polyisocyanate compounds provided by the addition of a polyhydric alcohol to the diisocyanate.

4. The non-aqueous electrolyte solution according to claim 1, which contains the compound represented by formula (1) and wherein the compound represented by formula (1) comprises a compound in which R¹ is a hydrocarbon group selected from the group consisting of —CH₂—CH₂—, —CH₂—CH₂=CH₂—, —CH=C(CH₃)—, —CH₂—C(=CH₂)—, and the hydrocarbon group represented by the following formula (2):

5. The non-aqueous electrolyte solution according to claim 1, wherein (A) comprises at least one compound represented by formula (1) and wherein the compound represented by formula (1) comprises a compound in which M is an organic group selected from the group consisting of —O—, —NH—, and —N(—CH₁)—.

6. The non-aqueous electrolyte solution according to claim 1, wherein (A) comprises at least one compound represented by formula (1) and wherein the compound represented by formula (1) comprises succinic anhydride or maleic anhydride.

7. The non-aqueous electrolyte solution according to claim 1, which contains a carbonate having a carbon-carbon unsaturated bond and wherein the carbonate having a carbon-carbon unsaturated bond comprises at least one compound selected from the group consisting of vinylene carbonate, vinylethylene carbonate, and ethynylethylene carbonate.

8. The non-aqueous electrolyte solution according to claim 1, wherein the compound (A) is contained in the non-aqueous electrolyte solution in the amount of 0.001 mass % or more and 10 mass % or less.

9. The non-aqueous electrolyte solution according to claim 1, wherein the fluorine atom-containing cyclic carbonate (B) is contained in the non-aqueous electrolyte solution in the amount of 0.001 mass % or more and 10 mass % or less.

10. A non-aqueous electrolyte secondary battery comprising a positive electrode capable of absorbing and releasing a lithium ion, a negative electrode capable of absorbing and releasing a lithium ion, and the non-aqueous electrolyte solution according to claim 1.

11. The non-aqueous electrolyte solution according to claim 1, wherein the compound (A) comprises at least one compound selected from the group consisting of carbonates having a carbon-carbon unsaturated bond, sulfoxides, sulfites, sulfones, sulfonates, sultones, and sulfates.

12. The non-aqueous electrolyte solution according to claim 1, wherein the compound (A) comprises at, least one compound selected from the group consisting of carbonates having a carbon-carbon unsaturated bond, sulfites, and sultones.

13. The non-aqueous electrolyte solution according to claim 1, comprising a sulfite wherein the sulfite is selected from the group consisting of dimethyl sulfite, diethyl sulfite, dipropyl sulfite, dibutyl sulfite, diphenyl sulfite, ethylene sulfite, and propylene sulfite.

14. The non-aqueous electrolyte solution according to claim 1, comprising a sultone wherein the sultone is selected from the group consisting of 1,3-propane sultone, 1,3-propene sultone, 1,4-butane sultone, and 1,4-butene sultone.

15. The non-aqueous electrolyte solution according to claim 1, wherein the compound (A) comprises at least one compound selected from the group consisting of succinic anhydride, vinylene carbonate, ethylene sulfite, 1,3-propane sultone, and 1,3-propene sultone.

16. The non-aqueous electrolyte solution according to claim 1, wherein the compound (B) is an ethylene carbonate having from 1 to 8 fluorine atoms.

17. The non-aqueous electrolyte solution according to claim 1, wherein the compound (C) that has at least two isocyanate groups in the molecule is a compound having a straight-chain or branched alkylene structure, or a compound having a cycloalkylene structure.

18. The non-aqueous electrolyte solution according to claim 1, wherein the compound (C) that has at least two isocyanate groups in the molecule comprises at least one compound selected from the group consisting of tetramethylene diisocyanate, hexamethylene diisocyanate, octamethylene diisocyanate, 1,3-bis(isocyanatomethyl)cyclohexane, and dicyclohexylmethane-4,4'-diisocyanate.

19. The non-aqueous electrolyte solution according to claim 1, wherein
the compound (A) comprises at least one compound selected from the group consisting of succinic anhydride, vinylene carbonate, ethylene sulfite, 1,3-propane sultone, and 1,3-propene sultone,
the compound (B) comprises at least one compound selected from the group consisting of fluoroethylene carbonate, 4,4-difluoroethylene carbonate, and 4,5-difluoroethylene carbonate, and
the compound (C) that has at least two isocyanate groups in the molecule comprises at least one compound selected from the group consisting of tetramethylene diisocyanate, hexamethylene diisocyanate, octamethylene diisocyanate, 1,3-bis(isocyanatomethyl)cyclohexane, and dicyclohexylmethane-4,4'-diisocyanate.

20. The non-aqueous electrolyte solution according to claim 1, wherein
the compound (A) comprises at least one compound selected from the group consisting of ethylene sulfite, 1,3-propane sultone, and 1,3-propene sultone,
the compound (B) comprises at least one compound selected from the group consisting of fluoroethylene carbonate, 4,4-difluoroethylene carbonate, and 4,5-difluoroethylene carbonate, and
the compound (C) that has at least two isocyanate groups in the molecule comprises at least one compound selected from the group consisting of tetramethylene diisocyanate, hexamethylene diisocyanate, octamethylene diisocyanate, 1,3-bis(isocyanatomethyl)cyclohexane, and dicyclohexylmethane-4,4'-diisocyanate.

21. The non-aqueous electrolyte solution according to claim 1, wherein
the compound (A) comprises at least one compound selected from the group consisting of ethylene sulfite, 1,3-propane sultone, and 1,3-propene sultone,
the compound (B) comprises at least one compound selected from the group consisting of fluoroethylene carbonate, and
the compound (C) that has at least two isocyanate groups in the molecule comprises at least one compound selected from the group consisting of tetramethylene diisocyanate, hexamethylene diisocyanate, octamethylene diisocyanate, 1,3-bis(isocyanatomethyl)cyclohexane, and dicyclohexylmethane-4,4'-diisocyanate.

* * * * *

UNITED STATES PATENT AND TRADEMARK OFFICE
CERTIFICATE OF CORRECTION

PATENT NO. : 9,653,753 B2  
APPLICATION NO. : 13/955584  
DATED : May 16, 2017  
INVENTOR(S) : Shuhei Sawa et al.

Page 1 of 1

It is certified that error appears in the above-identified patent and that said Letters Patent is hereby corrected as shown below:

Column 80, Line 6, In Claim 4 "—$CH_2$— $CH_2$= $CH_2$—, — CH=C($CH_3$)—" should read -- —$CH_2$— $CH_2$—$CH_2$—,— CH=CH—, —CH=C($CH_3$)— --

Column 80, Line 23, In Claim 5 "N(-$CH_1$)" should read --N(-$CH_3$)--

Column 80, Line 57, In Claim 12 "at, least" should read --at least--

Signed and Sealed this  
Twentieth Day of March, 2018

Andrei Iancu  
*Director of the United States Patent and Trademark Office*